United States Patent
Dauner et al.

(10) Patent No.: US 12,509,677 B2
(45) Date of Patent: Dec. 30, 2025

(54) PROBIOTIC STRAINS HAVING INCREASED STORAGE STABILITY

(71) Applicant: DUPONT NUTRITION BIOSCIENCES APS, Copenhagen K (DK)

(72) Inventors: Michael Dauner, Wilmington, DE (US); Gerda Saxer Quance, Wilmington, DE (US); Steven Keith Williams, Corinth, TX (US)

(73) Assignee: INTERNATIONAL N&H DENMARK APS, Kongens Lyngby (DK)

( * ) Notice: Subject to any disclaimer, the term of this patent is extended or adjusted under 35 U.S.C. 154(b) by 1102 days.

(21) Appl. No.: 17/606,292

(22) PCT Filed: Apr. 23, 2020

(86) PCT No.: PCT/EP2020/061385
§ 371 (c)(1),
(2) Date: Oct. 25, 2021

(87) PCT Pub. No.: WO2020/216863
PCT Pub. Date: Oct. 29, 2020

(65) Prior Publication Data
US 2022/0204966 A1 Jun. 30, 2022

Related U.S. Application Data

(60) Provisional application No. 62/838,985, filed on Apr. 26, 2019.

(51) Int. Cl.
*C12N 15/01* (2006.01)
*C12N 1/20* (2006.01)
*C12R 1/23* (2006.01)

(52) U.S. Cl.
CPC ............ *C12N 15/01* (2013.01); *C12N 1/205* (2021.05); *C12R 2001/23* (2021.05)

(58) Field of Classification Search
CPC ...... C12N 15/01; C12N 1/205; C12R 2001/01
See application file for complete search history.

(56) References Cited

U.S. PATENT DOCUMENTS 8,741,622 B2 6/2014 Berger et al.

OTHER PUBLICATIONS

Chen et al. "Adaptation of Lactococcus lactis to high growth temperature leads to a dramatic increase in acidification rate". Scientific Reports vol. 5, Article No. 14199 (2015). doi: 10.1038/srep14199 (Year: 2015).*

Dong et al. *Bifidobacterium thermacidophilum* sp. nov., isolated from an anaerobic digester. International Journal of Systematic and Evolutionary Microbiology (2000), 50, 119-125. (Year: 2000).*
Stress responses and genetic variation in bacteria. Mutation Research/Fundamental and Molecular Mechanisms of Mutagenesis, vol. 569, Issues 1-2, 2005, pp. 3-11. (Year: 2005).*
Simpson et al. *Bifidobacterium psychraerophilum* sp. nov. and *Aeriscardovia aeriphila* gen. nov., sp. nov., isolated from a porcine caecum. International Journal of Systematic and Evolutionary Microbiology (2004), 54, 401-40. (Year: 2004).*
*Bifidobacterium animalis* subsp. lactis Bi-07 supports lactose digestion in vitro and in randomized, placebo- and lactase-controlled clinical trials. Am J Clin Nutr. Sep. 23, 2022;116(6):1580-1594. (Year: 2022).*
Bhavsar et al. The other lives of ribosomal proteins. Hum Genomics. Jun. 2010;4(5):327-44. (Year: 2010).*
The Leibniz Institute. Bifidobacterium thermacidophilum DSM 15837. URL: www.dsmz.de/collection/catalogue/details/culture/DSM-15837. Accessed Jun. 11, 2025. (Year: 2000).*
Biavati, B. and Mattarelli, P. (2015). Bifidobacterium †,‡. In Bergey's Manual of Systematics of Archaea and Bacteria (eds M.E. Trujillo, S. Dedysh, P. DeVos, B. Hedlund, P. Kämpfer, F.A. Rainey and W.B. Whitman). (Year: 2015).*
Rasinkangas et al. (*Bifidobacterium animalis* subsp. lactis Bi-07 supports lactose digestion in vitro and in randomized, placebo- and lactase-controlled clinical trials. Am J Clin Nutr. Sep. 23, 2022;116(6):1580-1594. (Year: 2022).*
STAHL, et al., "Complete Genome Sequences of Probiotic Strains *Bifidobacterium animaiis* subsp. lactis 8420 and Bi-07", J. Bacteriology, pp. 4131-4132, vol. 194, No. 15. (2012).
Lalicic-Petronijevic, et al., "Viability of probiotic strains Lactobacillus addophilus NCFM® and Biftdobacterium lactis HN019 and their impact on sensory and rheological properties of milk and dark chocolates during storage for 180 days", J. Functional Foods, vol. 15, pp. 541-550 (2015).
Gueimonde, et al. "Enhancing probiotic stability in industrial processes", FFF Probiotics, vol. 23 (2012).
Chen, et al., "Adaptation of Lactococcus lactis to high growth temperature leads to a dramatic increase i acidification rate", Scientific Reports, pp. 1-15 (2015).
Dettman, et al., "Evolutionary insight from whole-genome sequencing of experimentally evolved microbes" Molecular Ecology, vol. 21, pp. 2058-2077 (2012).
Barrick, et al., "Genome dynamics during experimental evolution" Nature Reviews, vol. 14, pp. 827-839 (2013).

* cited by examiner

*Primary Examiner* — Brian Whiteman
*Assistant Examiner* — Amanda M Zahorik

(57) ABSTRACT

Evolved strains of *Bifidobacterium* and *Lactobacillus* are provided. The evolved strains have probiotic properties and have enhanced storage stability in both wet and dry conditions. The strains of the invention contain key genetic mutations and phenotypic alterations as compared with wild-type.

1 Claim, 20 Drawing Sheets
Specification includes a Sequence Listing.

PROBIOTIC STRAINS HAVING INCREASED STORAGE STABILITY

CROSS-REFERENCE TO RELATED PATENT APPLICATIONS

This patent claims priority under 35 USC § 371 as a national phase of Int'l Patent Appl. PCT/EP2020/061385 (filed Apr. 23, 2020; and published Oct. 29, 2020 as Int'l Publ. No. WO2020/216863), which, in turn, claims priority to U.S. Provisional Patent Appl. 62/838,985 (filed Apr. 26, 2019). The entire text of each of the above-referenced patent applications is incorporated by reference into this patent.

FIELD OF THE INVENTION

The invention relates generally to the field of microbiology and the evolution of strains of *Bifidobacterium* and *Lactobacillus* with enhanced storage stability.

BACKGROUND OF THE INVENTION

A growing awareness of the relationship between diet and health has resulted in an increased demand for food products that are capable of enhancing the health as well as provide basic nutrition. Examples of such food products include probiotics.

The term probiotic, meaning "for-life", is derived from Greek which already indicates the most essential properties of probiotic cultures. The term probiotic was first used by Lilly and Stillwell, 1965 to describe "substances secreted by one micro-organism which stimulate the growth of another" and thus contrasted by the term antibiotic (Lilly and Stillwell, 1965). It may be because of this positive and general claim of the definition that the term probiotic was subsequently applied to other subjects and gained a more general meaning. Now the definition of the term refers to "viable bacteria that beneficially influence the health of the host".

Different studies have demonstrated that the average human and animal gut contains about 100 different species of bacteria, including 'probiotic' bacteria, such as for example bacteria belonging to the genera *Lactococcus, Streptococcus, Pediococcus, Enterococcus, Leuconostoc, Carnobacterium, Propionibacterium, Lactobacillus* and *Bifidobacterium*.

Regular consumption of 'probiotic' bacteria has been reported to enhance gastrointestinal tract function and stability, improve protection against infection and carcinogenic mutagens, bolster the immune system, alleviate lactic acid intolerance, improve digestion and nutrient absorption, reduce blood cholesterol and reduce risks to allergies and wheat intolerance.

Probiotic bacterial cultures are today found in a wide range of products for consumption such as dairy products and different emulsions such as oil-in-water products and water-in-oil products. Incorporation of probiotics into such formulations is particularly fraught with difficulties, because of the harsh processing conditions.

Probiotic cultures encounter a variety of stresses during manufacturing and subsequent storage. During the manufacturing process, probiotics can be exposed to cold, heat, osmotic, oxidative, and acid stress (Upadrasta et al. 2011). The stresses associated with lyophilization or spray drying primarily lead to lethal damage in the cellular membrane, but also affect the cell wall, ribosomes, and DNA/RNA (Castro et al. 1997, Simpson et al. 2005, Mills et al. 2011). Depending on the storage conditions, it is not unusual to see loss of viable cell counts (determined as colony forming units (CFU)) exceed 90% over a storage time of 2 years.

To mitigate the storage losses, many probiotic manufacturers add more live cells into their products at the time of production ("overage"), in order to ensure the number of live cells at the end of storage (at specified storage conditions) are still above the label claim of the product. Strains with increased storage stability allow for incorporation of fewer viable cells per product at time of production, and the products still comply or exceed the storage label claims at end of storage. The reduced number of cells (i.e. a lower "overage") in turn result in the reduction of fermentation capacity required to produce the same amount of product, and ultimately in a significantly increased profitability of the process. Moreover, often the application form, e.g. a pill, cannot exceed a certain maximum size thereby limiting the amount of overage that can be applied. Therefore, the feasibility of commercializing a strain critically depends on its storage stability in order to provide desired viable cell numbers over its product life.

A growing body of evidence suggests that physiological changes induced by stress before storage can improve the storage stability, measured as the number of viable cells (CFUs) after storage. Exposure of *Lactobacillus rhamnosus* (HN001) to stressful levels of either heat or salt prior to storage correlated with significant improvement in storage stability compared to non-stressed control cultures (Prasad et al. 2003). NaCl stress during late growth phase improved the freeze-dried survival of *Lactobacillus bulgaricus*, while fermentation of *Lactobacillus reuteri* at high temperatures and high pHs improved the survival of cells post freeze-drying (Li et al. 2014, Liu et al. 2014a). The changes in pH and temperature induced modifications in the composition of the cell membrane that seemed to improve viability of the cells following freeze-drying (Liu et al. 2014b). Pre-exposure of probiotic bacteria to heat, acid, bile, oxygen, and $H_2O_2$ have all led to enhanced survival during drying (Upadrasta et al. 2011). Similarly, U.S. Pat. No. 5,728,574 teaches a method for improving viability of dried *Pseudomonas fluorescens* consisting of limiting nitrogen sources during fermentation and then leaving the strain in stationary phase for at least 6 hrs. Heat shock prior to drying was applied to achieve further improvement.

The present invention sets itself apart from afore mentioned prior art by generating and selecting cells with increased storage stability based on genetic changes and not due to physiological changes. The mutations underlying this improved heritable phenotype can be identified via whole genome sequence analysis.

U.S. 8,741,622 teaches that natural selection through multiple cycles of heat-shock treatment followed by a growing step at benign conditions to isolate more heat-shock-stable strains. Using the same approach, (Kulkarni et al. 2018) were able to obtain *L. acidophilus* strains with higher survival during heat-shock treatment and storage over seven days. In each of these above mentioned reports strains were exposed to stress for relatively short periods of time. No effort was made to understand the genetic basis for the increased viability or to determine if this characteristic was a stable and heritable phenotype.

Studies have suggested that there is a genetic basis for linking those strains having increased tolerance to various stresses and increased storage stability. For example, in a set of different Bifidobacteria species Simpson et al. observed a correlation between their intrinsic tolerance to heat or oxygen stress and their viability after storage (Simpson et al. 2005). In the presented teaching the surprising finding is exploited that a population of cells grown under continuous temperature stress at the same time also increases the fraction of cells in said population that exhibit improved storage stability properties. These studies are intriguing however were not able to elucidate the genetic changes that we associated with improved storage stability.

The problem to be solved therefore is to uncover the genetic basis for storage stability as it applies to bacterial cultures in general and those with probiotic specificity in particular so as to provide the industry with a reproducible basis for enhancing storage stability and reducing the costs associated with overages in dose. Additionally there is a need to develop selection and screening means to identify the relevant evolved strains that have good manufacturing properties in combination with improved storage stability.

SUMMARY OF THE INVENTION

The invention addresses the stated challenges by providing experimentally evolved strains of Bifidobacterium and Lactobacillus that demonstrate enhanced storage stability based on genetic changes and not physiological changes where the cells are grown under conditions of continuous exposure to stress.

Accordingly the invention provides a heat evolved strain of Bifidobacterium wherein the strain has at least one mutation selected from the group consisting of:
  a) at least one mutation in the gene encoding a Polyribonucleotide nucleotidyltransferase;
  b) at least one mutation in the CheY-like receiver domain;
  c) at least one mutation in the gene encoding a SSU ribosomal protein;
  d) at least one mutation in the intergenic regions upstream of the gene encoding a Oleate hydratase and downstream of the gene encoding a Phosphoglycerate mutase;
  e) at least one mutation in the gene encoding a Pup ligase PafA' paralog;
  f) at least one mutation in the gene encoding a UTP-glucose-1-phosphate uridylyltransferase;
  g) at least one mutation in the gene encoding an Arginine/ornithine antiporter ArcD; and
  h) at least one mutation in the gene encoding a Pyridoxine biosynthesis glutamine am idotransferase,
  wherein the mutations described in parts a)-h) are as compared with the genome sequence of the ancestral strain as set forth in SEQ ID 1, and
  wherein the evolved strain has greater storage stability or effective productivity as compared with the ancestral strain (Bi-07, ATCC PTA SD5220).

In another embodiment the invention provides a heat evolved strain of Bifidobacterium animalis subsp. lactis deposited with the DSMZ under number DSM 33461 on 4 Mar. 2020 (BBi 6.6).

In another embodiment the invention provides a heat evolved strain of Lactobacillus acidophilus NCFM wherein the strain has at least one mutation selected from the group consisting of:
  a) at least one mutation in a gene that encodes a 30S ribosomal protein S18; (rpsR)
  b) at least one mutation in a gene that encodes a pyridoxal kinase (LBA1007)
  c) at least one mutation in a gene that encodes an ATPase; (clpC)
  d) at least one mutation in a gene that encodes a gnt transcriptional regulator; (gntR) and
  e) at least one mutation in an intergenic region that affects the expression of the gene encoding uridine monophosphate kinase; (LAB1268);
  f) at least one mutation in a gene encoding a cation transporter (LBA0098); and
  g) at least one mutation in a gene encoding a transposase (LBA0127);
  wherein the mutations of a)-g) are as compared with the genome sequence of the parental strain (Lactobacillus acidophilus NCFM, ATCC 700396), SEQ ID NO:2; and wherein the evolved strain has greater storage stability as compared with the parental strain (Lactobacillus acidophilus NCFM, ATCC 700396).

In another embodiment the invention provides an evolved strain of Lactobacillus acidophilus deposited with the DSMZ under number DSM 33463 on 4 Mar. 2020 (NCFM 6.3).

In another embodiment the invention provides an NaCl evolved strain of Bifidobacterium animalis subsp. lactis wherein the strain has at least one mutation selected from the group consisting of:
  a) at least one mutation in a gene encoding a class II Fructose-bisphosphate aldolase;
  b) at least one mutation in a gene encoding a first hypothetical protein;
  c) at least one mutation in a gene encoding a putative ABC transporter integral membrane protein;
  d) at least one mutation in a gene encoding a KH domain RNA binding protein (YlqC);
  e) at least one mutation in a gene encoding a Regulator of polyketide synthase;
  f) at least one mutation in a gene encoding an ABC transporter ATP-binding protein;
  g) at least one mutation in a gene encoding a Putative esterase;
  h) at least one mutation in a gene encoding a Signal transduction histidine kinase;
  i) at least one mutation in a gene encoding an ABC-type amino acid transport system, permease component;
  j) at least one mutation in a gene encoding a Histidinol-phosphate aminotransferase;
  k) at least one mutation in gene encoding a DNA-directed RNA polymerase beta subunit;
  l) at least one mutation in a gene encoding a second hypothetical protein;
  m) at least one mutation in a gene encoding an Arginyl-tRNA synthetase; and
  n) at least one mutation in a gene encoding a third hypothetical protein.

In another embodiment the invention provides a NaCl evolved strain of Bifidobacterium animalis subsp. lactis deposited with the DSMZ under number DSM 33462 on 4 Mar. 2020 (BBi 2.7).

In another embodiment the invention provides a salt evolved strain of Bifidobacterium animalis subsp. lactis wherein the strain has at least one mutation selected from the group consisting of:
  a) a mutation in a gene encoding an SSU ribosomal protein S5p (S2e) wherein the mutation is a change from C to T at position 477512;
  b) a mutation in the intergenic region downstream of a gene encoding a Phosphoglycerate mutase and upstream of a gene encoding a Oleate hydratease where the mutation is a change from C to A at position 530981;

c) a mutation in a gene encoding a Pantothenate kinase type III (CoaX-like) wherein the nutation is a change from G to A at position 660753;

d) a mutation in a gene encoding an Argininosuccinate synthase wherein the mutation is a change from C to T at position 857663;

e) a mutation in the intergenic region downstream of a tRNA-Asn-Gtt and upstream of a gene encoding a hypothetical protein wherein the mutation is a change from G to A at position 895939;

f) a mutation in a gene encoding a putative glucose uptake permease wherein the mutation is a change from G to A at position 1259521;

g) a mutation in a gene encoding an Arginine/ornithine antiporter (ArcD) wherein the mutation is a change from C to T at position 1480689;

h) a mutation in a gene encoding a Pyridoxine biosynthesis glutamine amidotransferase, glutaminase subunit wherein the mutation is a change from T to C at position 1639044;

wherein the position given in parts a)-n) are with respect to the ancestral genome sequence SEQ ID NO:1.

In another embodiment the invention provides a method for the evolution and identification of a probiotic strain exhibiting at least one beneficial phenotype comprising:

a) providing a culture of an ancestral probiotic strain which has the ability to undergo natural genetic changes which lead to an increase in genetic diversity;

b) subjecting the culture of step a) to evolutionary pressure over multiple generations thereby increasing the frequency of mutations linked to the beneficial phenotype as compared with the ancestral strain; and c) subjecting the culture of step b) to a selection process to isolate the evolved strain; wherein the evolved strain continues to have probiotic efficacy.

BRIEF DESCRIPTION OF THE FIGURES BIOLOGICAL DEPOSITS AND SEQUENCE DESCRIPTIONS

Applicant have made the following biological deposits for the Purposes of Patent Procedure under the terms of the Budapest Treaty on the International Recognition of the Deposit of Microorganisms at the Leibniz-Institut Deutsche Sammlung von Mikroorganismen and Zellkulturen GmbH (DSMZ), Inhoffenstrasse 7B, 38124 Braunschweig, Germany:

| Depositor Identification Reference | Accession number given by the International Depository authority (DSMZ) | Date of Deposit |
|---|---|---|
| *Bifidobacterium* Bi-07 Heat 6.6 (DGCC13338) | DSM 33461 | 4 Mar. 2020 |
| *Bifidobacterium* Salt NaCl 2.7 (DGCC13339) | DSM 33462 | 4 Mar. 2020 |
| *Lactobacillus acidophilus* NCFM Heat 6.3 (DGCC13269) | DSM 33463 | 4 Mar. 2020 |

It is requested that the biological material shall be made available only by the issue of a sample to an expert nominated by the requester.

Figure 7:
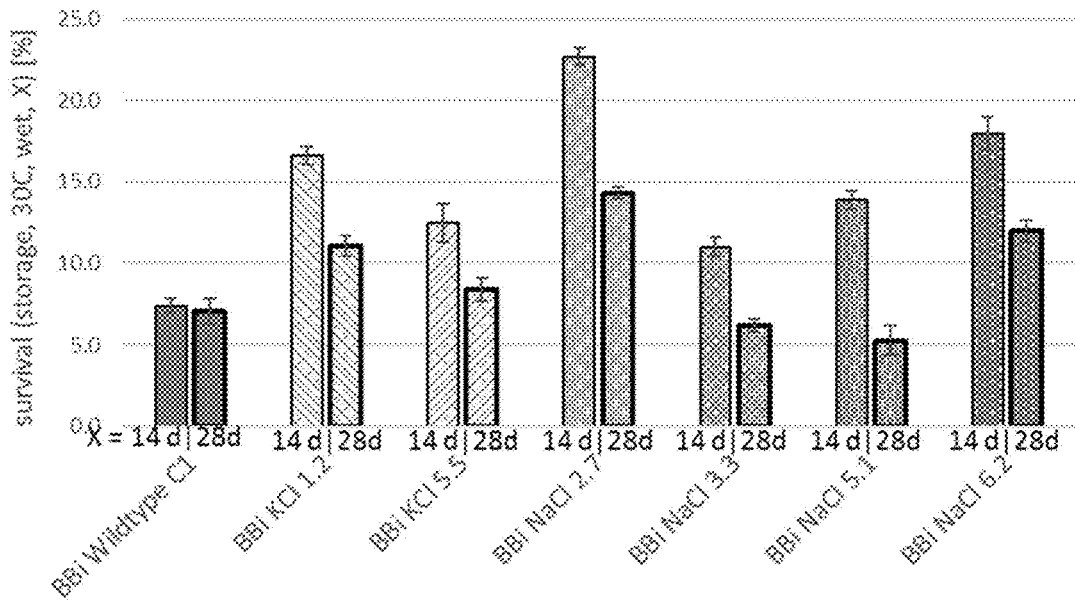

FIG. 7 is a graph showing the survival of cells BBi Wildtype C1 (solid dark grey), BBi KCl 1.2 (diagonal stripes downward), BBi KCl 5.5 (diagonal stripes upward), BBi NaCl 2.7 (50% dotted), BBi NaCl 3.3 (60% dotted), BBi NaCl 5.1 (70% dotted) and BBi NaCl 6.2 (80% dotted) in percent of cells before storage ("T0"), if stored at 30° C. and 40% relative humidity for either X=14 d (thin border) or X=28 d (thick border).

Figure 8:
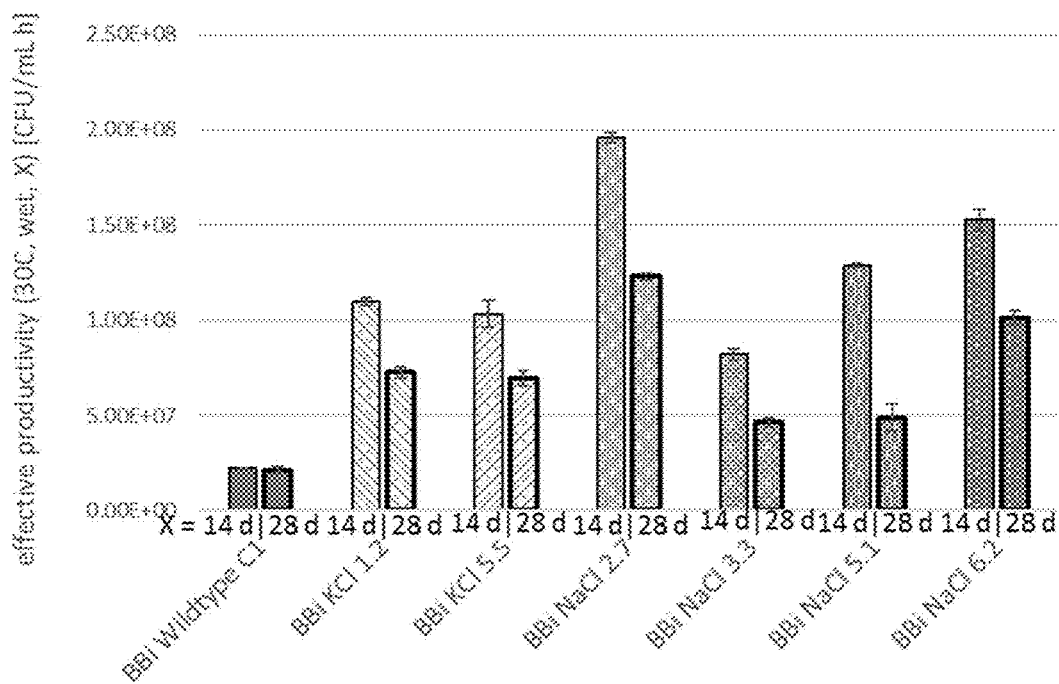

FIG. 8 is a graph showing the effective productivity of cultures BBi Wildtype C1 (solid dark grey), BBi KCl 1.2 (diagonal stripes downward), BBi KCl 5.5 (diagonal stripes upward), BBi NaCl 2.7 (50% dotted), BBi NaCl 3.3 (60% dotted), BBi NaCl 5.1 (70% dotted) and BBi NaCl 6.2 (80% dotted) if subsequently stored for either X=14 d (thin border) or X=28 d (thick border) at 30 C and 40% relative humidity.

Figure 9:
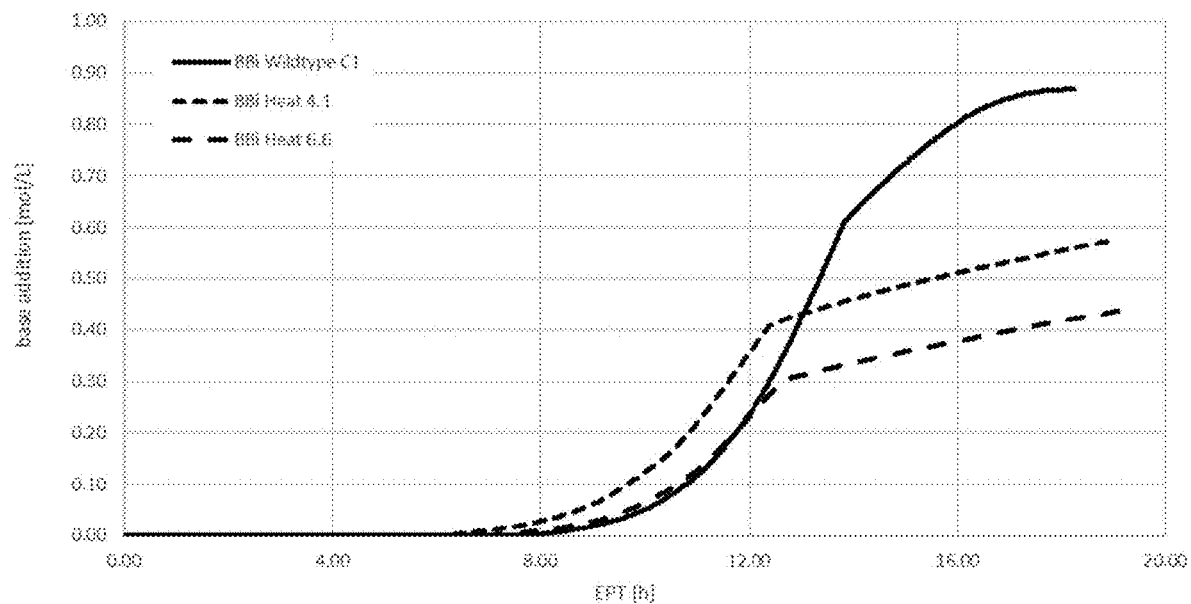

FIG. 9 is a graph showing a time course of cumulative base addition for BBi Wildtype C1 (solid line), BBi Heat 4.1 (line with short dashes) and BBi Heat 6.6. (line with long dashes) cultures.

Figure 10:
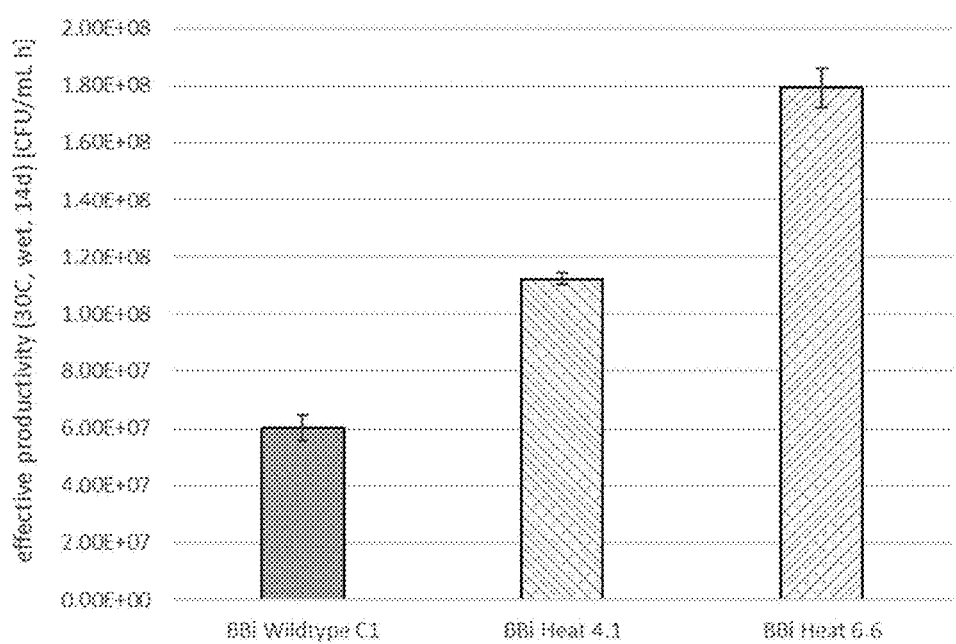

FIG. 10 is a graph showing the effective productivity of cultures BBi Wildtype C1 (solid grey), BBi Heat 4.1 (diagonal stripes downward) and BBi Heat 6.6 (diagonal stripes upward) if subsequently stored at 30° C. and 40% relative humidity for 14 d.

Figure 11:
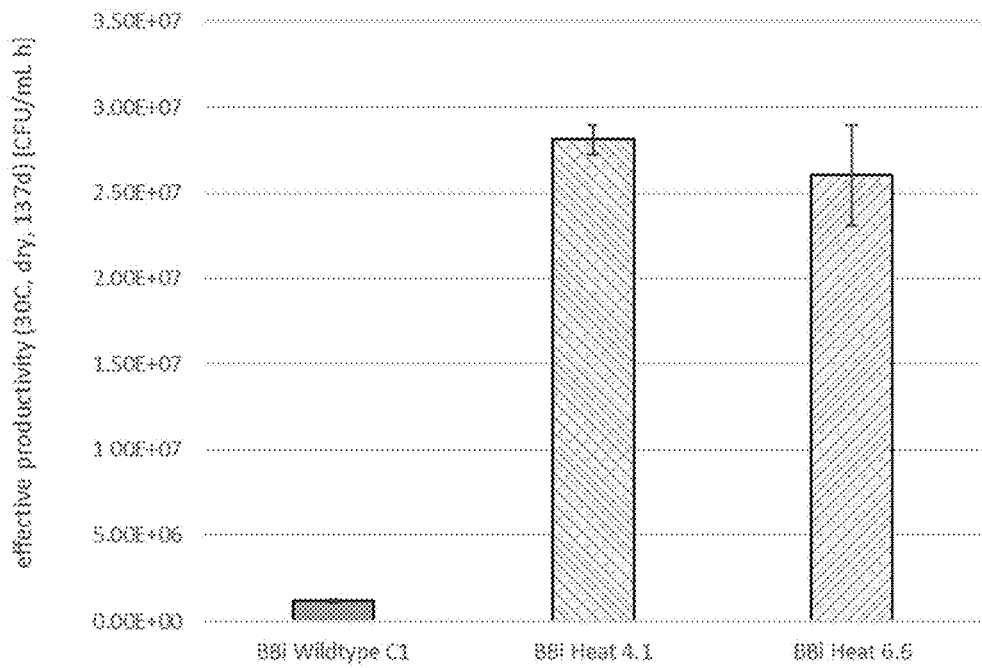

FIG. 11 is a graph showing the effective productivity of cultures BBi Wildtype C1 (solid grey), BBi Heat 4.1 (diagonal stripes downward) and BBi Heat 6.6 (diagonal stripes upward) if subsequently stored at 30° C. and low relative humidity for 137 d.

Figure 12:
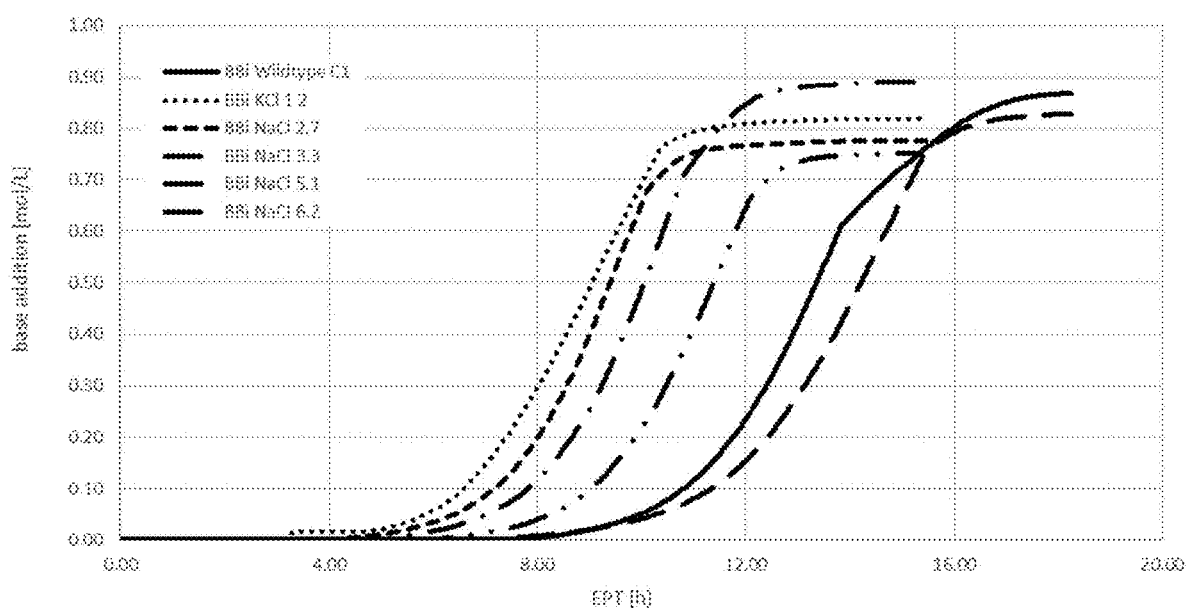

FIG. 12 is a graph showing a time course of cumulative base addition for BBi Wildtype C1 (solid line), BBi KCl 1.2 (dotted line), BBi NaCl 2.7 (line with short dashes), BBi NaCl 3.3 (line with long dashes), BBi NaCl 5.1 (line with long dash followed by two points) and BBi NaCl 6.2 (line with long dash followed by one point).

Figure 13:
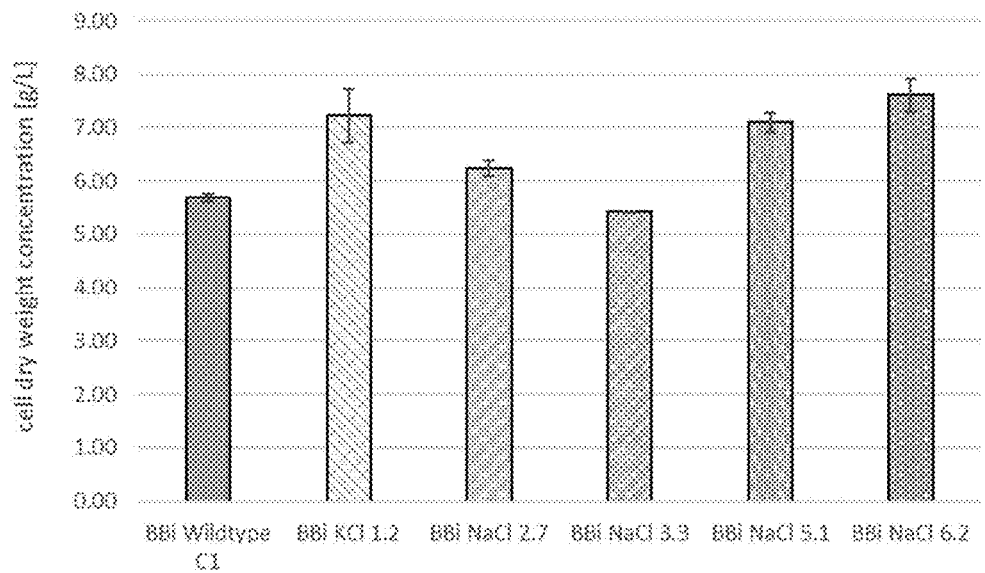

FIG. 13 is a graph showing cell dry weight concentration measured at harvest time in cultures of BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted)

Figure 14:
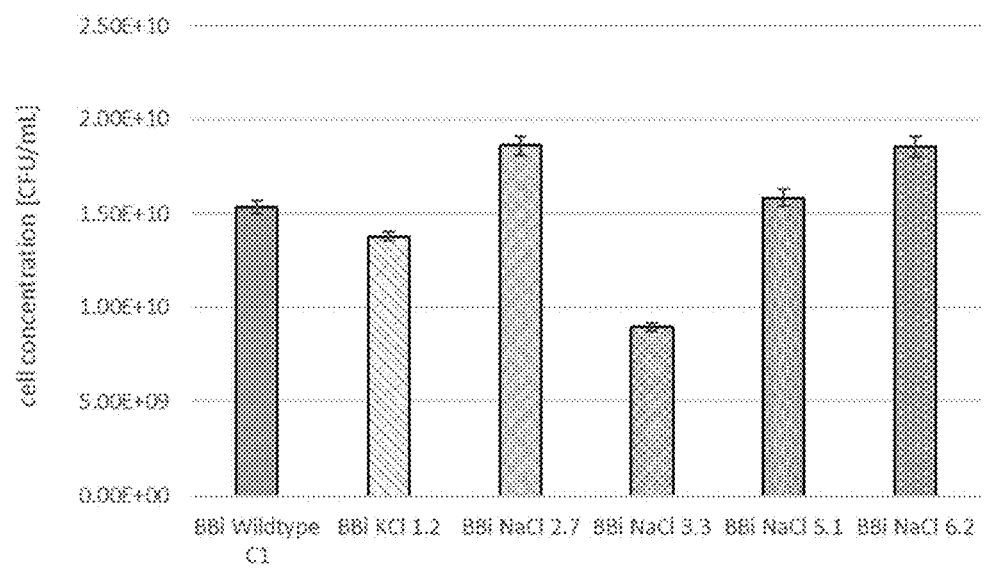

FIG. 14 is a graph of cell dry weight concentration measured at harvest time in cultures of BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted).

Figure 15:
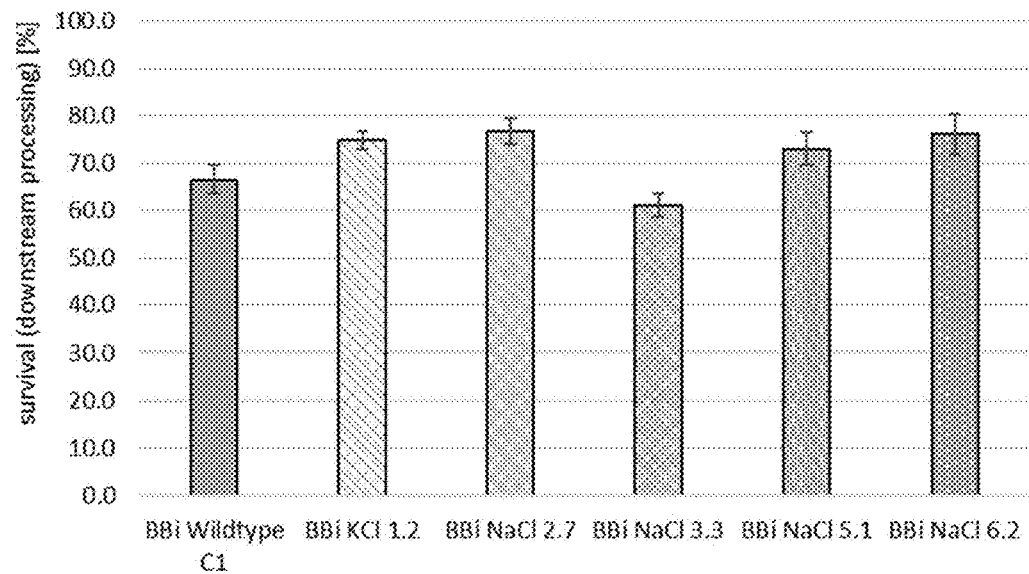

FIG. 15 is a graph showing the survival of cells after downstream processing in percent of cells from cultures BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted) as compared to fermentation cell numbers after conditioning (CN).

Figure 16:
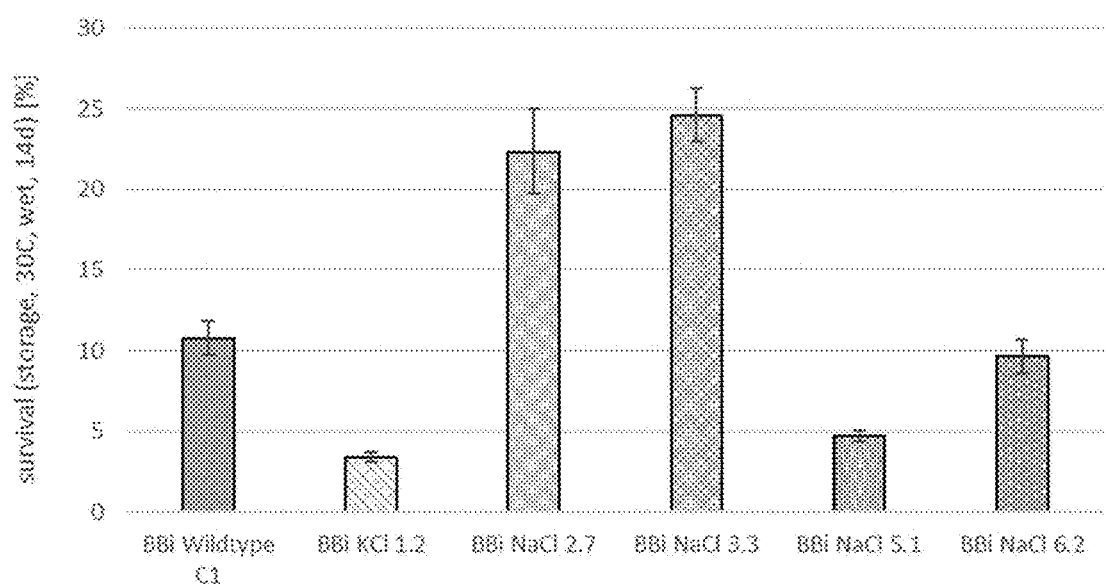

FIG. 16 is a graph of the survival of cells of cultures BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted) in percent of cells before storage ("T0"), if stored at 30° C. and 40% relative humidity for 14 d.

Figure 17:
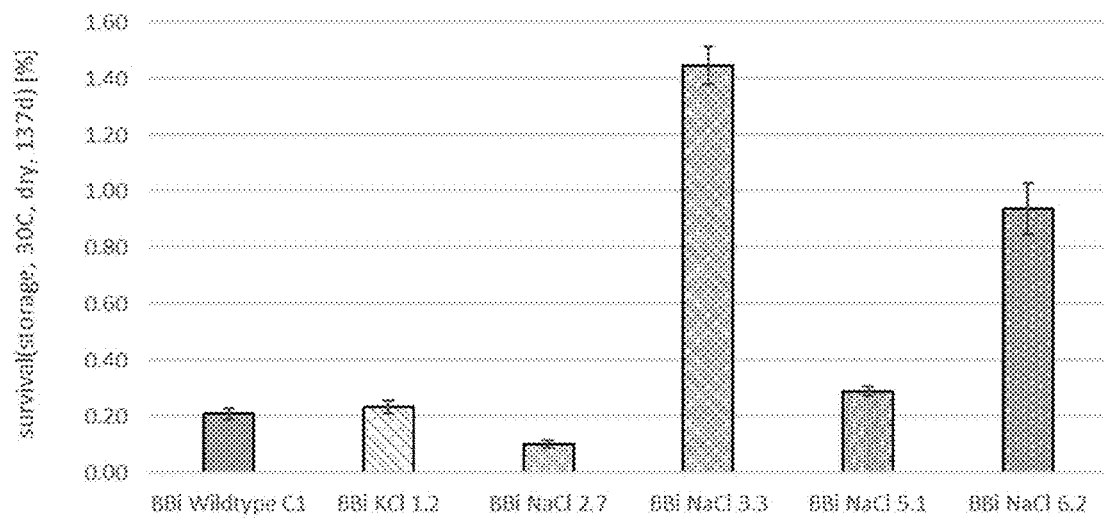

FIG. 17 is a graph showing the survival of cells of cultures BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted) in percent of cells before storage ("T0"), if stored at 30° C. and low relative humidity for 137 d.

Figure 18:
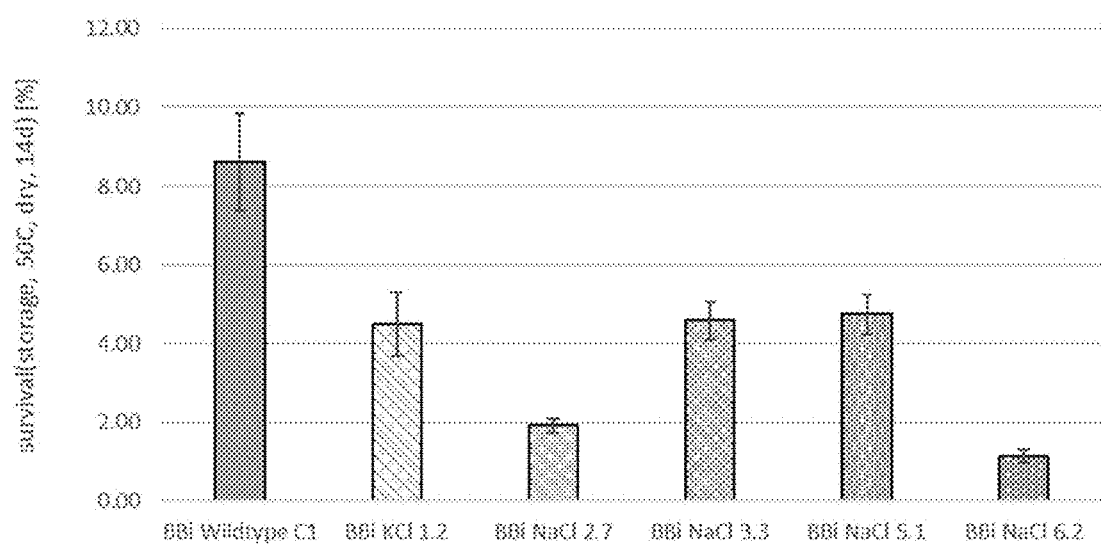

FIG. 18 is a graph showing the survival of cells of cultures BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted) in percent of cells before storage ("T0"), if stored at 50° C. and low relative humidity for 14 d.

Figure 19:
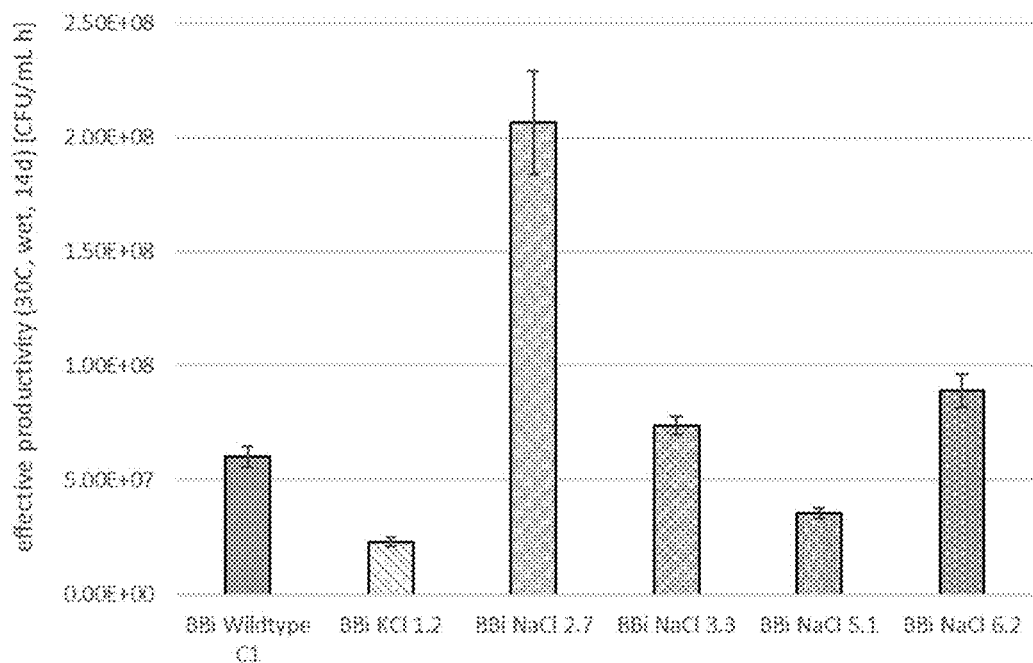

FIG. 19 is a graph showing the effective productivity of cultures BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted) if subsequently stored at 30° C. and 40% relative humidity for 14 d.

Figure 20:
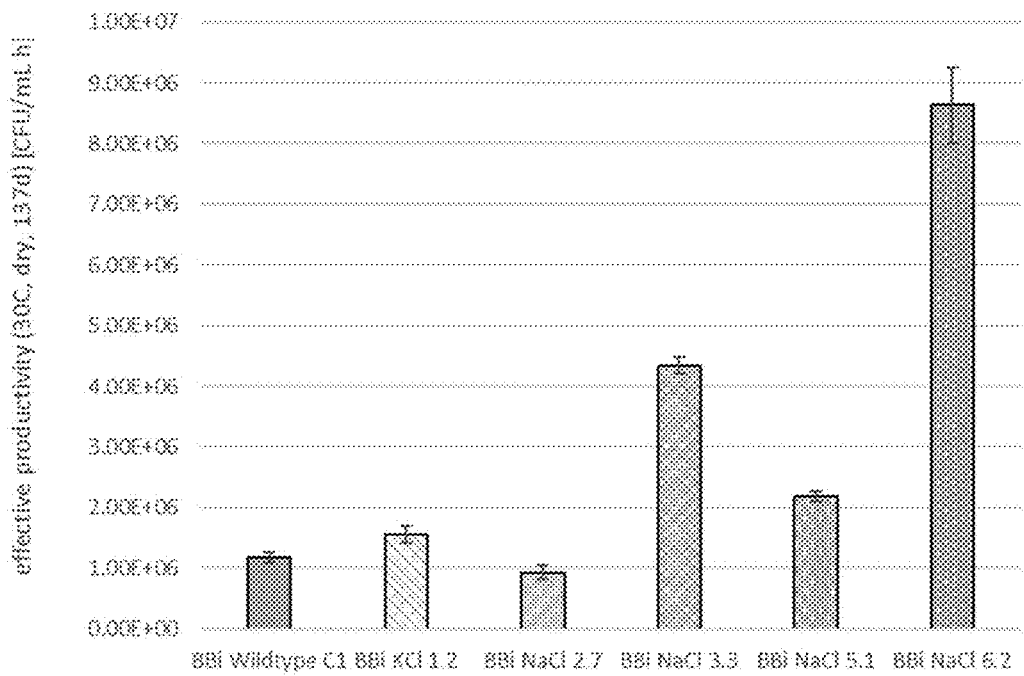

FIG. 20 is a graph showing the effective productivity of cultures BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted) if subsequently stored at 30° C. and low relative humidity for 137 d.

Figure 21:
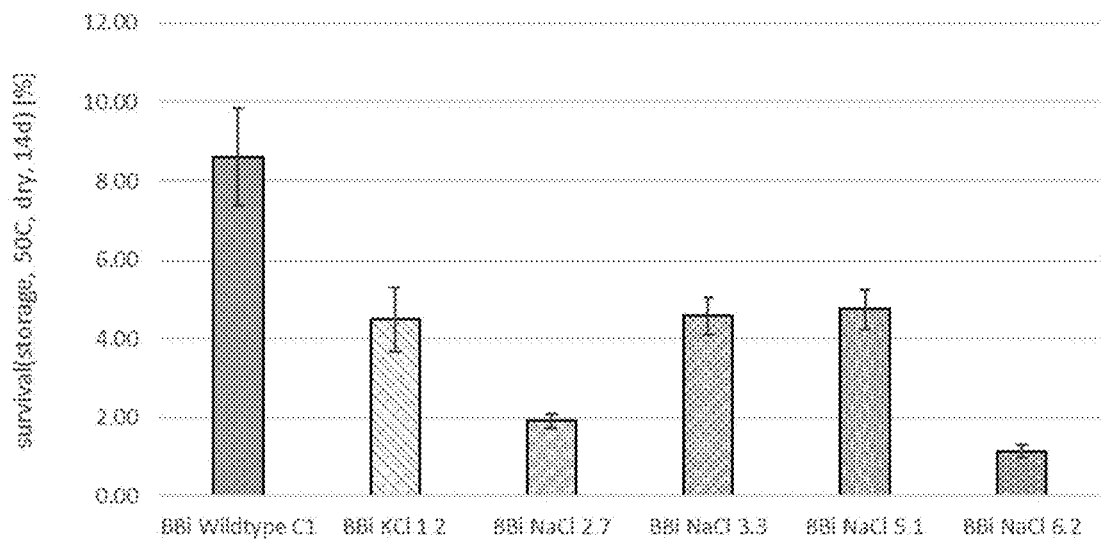

FIG. 21 is a graph showing the effective productivity of cultures BBi Wildtype C1 (solid grey), BBi KCl 1.2 (diagonal stripes downward), BBi NaCl 2.7 (50% dotted), BBi NaCl 3.3 (60% dotted), BBi NaCl 5.1 (70% dotted) and BBi NaCl 6.2 (80% dotted) if subsequently stored at 50° C. and low relative humidity for 14 d.

Figure 22:
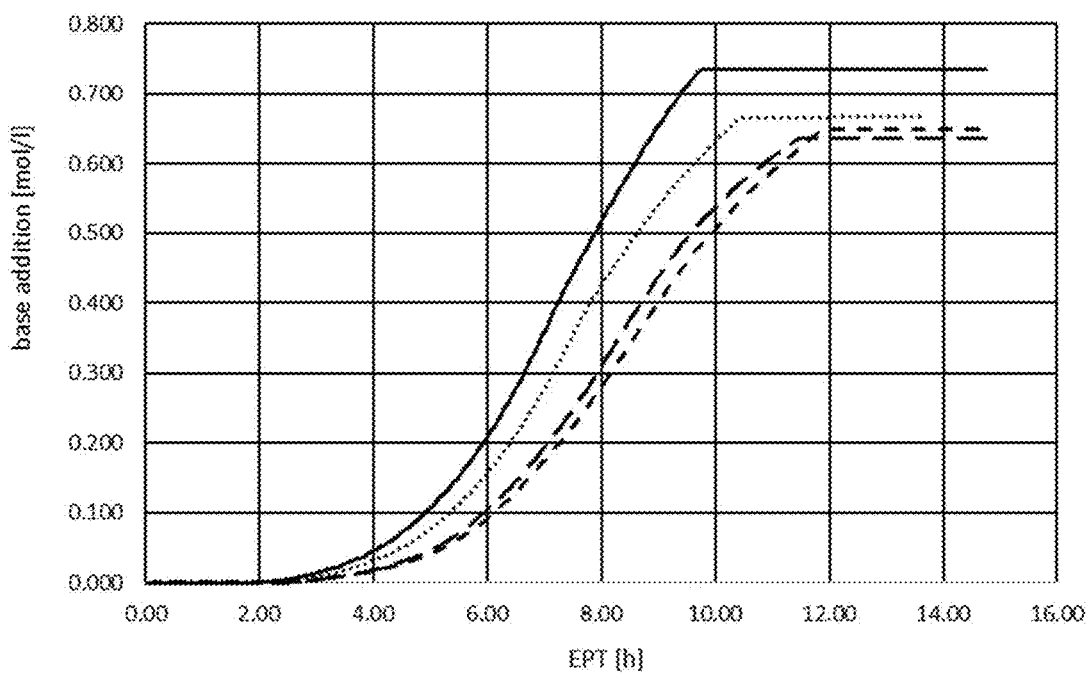

FIG. 22 is a graph showing a time course of cumulative base addition for NCFM Wildtype C1 (solid line), NCFM Wildtype C2 (dotted line), NCFM Heat 1.1 (line with long dashes) and NCFM Heat 6.3. (line with long dashes) cultures.

Figure 23:
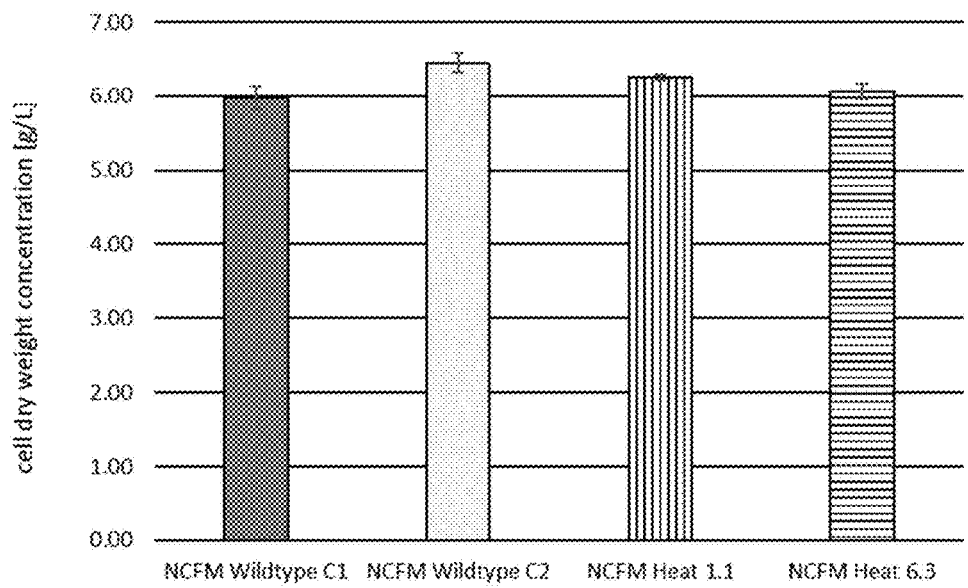

FIG. 23 is a graph showing cell dry weight concentration measured at harvest time in cultures of NCFM Wildtype C1 (solid grey), NCFM Wildtype C2 (solid light grey), NCFM Heat 1.1 (vertical stripes) and NCFM Heat 6.3 (horizontal stripes).

Figure 24:
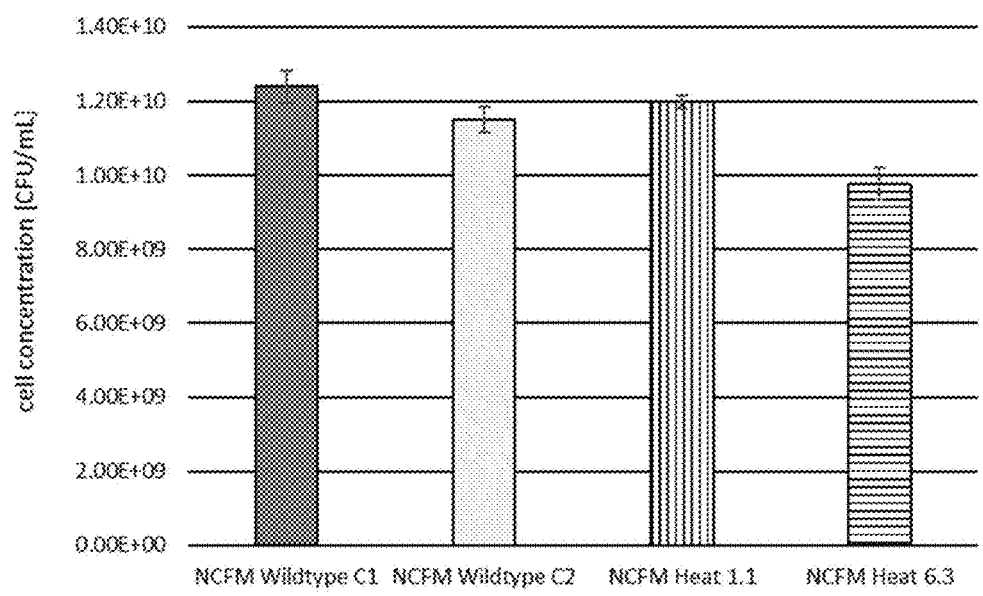

FIG. 24 is a graph showing cell concentration at harvest time and subsequent storage for 1 h at 10 C in cultures of NCFM Wildtype C1 (solid grey), NCFM Wildtype C2 (solid light grey), NCFM Heat 1.1 (vertical stripes) and NCFM Heat 6.3 (horizontal stripes).

Figure 25:
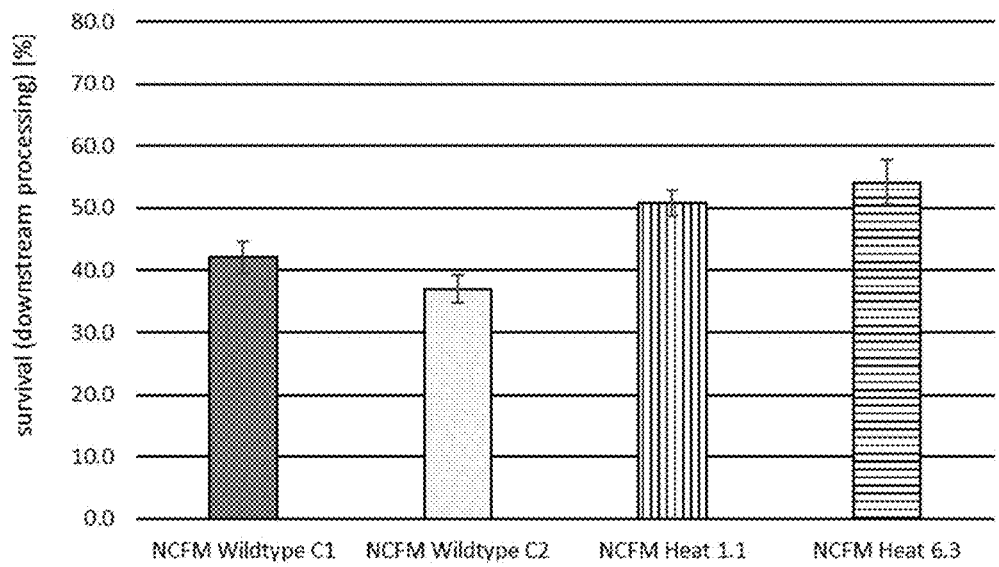

FIG. 25 is a graph showing survival of cells after downstream processing in percent of cells from cultures NCFM Wildtype C1 (solid grey), NCFM Wildtype C2 (solid light grey), NCFM Heat 1.1 (vertical stripes) and NCFM Heat 6.3 (horizontal stripes) as compared to fermentation cell numbers after conditioning (CN).

Figure 26:
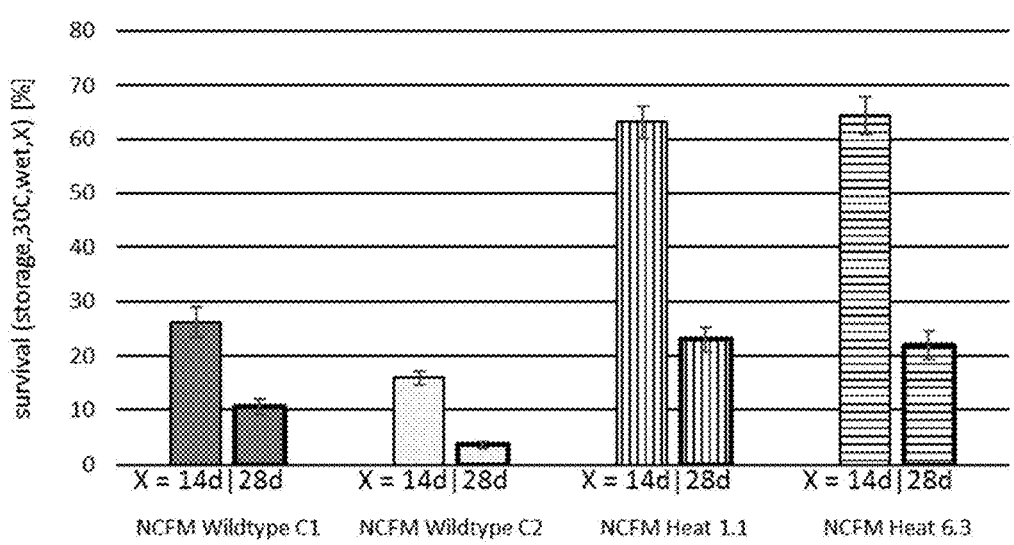

FIG. 26 is a graph showing survival of cells of cultures NCFM Wildtype C1 (solid grey), NCFM Wildtype C2 (light grey), NCFM Heat 1.1 (vertical lines) and NCFM Heat 6.3 (horizontal lines) after 14 d (thin border) and 28 d (thick border) in percent of cells before storage ("T0"), if stored at 30° C. and 40% relative humidity.

Figure 27:
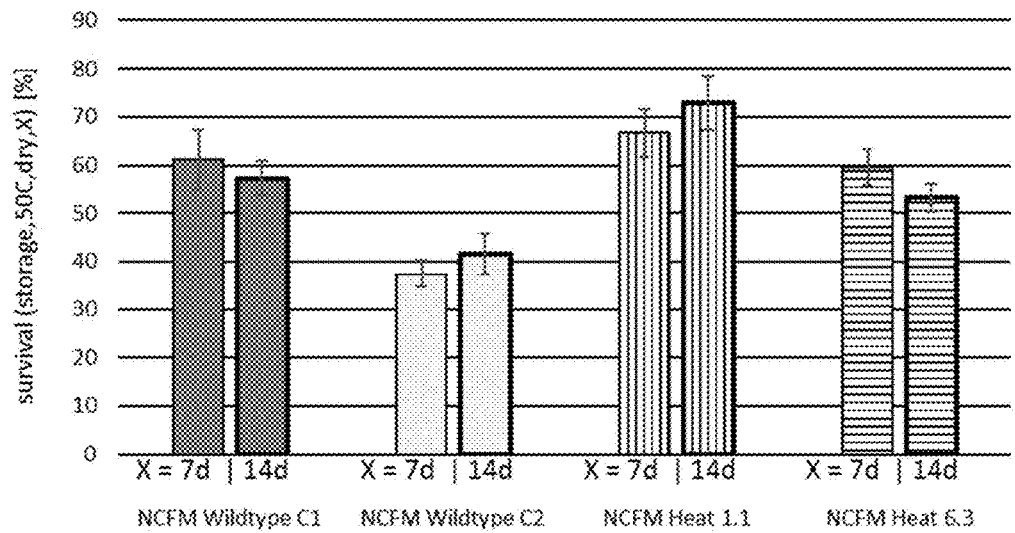

FIG. 27 is a graph showing survival of cells of cultures NCFM Wildtype C1 (solid dark grey), NCFM Wildtype C2 (solid light grey), NCFM Heat 1.1 (vertical lines) and NCFM Heat 6.3 (horizontal lines) after 7 d (thin border) and 14 d (thick border) in percent of cells before storage ("T0"), if stored at 50° C. and low relative humidity.

Figure 28:
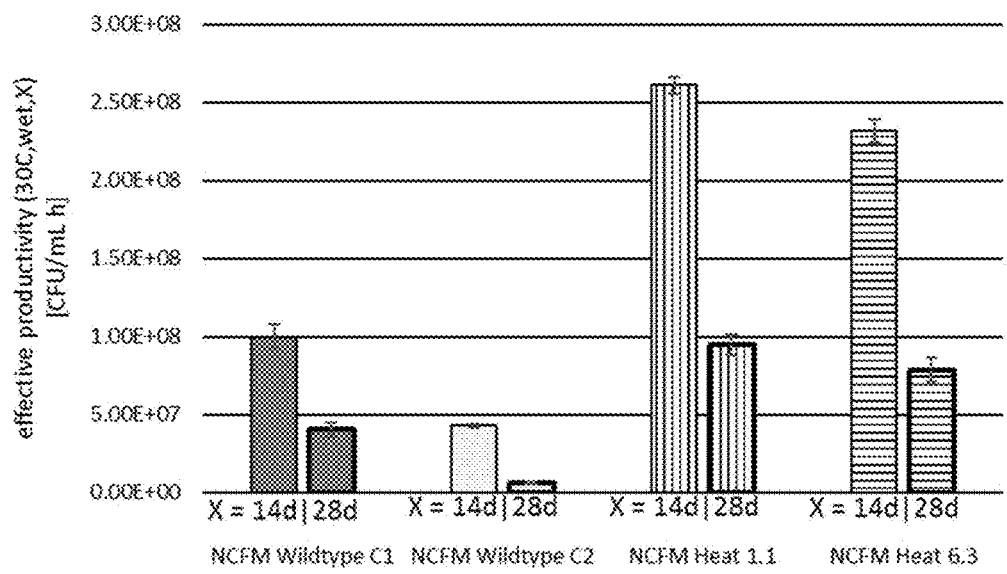

FIG. 28 is a graph showing effective productivity of cultures NCFM Wildtype C1 (solid dark grey), NCFM Wildtype C2 (solid light grey), NCFM Heat 1.1 (vertical lines) and NCFM Heat 6.3 (horizontal lines) if subsequently stored for either X=14 d (thin border) or X=28 d (thick border) at 30 C and 40% relative humidity.

Figure 29:
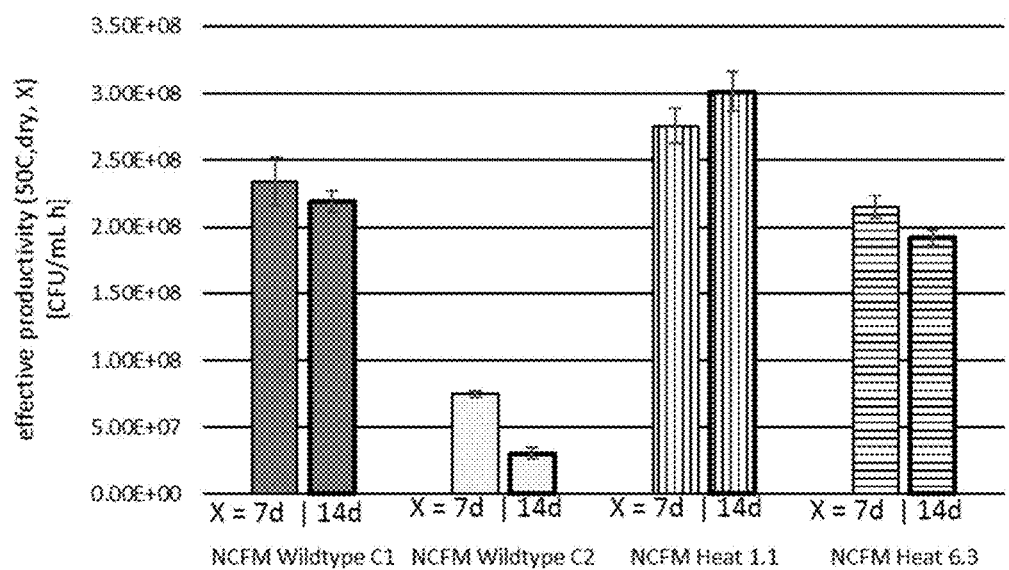

FIG. 29 is a graph showing effective productivity of cultures NCFM Wildtype C1 (solid dark grey), NCFM Wildtype C2 (solid light grey), NCFM Heat 1.1 (vertical lines) and NCFM Heat 6.3 (horizontal lines) if subsequently stored for either X=7 d (thin border) or X=14 d (thick border) at 50 C and low relative humidity.

Figure 30:
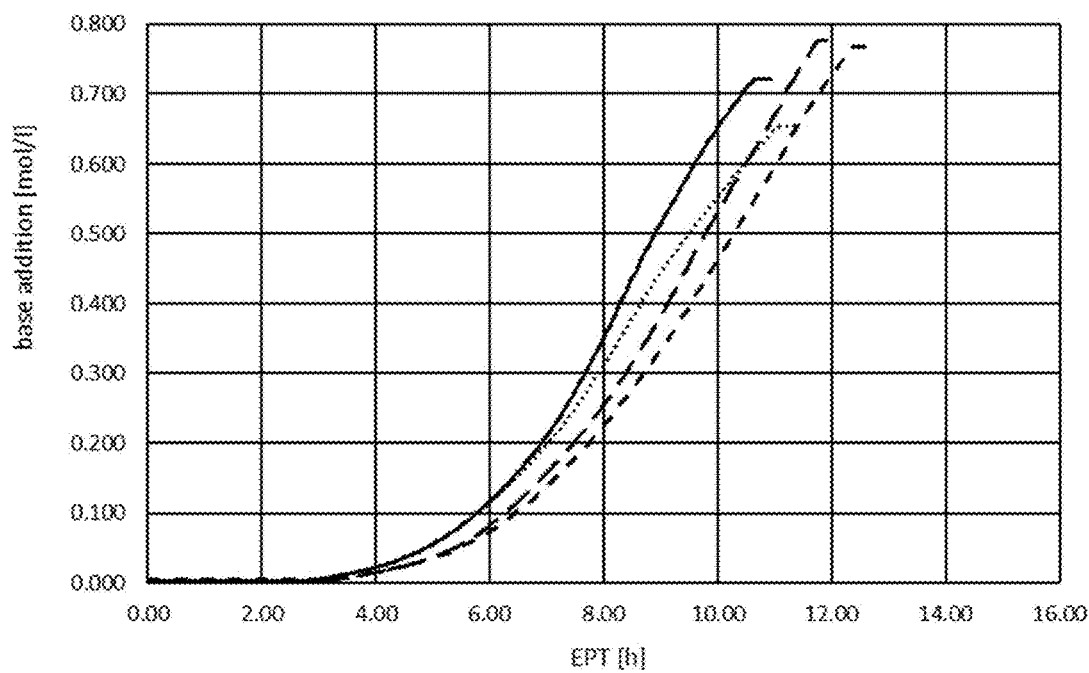

FIG. 30 is a graph showing a time course of cumulative base addition for NCFM Wildtype C1 (solid line), NCFM Wildtype C2 (dotted line), NCFM Heat 1.1 (line with long dashes) and NCFM Heat 6.3. (line with long dashes) cultures.

Figure 31:
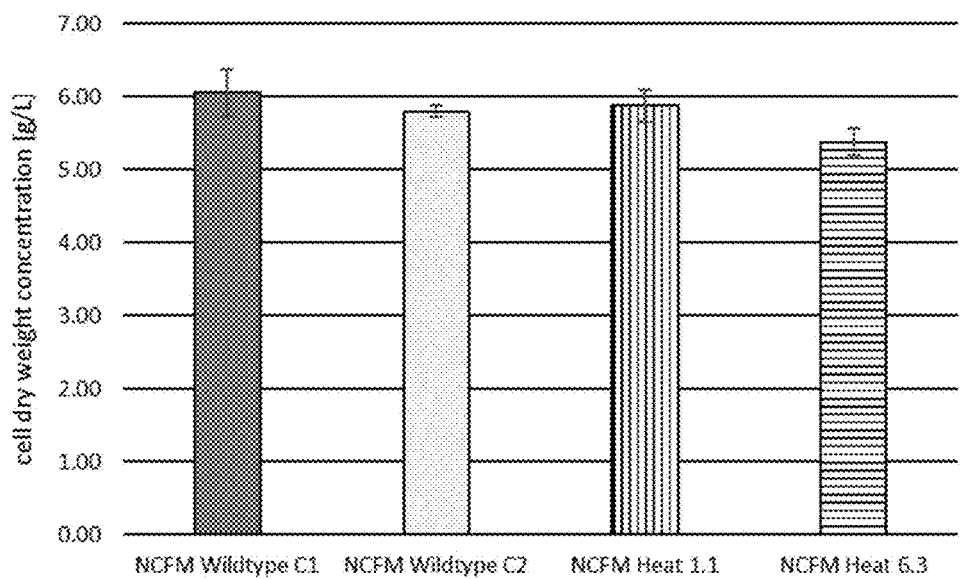

FIG. 31 is a graph showing cell dry weight concentration measured at harvest time in cultures of NCFM Wildtype C1 (solid grey), NCFM Wildtype C2 (solid light grey), NCFM Heat 1.1 (vertical stripes) and NCFM Heat 6.3 (horizontal stripes).

Figure 32:
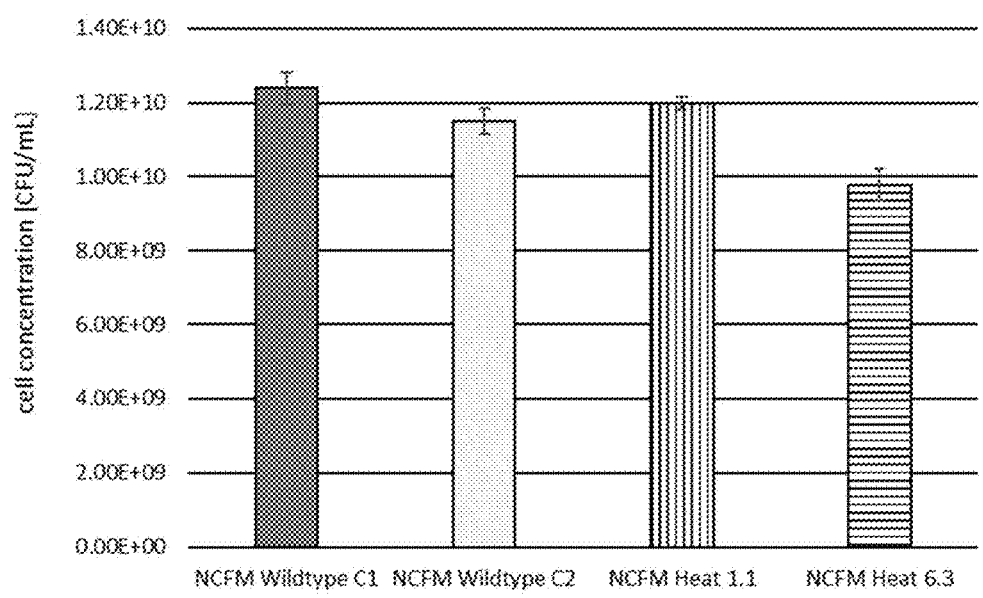

FIG. 32 is a graph showing cell concentration at harvest time and subsequent storage for 1 h at 10 C in cultures of NCFM Wildtype C1 (solid grey), NCFM Wildtype C2 (solid light grey), NCFM Heat 1.1 (vertical stripes) and NCFM Heat 6.3 (horizontal stripes).

Figure 33:
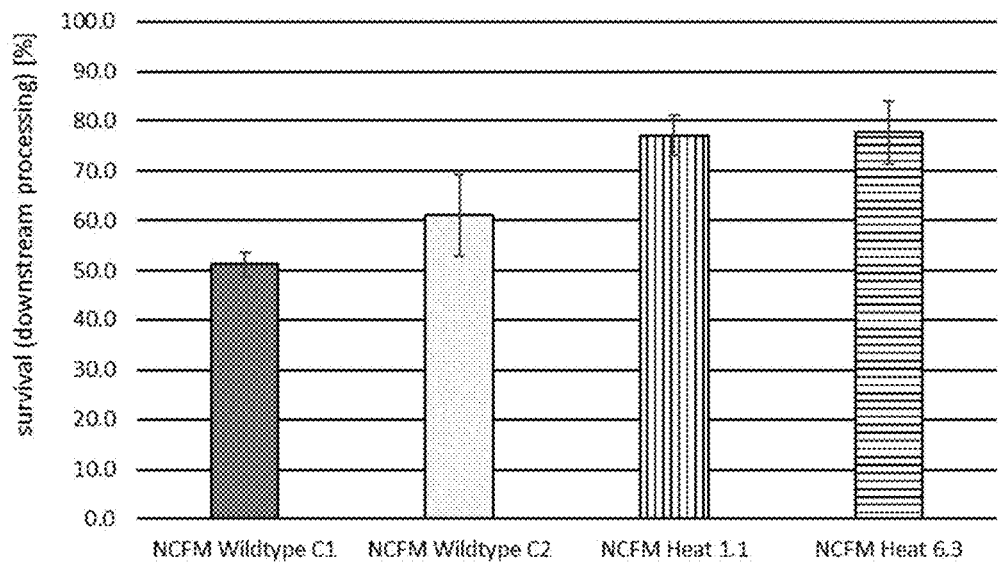

FIG. 33 is a graph showing survival of cells after downstream processing in percent of cells from cultures NCFM Wildtype C1 (solid grey), NCFM Wildtype C2 (solid light grey), NCFM Heat 1.1 (vertical stripes) and NCFM Heat 6.3 (horizontal stripes) as compared to fermentation cell numbers after conditioning (CN).

Figure 34:
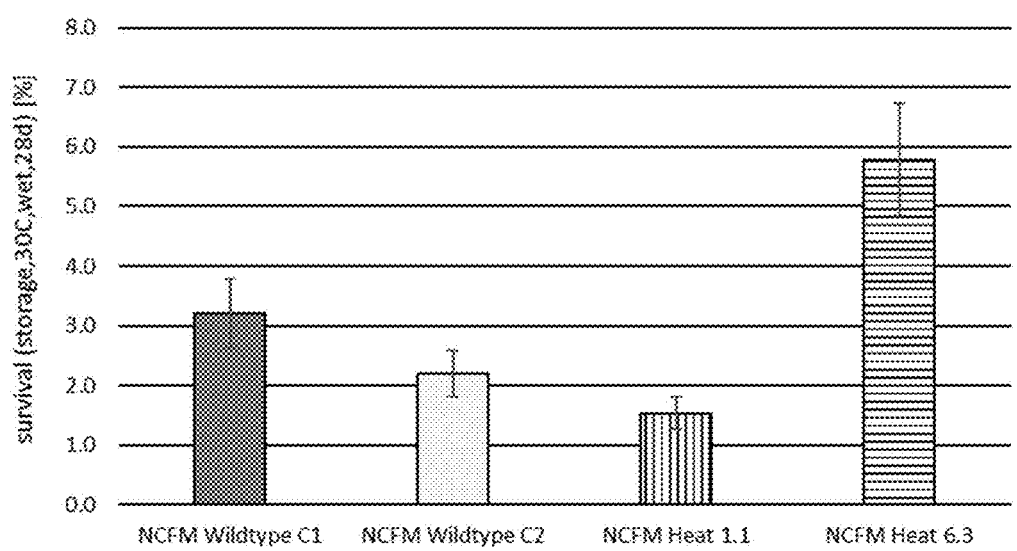

FIG. 34 is a graph showing survival of cells of cultures NCFM Wildtype C1 (solid grey), NCFM Wildtype C2 (light grey), NCFM Heat 1.1 (vertical lines) and NCFM Heat 6.3 (horizontal lines) in percent of cells before storage ("T0"), if stored for 28 d at 30° C. and 40% relative humidity.

Figure 35:
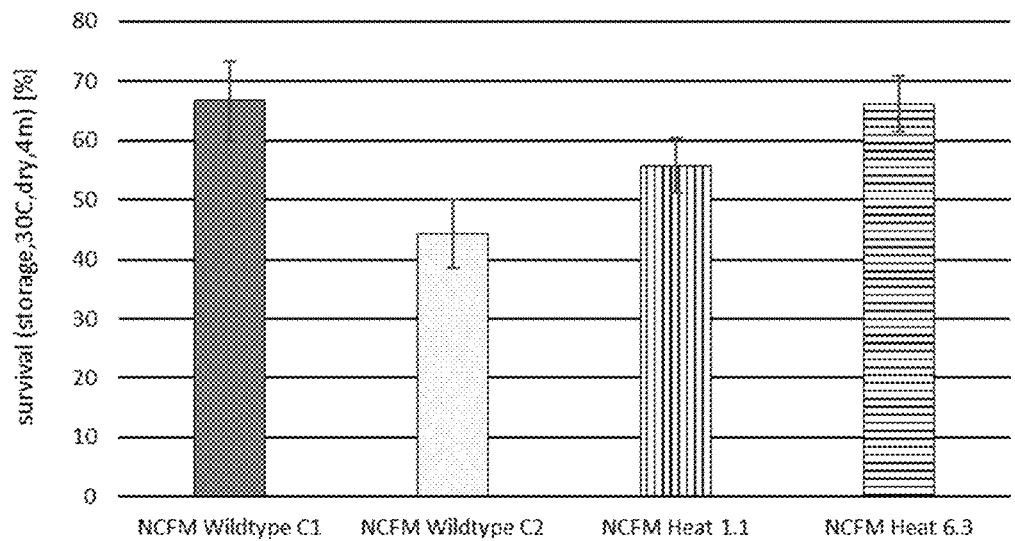

FIG. 35 is a graph showing survival of cells of cultures NCFM Wildtype C1 (solid dark grey), NCFM Wildtype C2 (solid light grey), NCFM Heat 1.1 (vertical lines) and NCFM Heat 6.3 (horizontal lines) in percent of cells before storage ("T0"), if stored for 4 m at 30° C. and low relative humidity.

Figure 36:
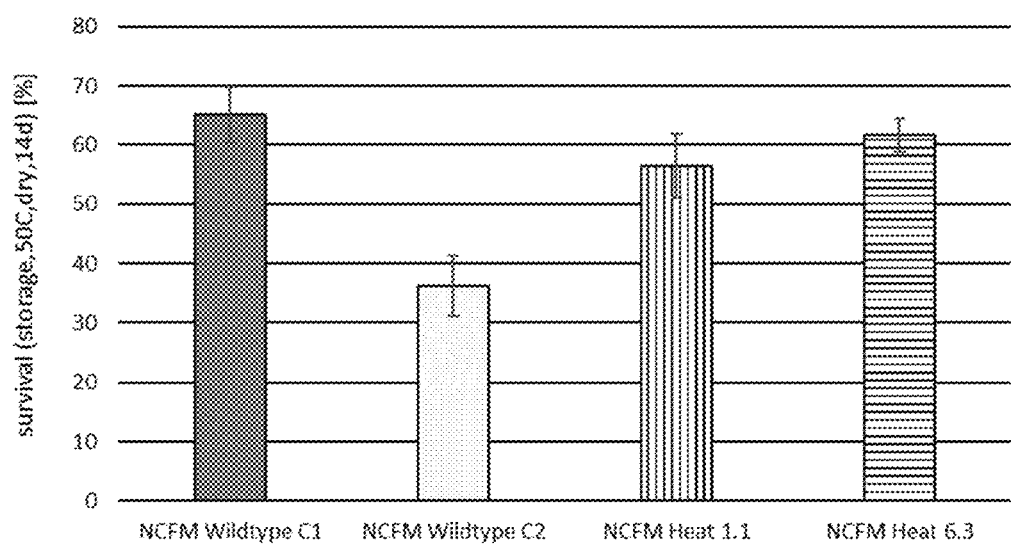

FIG. 36 is a graph showing survival of cells of cultures NCFM Wildtype C1 (solid dark grey), NCFM Wildtype C2 (solid light grey), NCFM Heat 1.1 (vertical lines) and NCFM Heat 6.3 (horizontal lines) in percent of cells before storage ("T0"), if stored for 14 d at 50° C. and low relative humidity.

Figure 37:
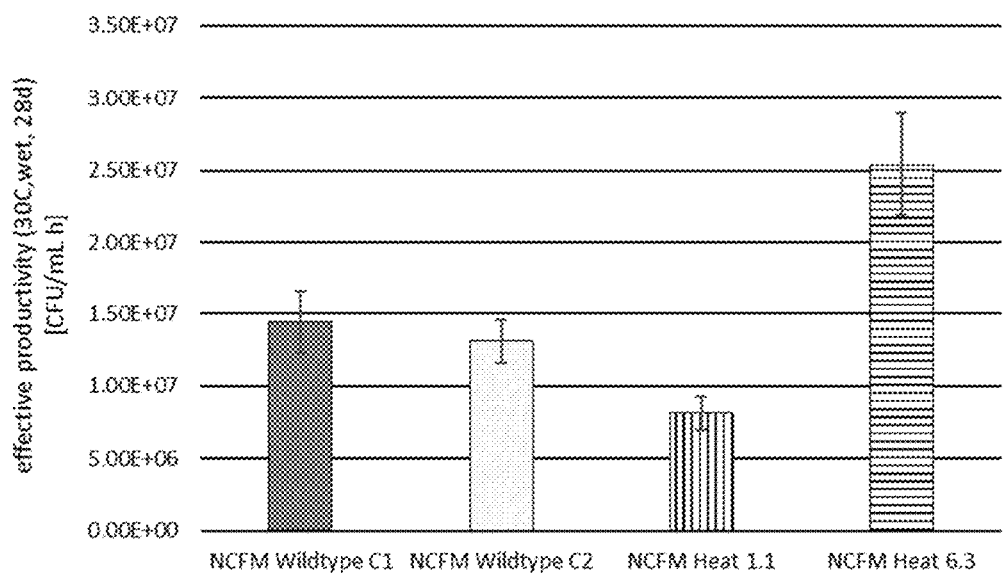

FIG. 37 is a graph showing effective productivity of cultures NCFM Wildtype C1 (solid dark grey), NCFM Wildtype C2 (solid light grey), NCFM Heat 1.1 (vertical lines) and NCFM Heat 6.3 (horizontal lines) if subsequently stored for 28 d at 30 C and 40% relative humidity.

Figure 38:
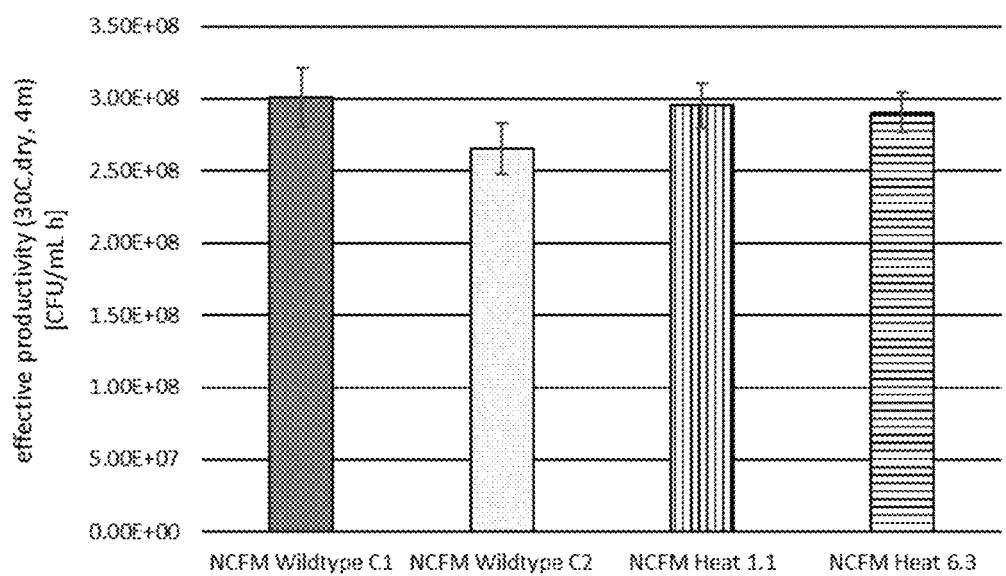

FIG. 38 is a graph showing effective productivity of cultures NCFM Wildtype C1 (solid dark grey), NCFM Wildtype C2 (solid light grey), NCFM Heat 1.1 (vertical lines) and NCFM Heat 6.3 (horizontal lines) if subsequently stored for 4 m at 30 C and low relative humidity.

Figure 39:
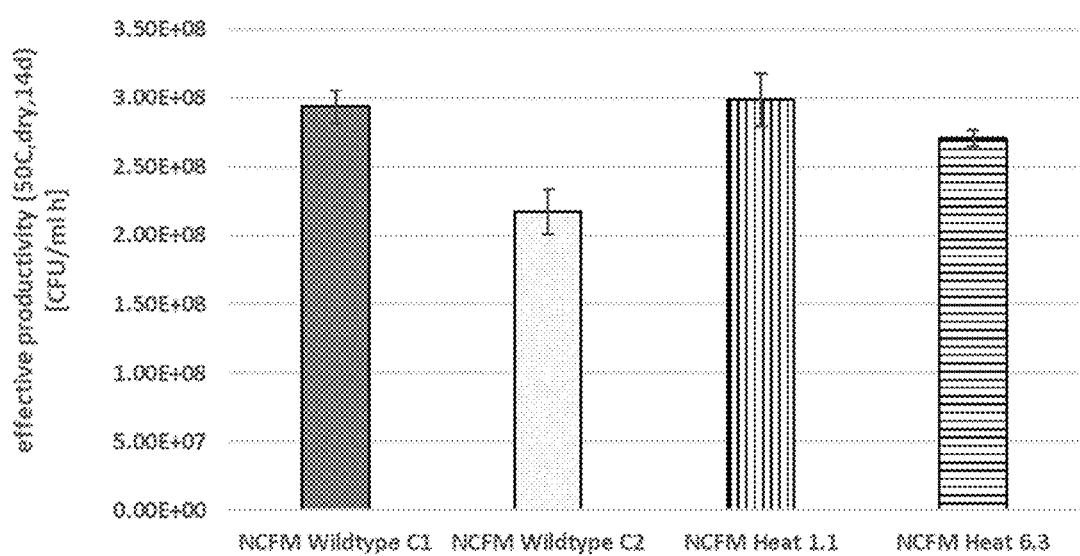

FIG. 39 is a graph showing effective productivity of cultures NCFM Wildtype C1 (solid dark grey), NCFM Wildtype C2 (solid light grey), NCFM Heat 1.1 (vertical lines) and NCFM Heat 6.3 (horizontal lines) if subsequently stored for 14 d at 50° C. and low relative humidity The following sequences comply with 37 C.F.R. § 1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (1998) and the sequence listing requirements of the EPO and PCT (Rules 5.2 and 49.5(a-bis), and Section 208 and Annex C of the Administrative Instructions). The symbols and format used for nucleotide and amino acid sequence data comply with the rules set forth in 37 C.F.R. § 1.822.

SEQ ID NO:1 is the nucleotide sequence of the genome of the ancestral strain, *Bifidobacterium animalis lactis*, Bi-07 corresponding to the Genbank accession number NC_017867.

SEQ ID NO: 2 is the nucleotide sequence of the genome of the ancestral strain *Lactobacillus acidophilus* NCFM® corresponding to the Genbank accession number NC_006814

SEQ ID NO:3 is the first portion of the genome sequence of the ancestral strain of *Lactobacillus paracasei*, Contig A.

SEQ ID NO:4 is the second portion of the genome sequence of the ancestral stain of *Lactobacillus paracasei*, Contig B.

SEQ ID NO:5 is the sequence of a plasmid residing in the genome of the ancestral stain of *Lactobacillus paracasei*.

DETAILED DESCRIPTION OF THE INVENTION

Unless defined otherwise, all technical and scientific terms used herein have the same meaning as commonly understood by one of ordinary skill in the art to which this disclosure belongs. Singleton, et al., DICTIONARY OF MICROBIOLOGY AND MOLECULAR BIOLOGY by Singleton and Sainsbury (Singleton and Sainsbury, 2006) and THE HARPER COLLINS DICTIONARY OF BIOLOGY by Hale and Marham, (Hale and Marham, 1991) provide one of skill with a general dictionary of many of the terms used in this disclosure.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

The headings provided herein are not limitations of the various aspects or embodiments of this disclosure which can be had by reference to the specification as a whole. Accordingly, the terms defined immediately below are more fully defined by reference to the specification as a whole.

Other definitions of terms may appear throughout the specification. Before the exemplary embodiments are described in more detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

The following definitions and abbreviations are to be use for the interpretation of the claims and the specification.

The term "invention" or "present invention" as used herein is a non-limiting term and is not intended to refer to any single embodiment of the particular invention but encompasses all possible embodiments as described in the specification and the claims.

As used herein, the term "about" modifying the quantity of an ingredient or reactant of the invention employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities. In one embodiment, the term "about" means within 10% of the reported numerical value, preferably within 5% of the reported numerical value.

The abbreviation "ATCC" refers to the American Type Culture Collection International Depository, Manassas, VA, USA. "ATCC No." refers to the accession number of cultures on deposit with ATCC.

The abbreviation "DSM" refers to the accession number of cultures deposited with the German Collection of Microorganisms and Cell Cultures (DSMZ).

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The term "deletion" or "disruption" when used in reference to a gene, genetic construct or the like with refer to the partial or complete inactivation of nucleic acid sequence as it normally functions. A deletion in a sequence means the removal of all or part of the sequence which may results in the complete or partial inactivation of the sequence. A disruption or insertion in the sequence will refer to the addition of an element within the sequence that will again decrease or eliminate the ability of the sequence to function normally. Deletions or disruptions will render the gene or coding sequence "non-functional" within the meaning of the present invention.

"Gene" refers to a nucleic acid fragment that expresses a specific protein, and may refer to the coding region alone or may include regulatory sequences preceding (5' non-coding sequences) and following (3' non-coding sequences) the coding sequence.

"Intergenic region" means a stretch of DNA sequences located between genes. Intergenic regions are a subset of noncoding DNA.

"Genome" means a collection of polynucleotide sequences containing the entirety of the genetic information that defines the organisms. The Genomic sequences of an organism includes both the genes and the non-coding sequences of the DNA. Typically as used herein genome will refer to a prokaryotic genome which is contained on a single chromosome.

"Phenotype" means the detectable characteristics of a cell or organism. A "beneficial Phenotype" means a phenotype of an evolved cell that enhances its storage stability, effective productivity including enhancements in cell growth, tolerance to a stressor or a stress condition including but not limited to tolerance to heat, tolerance to osmotic pressure, tolerance to surface active agents and tolerance to oxidative stress.

"Polynucleotide", "nucleic acid sequence", "nucleotide sequence", or "nucleic acid fragment" are used interchangeably and refer to a polymer of ribonucleic acid (RNA) or deoxyribonucleic acid (DNA) that is single- or double-stranded, optionally containing synthetic, non-natural or altered nucleotide bases. Nucleotides (usually found in their 5'-monophosphate form) are referred to by their single letter designation as follows: "A" for adenylate or deoxyadenylate (for RNA or DNA, respectively), "C" for cytidylate or deoxycytidylate, "G" for guanylate or deoxyguanylate, "U" for uridylate, "T" for deoxythymidylate, "R" for purines (A or G), "Y" for pyrimidines (C or T), "K" for G or T, "H" for A or C or T, "I" for inosine, and "N" for any nucleotide. "Regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include, but are not limited to, promoters, translation leader sequences, introns, polyadenylation recognition sequences, RNA processing sites, effector binding sites and stem-loop structures.

The term "bacterium" or "bacterial" or "prokaryotic" will be used herein to refer to any bacterial species, strains or combinations thereof, and is not limited to strains currently accepted as probiotics. However, bacterial strains used in the present invention are those that are suitable for human and/or animal consumption. A skilled person will be readily aware of specific species and or strains from within the genera described herein which are used in the food and/or agricultural industries and which are generally considered suitable for human and/or animal consumption. Such bacterial strains are typically non-pathogenic, and may be generally regarded as safe for human use (e.g. GRAS). The term "bacterium" is generally used to refer to whole bacteria, for example whole viable bacteria. Bacteria suitable for use in the present invention include, but are not limited to, *Bifidobacterium, Lactobacillus, Brevibacterium, Propionibacterium, Lactococcus, Streptococcus.*

As used herein, the term "mutant" refers to any microorganism resulting from modification of the parent (i.e. deposited) strain. For example, a mutant may be a microorganism resulting from genetically modifying a deposited strain.

The term "mutation" means a change in the nucleotide sequence of an organism that can include a substitution of one or more nucleotides with one or more different nucleotides, or a deletion or insertion of one or more nucleotides. Within the context of the invention mutations may occur naturally or as the result of the presence of a stress condition.

The term "*Bifidobacterium*" refers to bacteria that are gram-positive and non-acid fast. They are pleomorphic, cornyform rods and usually appear clubbed or branching. They are generally non-motile and non-spore forming. Species of *Bifidobacterium* include *B. actinocoloniiforme B. adolescentis B. angulatum B. animalis B. aquikefiri B. asteroids B. biavatii B. bifidum B. bohemicum B. bombi B. bourn B. breve B. callitrichos B. catenulatum B. choerinum B. commune B. coryneforme B. cuniculi B. crudilactis B. denticolens B. dentium B. eulemuris B. faecale B. gallicum B. gallinarum B. hapali B. indicum B. inopinatum B. kashiwanohense B. infantis B. lemurum B. longum B. magnum B. metycicum B. minimum B. mongoliense B. moukalabense B. myosotis B. pseudocatenulatum B. pseudolongum B. psychraerophilum B. pullorum B. reuteri B. ruminantium B. saguini B. scardovii B. stellenboschense B. stercoris B. saeculare B. subtile B. thermacidophilum B. thermophilum B. tissieri* and *B. tsurumiense.* A preferred subspecies in the present invention is *B. animalis* subps. *lactis.* A preferred *Bifidobacterium* strain in the present invention is *B. animalis* subsp. *lactis* Bi-07. As used herein "*Bifidobacterium* Bi-07, ATCC PTA SD5220" refers to the ancestral *Bifidobacterium* strain from which the BBi strains of the invention were evolved.

The term "*Lactobacillus*" refers a genus of bacteria that is a Gram-positive, facultative anaerobe that is rod-shaped, and non-spore forming, with a DNA base composition of less than 53% G+C. They generally are non-respiratory and lack catalase. They ferment glucose primarily to lactic acid, or to lactic acid, $CO_2$ and ethanol. Generally, *Lactobacillus* grows anaerobically, but unlike most anaerobes, they grow in the presence of $O_2$ as "aerotolerant anaerobes". Although they lack catalase, they possess superoxide dismutase and have alternative means to detoxify peroxide radicals, generally through peroxidase enzymes. Species of *Lactobacillus* include *L. acetotolerans, L. acidifarinae L. acidipiscis L. acidophilus, L. agilis, L. algidus, L. alimentarius L. amylolyticus L. amylophilus L. amylotrophicus L. amylovorus, L. animalis, L. antri, L. apodeme L. aviaries L. bifermentans L. brevis L. buchneri L. cameffiae, L. casei L. catenaformis L. ceti L. coleohominis L. collinoides L. composti L. concavus L. coryniformis L. crispatus L. crustorum*

*L. curvatus L. delbrueckii L. delbrueckii* subsp. *bulgaricus L. delbrueckii* subsp. *delbrueckii L. delbrueckii* subsp. *lactis L. dextrinicus L. diolivorans L. equi L. equigenerosi L. farraginis L. farciminis L. fermentum L. fornicalis L. fructivorans L. frumenti L. fuchuensis L. gallinarum L. gasseri L. gastricus L. ghanensis L. graminis L. hammesii L. hamster L. harbinensis L. hayakitensis L. helveticus L. hilgardii L. homohiochii L. iners L. ingluviei L. intestinalis L. jensenii L. johnsonii L. kalixensis L. kefiranofaciens L. kefiri L. kimchii L. kitasatonis L. kunkeei L. leichmannii L. lindneri L. malefermentans L. mali L. manihotivorans L. mindensis L. mucosae L. murinus L. nagelii L. namurensis L. nantensis L. oligofermentans L. oris L. panis L. pantheris L. parabrevis L. parabuchneri L. paracasei L. paracoffinoides L. parafarraginis L. parakefiri L. paralimentarius L. paraplantarum L. pentosus L. perolens L. plantarum L. pontis L. protectus L. psittaci L. rennini L. reuteri L. rhamnosus L. rimae L. rogosae L. rossiae L. ruminis L. saerimneri L. sakei L. salivarius L. sanfranciscensis L. satsumensis L. secaliphilus L. sharpeae L. siliginis L. spicheri L. suebicus L. thailandensis L. ultunensis L. vaccinostercus L. vaginalis L. versmoldensis L. vini L. vitulinus L. zeae* and *L. zymae.* As used herein "*Lactobacillus acidophilus* NCFM ATCC 700396" refers to the ancestral strain of *Lactobacillus acidophilus* NCFM from which the *L. acidophilus* strains of the invention were evolved.

The term "Adaptation" describes a process by which an organism becomes better suited for an environment through the inheritance of beneficial traits. Adaptation is a multigenerational process during which beneficial mutations arise in a population and can increase in frequency over time due to the benefit they confer. In sexually reproducing organisms, beneficial traits in different parents can be recombined through sexual recombination and passed on together to the offspring.

The term "Selection" describes a process that results in a change in allele frequencies in a population over time as a result of competition. Beneficial alleles increase the competitive fitness and lead to increased reproduction and survival of individuals with these alleles, resulting in increased frequency of these beneficial alleles in the population over time.

The term "genetic variation" describes the total set of genetic mutations in all the genes in an assembly of different individuals or in a population. A clonal population has no genetic variation. Genetic variation in a population can increase through processes like mutations, recombination, hybridization, horizontal gene transfer, copy number variation to name a few. Genetic variation can decrease through selection or genetic drift, which is due to random sampling error.

The term "Experimental evolution" describes a method that replicates the process of natural selection in the laboratory. Most experiments performed rely on a combination of the creation of genetic variation through natural mutation rates and selection through competition, resulting in better adapted individuals with increased fitness in the selective environment than the ancestor. The process of natural selection is replicated by working with large population sizes and over many generations (100+). Experimental evolution can also include experiments in which the fitness of the evolved populations decreases, which is often the case in mutation accumulation experiments, where populations are bottlenecked (reduced to a single cell or sibling mate pair) to reduce competition resulting in the accumulation of a random set of mutations (not such beneficial mutations). Experimental evolution experiments can be conducted in different selection regimes, such as but not limited to batch cultures (flask transfers), continuous culture vessels (e.g. chemostats, turbidostats, morbidostats), agar plates or microfluidic droplets.

The term "Ancestor" or "ancestral strain" describes an individual from which individuals with similar, but different genotypes are derived. This can be the common ancestor of two phylogenetically related species or the starting clone of an experimental evolution experiment. Here the term "Ancestor" is used to refer to the initial clones used to seed the replicated populations of the evolution experiments. In this case the "Ancestors" are clones currently sold as probiotics as part of the HOWARU® brand.

The term "Evolutionary time" refers to a time frame during which an evolutionary process such as adaptation takes place, which requires hundreds to thousands of generations. It is different from ecological time which is much shorter as ecological processes happen much faster than evolutionary processes.

The term "Natural mutation" refers to mutations that occur due to errors during replication, DNA damage or DNA repair. It relies on the natural mutation rate, which describes how often a nucleotide is changed in the genome per generation and genome or how many deletions or insertions occur in the genome per generation and genome. The natural mutation rate is an adaptive trait and differs among organisms and environments.

The term "stressor" means any environmental stress to which a bacterial strain may be exposed to and which will, over time, produce genetic changes in the bacteria. Stressors of particular interest in the present invention are those that are associated with the manufacturing protocols for probiotics and included but are not limited to salt or osmotic stressors, heat stressors, oxidative stressors and acid stressors. Strains that have been exposed to heat stress will be referred to herein as "heat evolved". Strains that have been exposed to osmotic stress will be referred to herein as "salt evolved".

The term "storage stability" characterizes the ability of a collection of cells to maintain their viability during storage. A cell in this context is considered viable if it can grow and multiply again if transferred into permissive conditions. Assay methods to assess storage stability comprise, but are not limited, to most probable number (MPN) analyses or the plating and counting of colony forming units (CFU). Due to the complexity of cells, the loss of viability of a collection of cells can be described as a stochastic process at the level of single cells. However, for a collection of cells, the collection's expected decay rate or fraction of viable cells can be characterized (e.g. by determining the MPN or CFU concentration at start and end of a storage experiment) and is often used equivalently to the term storage stability. In case the collection of cells consists predominantly of monoclonal cells, the determined rate of decay in MPN or CFU numbers or decrease in fraction of viable cells is interchangeable with the storage stability of a strain.

Storage stability of cells can be tested at different conditions with or without formulations and with or without specific packaging. Important determinants of the conditions are, but are not limited to, the temperature, relative humidity, chemical composition (e.g. oxygen-content in a gas atmosphere) and radiation levels of the environment. In addition, storage stability depends on the nature of the cells (e.g. type of strains used), the way the cells are produced, as well as the downstream unit operations in which the cells are processed.

Conditions for testing storage stability of beneficial microbes, even if their use as an active pharmaceutical ingredient is not intended, usually follow the guidance as laid out in the document "Stability testing of active pharmaceutical ingredients and finished pharmaceutical products" as published as Annex 2 in the World Health Organization (WHO) Technical Report Series, No. 953, 2009 (1), as well as the ICH guideline "Q1A(R2): Stability Testing of New Drug Substances and Products" released by the International Council for Harmonization of Technical Requirements for Pharmaceuticals for Human Use (ICH) in 2003. Both documents are herewith included by reference.

In order to standardize testing for storage stability, the International Council for Harmonisation of Technical Requirements for Pharmaceuticals for Human Use (ICH) divided the world into five different zones:

| | |
|---|---|
| Zone I | Temperate zone |
| Zone II | Mediterranean/subtropical zone |
| Zone III | Hot dry zone |
| Zone IVa | Hot humid/tropical zone |
| Zoen IVb | Hot/higher humidity |

The climate conditions for these zones in long-term storage stability testing are usually reflected as

| | | |
|---|---|---|
| Zone I | 21° C. ± 2° C. | 45% RH ± 5% RH |
| Zone II | 25° C. ± 2° C. | 60% RH ± 5% RH |
| Zone III | 30° C. ± 2° C. | 35% RH ± 5% RH |
| Zone IVa | 30° C. ± 2° C. | 65% RH ± 5% RH |
| Zone IVb | 30° C. ± 2° C. | 75% RH ± 5% RH |

Frequently also higher temperatures than 30° C.±2° C. as described in above mentioned ICH long-term testing recommendations are used for assessing storage stability, comprising but not limited to e.g. 38° C.±2° C., 40° C.±2° C., or 50° C.±2° C., in order to "accelerate" decay processes and allow for faster testing of storage stability within shorter time frame.

The term "critical process parameters" or "CPP" are key variables affecting the manufacturing process of live cell products that are set and/or controlled. Major CPPs in the fermentation process comprise, but are not limited to (i) pH, (ii) temperature, (iii) stirrer speed, (iv) gas input, (v) elapsed process time, (vi) inoculum ratio, (vii) media composition, (viii) media preparation, and (ix) composition of gas input.

The term "effective productivity" defines a productivity metric. It relates the classical concept of "productivity", characterizing the number of cells produced per volume and time in a production process, with the stability of the produced cells as a formulated product on the shelf at specified conditions. The total time ($t_{total}$) for assessing effective productivity of a process comprises (i) the time for preparing the fermenter ($t_{prep}$), (ii) the time from inoculum of the fermenter to harvest of the fermenter ($t_{grow}$), and (iii) the time required for downstream processing and formulating the cells into the finished product ($t_{form}$), and can be determined according to:

$$t_{total} = t_{prep} + t_{grow} + t_{from}$$

The total cell product ($\Delta cp_{total}$) is the number of cells that are viable at the end of storage time resulting from a given volume in the last-stage fermenter, corrected for the fraction of cell product that was used to initiate the process (seed vials and/or inoculum). From these key metrics, "effective productivity" ($p_{effective}$) for a given manufacturing process and specific to the applied storage conditions can be derived according to:

$$p_{effective} = \frac{\Delta c p_{total}}{t_{total}} = \frac{\Delta c p_{total}}{(t_{prep} + t_{grow} + t_{form})}$$

Typically, effective productivity refers only to the last stage fermenter. Also, frequently the downstream and formulation unit operations of a process are kept the same and/or exhibit fairly similar time requirements, and can therefore be left out. Last but not least, the amount of inoculum introduced in the process is usually negligible when compared to the final cell concentration in the fermenter at harvest, and therefore can be ignored in a first approximation, simplifying the formula to:

$$p_{effective} \approx \frac{c p_{total}}{t_{grow (last\ stage\ fermenter)}}$$

with the total cell product ($cp_{total}$) representing the number of cells that are viable at the end of storage time resulting from a given volume in the last-stage fermenter without any correction for the fraction of cell product that was used to initiate the process (seed vials and/or inoculum). In the context of the described work, methods and tools to optimize "effective productivity" are introduced, e.g. allowing for the selection of improved strains or the optimization of critical process parameters.

As used herein, the term "probiotic" refers to a live microorganism which, when administered in adequate amounts, confers a health benefit on the recipient. They are suitable for human consumption, are non-pathogenic and non-toxic. These probiotic strains generally have the ability to survive the passage through the upper part of the digestive tract. Probiotic bacteria typically exercise their beneficial effect on health on the one hand via ecological interactions with the resident flora in the digestive tract, and on the other hand via their ability to influence the immune system in a positive manner via the "GALT" (gut-associated lymphoid tissue). Probiotic bacteria, when given in a sufficient number, have the ability to progress live through the intestine. However, they do not cross the intestinal barrier and their primary effects are therefore induced in the lumen and/or the wall of the gastrointestinal tract. They then form part of the resident microbiota during the administration period. This colonization (or transient colonization) allows the probiotic bacteria to exercise a beneficial effect, such as the repression of potentially pathogenic micro-organisms present in the flora and interactions with the immune system of the intestine.

The invention relates to novel evolved strains of *Bifidobacterium* and *Lactobacillus* having a unique genetic profile and have demonstrated enhanced increased storage stability or effective productivity. Storage stability has been measured by a unique series of assays that has allowed the applicants to select evolved strains that have a surprising increase in storage stability and effective productivity. The invention additionally provides methods for the experimental evolution of probiotic strains to develop underlying genetic modifications that are specifically linked to increased storage stability.

Probiotic Strains:
Bifidobacterium:

The invention provides evolved strains of *Bifidobacterium* having improved storage stability. Bifidobacteria comprise the predominant intestinal microbiota in infants and they are abundant also in the adult population comprising up to 10% of the normal intestinal microbiota, although their numbers start to decline in the elderly. An individual is typically colonized with 1-4 bifidobacterial species (Mättö et al., 2004). In addition to the individual variation, composition of bifidobacterial species varies between different age groups. *B. longum* biovar *infantis*, *B. breve* and *B. bifidum* are the most prevalent species in infants and *B. longum* biovar *longum*, *B. adolescentis*, *B. bifidum* and *B. catenulatum* in adults. Variation in the number of bifidobacteria (Mueller et al., 2006,) and composition of species (Matto et al., 2004) between geographic regions has also been reported. Bifidobacteria are generally considered as health promoting bacteria and an increase in bifidobacterial numbers in the intestine is typically used as an end-point in intervention studies with intestinal health-targeted products such as probiotics and prebiotics.

*Bifidobacterium* spp. strains are used as probiotics. However, due to technological challenges related to stability of the genus, fairly few distinct species and strains, mainly *B. animalis* subps. *lactis*, are available on the current market. Bifidobacteria or bifidobacteria-containing strain mixtures have shown promising results e.g. in alleviation of the symptoms of irritable bowel syndrome (Brenner and Chey, 2009), inflammatory bowel disease (Macfarlane et al., 2009), diarrhea (Chouraqui et al., 2004), eczema (Kim et al., 2010), asthma prevention (Yoo et al., 2007) and common cold (de Vrese et al., 2005).

Accordingly, *Bifidobacterium* ssp are prime targets for probiotic applications and strains having increased storage stability will be of particular interest. Any species of *Bifidobacterium* is applicable in the present invention and may be subjected to the experimental evolution protocols described herein where the species *Bifidobacterium animalis*, *Bifidobacterium breve*, *Bifidobacterium infantis*, *Bifidobacterium lactis*, *Bifidobacterium longum*, *Bifidobacterium bifidum* and *Bifidobacterium adolescentis* are preferred and where strains of *Bifidobacterium animalis lactis*, and in particular strain Bi-07 is most preferred. Bi-07 is commercially available from DuPont, and has been deposited at the ATCC under the deposit number PTA-SD5220. It is fully sequenced and the sequence if available under the accession number NC 017867.

Lactobacillus

In addition to evolved strains of *Bifidobacterium* the invention provides strains of *Lactobacillus* that demonstrate increased storage stability. Any species of *Lactobacillus* may be used in the invention and subjected to experimental evolution protocols described herein, where the species *L. acidophilus*, *L. curvatus*, *L. rhamnosus*, *L. casei*, *L. paracasei*, *L. salivarius*, *L. reuteri*, *L. salivarius*, *L. gaffinarum*, *L. crispatus*, *L. agilis* are preferred and the species *Lactobacillus paracasei* and *Lactobacillus acidophilus* NCFM is most preferred. *Lactobacillus paracasei* is a Gram-positive, non-spore formingrod that is a common inhabitant of the human intestinal tract. *L. paracasei* strains are also found naturally in fermented vegetables, milk and meat. Strains of this species are used in many food products, including traditional fermented milks and cheese. Selected strains of this species are also used in probiotic foods and dietary supplements. *Lactobacillus paracasei* Lpc-37 is commercially available from DuPont. It has been genetically characterized and properly classified as *Lactobacillus paracasei* by 16S rRNA gene sequencing. *L. paracasei* Lpc-37 is a strain isolated from a dairy source and has been deposited in the American Type Culture Collection as SD5275. Its genome has been fully sequenced and is available on NCBI under the accession number NOKL00000000. *Lactobacillus acidophilus* is a species of Gram-positive bacteria in the genus *Lactobacillus*. *L. acidophilus* is a homofermentative, microaerophilic species, fermenting sugars into lactic acid, and grows readily at rather low pH values (below pH 5.0) and has an optimum growth temperature of around 37° C. (99° F.). *L. acidophilus* occurs naturally in the human and animal gastrointestinal tract and mouth and has been shown to have probiotic efficacy. Its genome has been sequenced. *Lactobacillus acidophilus* NCFM® was isolated from a human fecal sample in the early 1970s. The strain designation NCFM® is derived from "North Carolina Food Microbiology," the research laboratory at North Carolina State University (NCSU) where isolation took place. The strain has been shown to have beneficial effects on humans when ingested orally and has been sold commercially for more than 25 years. The strain is available from ATCC as 700396. The genome has been completely sequenced and is available from NCBI under the accession number NC 006814.

Experimental Evolution Protocols

The methods of the invention utilize experimental evolution protocols to evolve various probiotic strains to attain enhanced or improved storage stability. The present protocols involve subjecting ancestral strains to a variety of stresses in an iterative fashion to create genetic changes in the strains that manifest phenotypically both in the form of increased tolerance to the stress and in increased storage stability of the strain. A variety of stressors may be employed in the experimental evolution protocols including heat, salt, surfactants, and acids or bases. A typical experimental evolution protocol begins by selecting a specific ancestral strain having well documented probiotic properties. Each strain is grown up in a suitable culture media, plated on agar plates and single colonies are isolated, grown up and frozen to create a bank of frozen stock. These single colonies from the stock are then used to found replicated populations that are cultured and subjected to various concentrations of a stressor for multiple generations, where at least 25, 30, 35, 40, 45, 50, 55, 60, 65, 70, 75, 80, 85, 90, 95, 100 generations will be expected to produce evolved strains. Those of skill in the art will appreciate that culturing in excess of 100 or 300 or 400 or 500 generations may be required to evolve strains depending on the stressor used and the underlying genetic characteristics of the strain. During the selection experiment, the concentration of the stressors can be gradually increased. In some circumstances the rate of mutation can be increased by the exposure to alternate mutagenic agents in combination with the stressor. Such mutagenic agents are common and well known in the art and include but are not limited to UV exposure, chemical mutagenesis (e.g. ethyl methanesulfonate, nitrous acid, ethidium bromide, mitomycin C (not limited to)), and transposon mediated mutagenesis.

Where heat is used as a stressor the exposure temperature should be above the normal growth temperature of the wildtype or ancestral strain and preferably, 1° C. to 20° C. above the normal growth temperature. The optimal temperatures for selecting evolved strains will vary with the bacteria chosen and the progress of the selection experiment. For example, where the strain is a species of *Bifidobacterium* the selection temperature may be about 41° C. to about 50° C.

Similarly, where osmotic stress is introduced by exposure to salt the concentrations of the salt will vary depending on the compound used and the growth characteristics of the bacteria. A variety of salts may be used as stressors in the invention including but not limited to NaCl, KCl, $CaCl_2$. When using NaCl or KCl for example concentrations may range from at least about 0.2% to about 1.2% in the growth medium, or at least about 0.4% to at least about 1.0%, or at least about 0.5% or at least about 0.5% to at least about 0.8% in the growth medium where at least about 0.4% to at least about 0.8% is preferred.

Surface active agents such as surfactants may be used to introduce cell envelop stress into the bacterial population. Surface active agents are well known and commonly used and include but are not limited to anionic surfactants, such as for example, Sodium dodecyl sulfate (SDS), sodium lauryl sulfate (SLS), ammonium lauryl sulfate (ALS), or their ethoxylated companions, sodium laureth sulfate (SLES); or cationic surfactants such as for example amines, alkylimidazolines, alkoxylated amines, and quaternized ammonium compounds; or amphoteric surfactants or non-ionic surfactants. Preferred for use in the present invention is SDS, where typical concentration of surfactant will be close to the sublethal concentrations and range from about 0.008% to about 0.01% in the growth medium.

Cells undergoing experimental evolution will be grown up in liquid media and diluted to a specific OD into fresh culture broth supplemented with the stressor if appropriate or exposed to higher temperature. Generally, the clonal populations are transferred every 24-48 hours after the average OD of the population is determined. The number of generations per day is calculated on the basis of the following formula:

$$\text{Number of generations} = \frac{\log\left(\frac{\text{Final } OD}{\text{Initial } OD}\right)}{\log 2}$$

The number of generations is monitored. When an increase in populations density is seen as compared with the ancestral strain then selection pressure is increased. Where the number of generations is seen to decrease and the populations cannot make up the dilution at transfer, the selection pressure may be decreased in order to maintain a viable population. In this fashion, the selection pressure is maintained at the highest possible concentration of stressor over the life of the evolution process. At the end of the evolution process populations may be frozen for further study.

Assays to Identify Improved Strains

A number of assays are employed in the present invention to determine the relative storage stability or effective productivity of the evolved strains.

Spot Plating Assay

The spot plating assay was used as the first screen to identify those stress evolved clones on the basis of improved storage stability. To identify improved strains, single colonies were isolated from the evolved populations and tested for improved survival during storage in stressful conditions which span a range of temperatures (typically from 4 C to 50 C) and a range to different levels of humidity (0-65%) in a spot plating assay (see General Methods for a detailed description of the spot plating assay). The isolated clones were grown up as single clones, and a standard amount of cells are mixed with a stabilizer buffer. The stabilized cells were flash frozen and freeze dried before being exposed to the storage conditions. At regular intervals, the stored cell pellets were rehydrated with the same culture media used for the selections but without any stressor added, serially diluted in 10-fold dilutions and plated onto agar plates. Viability could also be assessed using most probable number assays (MPN). The highest dilution at which a stored sample was still able to grow was recorded. The most viable clones were selected from the spot plating assay and subjected to the accelerated assay to gain more accurate measurements of the clone's ability to survive different long-term storage conditions. Clones that were tested in the accelerated assays were sequenced using whole genome sequencing to identify mutations that occurred during the selection experiment.

Accelerated Assay

Clones identified in the spot plating assay above were subjected a sequential series of assays to evaluate storage stability and effective productivity. Briefly, evolved clones and there corresponding ancestral strains (as controls) were grown in a bio-reactor under controlled conditions of pH, temperature and stirrer speed. Following bio-reactor cultivation the clones were subjected to small-scale plate assays to determine storage stability and effective productivity under various storage conditions, including storage of "wet" conditions at 25° C. or 30° C., 40° C. and at a relative humidity that may range from about 35% to about 40% to about 60% to about 70% or to about 75% or in the alternative under "dry" conditions where cells are stored at about 50° C. and a relative humidity of less than about 1%. Based on determination of dry cell weight and CFU, storage stability and effective productivity of the evolved clones opposite the ancestral strains were determined.

PREFERRED EMBODIMENTS

Evolved Strains of *Bifidobacterium animalis* Supspecies *lactis* Bi-07 (BBi)

BBi strains were evolved in the presence of a number of stressors including elevated temperature, salt (KCl, NaCl), surface active agents, (SDS), and oxidizing agents (peroxide). Whereas exposure to peroxide and SDS gave inconclusive results, clones evolved against osmotic and heat stress demonstrated clear improvement in storage stability and effective productivity as compared with the ancestral strain.

Heat-Evolved Clones

At least three heat-evolved populations had clones with improved storage stability. Two clones were chosen from two different populations, (BBi Heat 4.1 and BBi Heat 6.6), and their storage stability tested under wet and dry conditions in the accelerated assays. The CFUs at the end of fermentation (end of run, EOR) of the evolved strains did not differ from the unevolved controls but it took the evolved clones about 2 hours longer to reach the end of fermentation than the unevolved control. One of the clones, Heat 4.1, showed >100% improved survival in wet conditions and 68% improvement in dry conditions. The other clone, Heat 6.6, also showed improvements. Taking overall survival into account (including survival during downstream processing and storage), both Heat 4.1 and Heat 6.6 performed significantly better in wet conditions for 14 days. After 137 days in dry conditions at 30° C., the number of colony-forming cells of the evolved strains is 5-50× better than the ancestral strain. In dry conditions, only Heat 4.1 shows improved overall survival after 14 days.

Salt-Evolved Clones

Seven clones from six NaCl-evolved and six KCl-evolved populations were tested for improved storage stability using the spot plating assay. Overall, all six KCl evolved populations had at least one clone with increased storage stability, while five NaCl-evolved populations had more stable clones (see examples). Of these more stable clones, two KCl-evolved, KCl 1.2 and KCl 5.5, and four NaCl-evolved strains, NaCl 2.7, NaCl 3.3, NaCl 5.1 and NaCl 6.2 were tested in the accelerated assays. All clones had higher CFU counts at the end of fermentation relative to the unevolved controls. Taking all the fermentations into account, none of the salt evolved clones improved in storage stability over 14 days at dry conditions, however under wet storage conditions, an overall improvement in survival was observed after 14 days in all but one salt evolved clone.

Physiological Differences of the Evolved Clones at the End of Fermentation

The evolved clones were analyzed for changes in energy charge as well as for organic acid and fatty acid composition opposite the ancestral strains. The energy charge of the cells differed considerably at the end of fermentation. Interestingly, both storage stable heat evolved clones had higher energy charges than the control or the salt-evolved clones. Similarly, the heat-evolved clones stand out with a slightly different metabolic profile by producing less lactate, acetate and ethanol, and more pyruvate and formate than the unevolved ancestral control. While the salt-evolved clones also produced more pyruvate, they made less formate and ethanol than the control. The fatty acid composition also showed considerable variation among the strains. Most notably, the heat-evolved clone BBi Heat 4.1 differed both from other evolved clone and the control with very little 16:0 fatty acids and a large proportion of unknowns. BBi Heat 6.6 was very similar to the control, while all other evolved clones has less 18:1 and more unknown fatty acids.

Genetic Changes

All clones tested in the accelerated assays were submitted for whole genome sequencing. Because the clones had independent evolutionary histories, mutations that evolved in multiple strains were of particular interest, especially when different independently evolved strains acquired different mutations in the same gene.

Mutations in the Heat-Evolved Populations

The heat-evolved clones with improved storage stability, Heat 4.1 and Heat 6.6, acquired 12 and 13 mutations, respectively (see examples). Seven of these mutations occurred in both independently evolved strains, while two of the mutations occurred in the same gene, but at different locations in the gene in the two evolved strains. The polyribonucleotide nucleotidyltransferase (EC 2.7.7.8), PNPase, and the response regulators consisting of a CheY-like receiver domain and a winged-helix DNA-binding domain are of particular interest, because we found mutations in both strains, but at different locations, suggesting convergent evolution.

Mutations in the Salt-Evolved Clones

We sequenced two clones KCl-evolved and four NaCl-evolved clones With the exception of one non-synonymous SNP in a putative glucose uptake permease and two mutations in intergenic regions, all mutations were synonymous SNPs. Three of those synonymous mutations also occurred in the two heat-evolved clones (mutations in arginine/ornithine antiporter ArcD, Pyridoxine biosynthesis glutamine aminotransferase glutaminase subunit, and SSU ribosomal protein S5p(S2e)), but were not found when sequencing the ancestral strain. The two KCl-evolved clones shared five more mutations: a SNP in an intergenic region between two hypothetical genes, a synonymous SNP in a Phosphoglucomutase, a non-synonymous SNP to a stop codon in a hydrolase, and non-synonymous SNPs in a hypothetical gene and in the response regulators consisting of a CheY-like receiver domain and a winged-helix DNA-binding. The latter SNP was the same R175L mutation in both strains, and was not found in the same gene in heat-evolved clones. The NaCl-evolved clones did not acquire any mutations in this gene. Among the four NaCl-evolved clones, we observed 16 mutations that occurred in all four clones. Five of them were synonymous SNPs, and one mutations was in an intergenic region between a putative amidotransferase and a hypothetical gene. None of the salt-evolved clones showed consistent improvement in storage stability. KCl 1.2, NaCl 2.7, and NaCl 6.2 showed some improvements in storage stability. Four mutations were unique to NaCl 2.7 and NaCl 6.2. One of them was a synonymous change in large transmembrane protein possibly involved in transport, another mutation was in an intergenic region between a uridylyltransferase and a transcriptional regulator of the ArsR family. A deletion in a hypothetical gene likely caused a frameshift. A V58M mutation evolved in TrkA, a potassium uptake protein in both improved, NaCl-evolved clones independently.

Evolved Strains of Lactobacillus paracasei (LCP37)

LCP37 strains were evolved in the presence of a number of stressors including elevated temperature, ox gall, salt (KCl, NaCl), surface active agents, (SDS), and oxidizing agents (peroxide). Two strains, a heat-evolved and a SDS-evolved clone, performed well after the spot plating assays and were moved forward into the accelerated assays.

Heat Evolved Clones

Results from the accelerated assays indicated that the heat-evolved stains from fermentation runs at pH 5.2 demonstrated increased storage stability under dry conditions (50° C. and no humidity), where the CFU and cell dry weight of this strain were comparable to the ancestral control.

Sequencing of the heat-evolved clone revealed 16 mutations, nine of them were non-synonymous mutation, four synonymous and three intergenic (Table A). A comparison was made of the protein abundance of the genes in the wildtype and heat-evolved clone. Of the 13 genes with mutations, proteomic data was generated for four genes: lagC_2, rpoB, htrA and ICMKMEMM_01590, an aspartate aminotransferase. Only one of them, HtrA was less abundant in the evolved clone, compared to the wildtype control both at pH=5.2 and pH=6.4.

TABLE A genetic mutations found in LCP37 heat evolved strains

| Description | Position | Contig | Change | Annotation |
| --- | --- | --- | --- | --- |
| scyllo-inositol 2-dehydrogenase (NAD(+)) | 242,968 | A | A→G | Q330Q (CAA→CAG) |

TABLE A-continued genetic mutations found in LCP37 heat evolved strains

| Description | Position | Contig | Change | Annotation |
|---|---|---|---|---|
| Dipeptide-binding protein DppE | 324,159 | A | G→T | G151V (GGC→GTC) |
| hypothetical protein/HTH-type transcriptional regulator DegA | 336,410 | A | A→G | intergenic (+332/−49) |
| Mannitol-1-phosphate 5-dehydrogenase/putative HTH-type transcriptional regulator YybR | 458,056 | A | G→C | intergenic (+240/+98) |
| Cobalt-dependent inorganic pyrophosphatase | 877,156 | A | C→T | R60W (CGG→TGG) |
| Cobalt-dependent inorganic pyrophosphatase | 877,419 | A | C→T | S147S (AGC→AGT) |
| putative glucose uptake protein GlcU | 1,222,089 | A | G→A | G275S (GGT→AGT) |
| hypothetical protein | 29,191 | B | C→G | L206L (CTG→CTC) |
| tRNA-specific 2-thiouridylase MnmA | 161,498 | B | G→A | A13T (GCA→ACA) |
| Tagatose-6-phosphate kinase | 219,790 | B | C→T | A279T (GCG→ACG) |
| Aspartate aminotransferase | 376,122 | B | C→T | S145S (TCG→TCA) |
| Bacitracin export permease protein BceB | 644,261 | B | G→A | A373V (GCC→GTC) |
| Cytochrome bd ubiquinol oxidase subunit 1 | 1,123,464 | B | C→T | R209H (CGT→CAT) |
| Alternate 30S ribosomal protein S14/Manganese-binding lipoprotein MntA | 1,325,894 | B | C→A | intergenic (−237/−172) |
| DNA-directed RNA polymerase subunit beta | 1,407,338 | B | C→A | M952I (ATG→ATT) |
| Serine protease Do-like HtrA | 1,737,666 | B | T→A | D387V (GAT→GTT) |

Although LPC37 was selected for increased tolerance to heat for a very short time, it was possible to identify a single clone with improved storage stability of almost 50% in dry conditions. The strain acquired only a few mutations, one of them in the tagatose-6-phosphatase (lacC_2). Tagatose has previously been shown to improve cells survival during freezing. Therefore the mutation in the heat-evolved strain could increase the amount of tagatose in the cell, resulting in more stable strains.

Evolved Strains of *Lactobacillus acidophilus* NCFM (NCFM)

Strains of NCFM were evolved against the stressors of heat, NaCl and KCl and preferred clones were selected on the basis of the spot plating assay as described above and then tested in the accelerated assays for improved stability. The heat-evolved clones were similar to the controls for both CFUs and cell dry weight. Storage stability of the evolved clones was improved in both wet (30° C. and 40% humidity) and dry (50° C. and no humidity) conditions for both heat-evolved clones, NCFM Heat 1.1 and NCFM Heat 6.3, and one KCl-evolved clone, NCFM KCl 2.4. Two NaCl evolved clones, NCFM NaCl 1.2 and NCFM NaCl 3.2, had higher storage stability in dry conditions.

The levels of organic acids in the cells at the end of fermentation were measured to get an indication of the metabolic activity of these cells during the fermentation. In general, it was observed that there was no difference between the unevolved and evolved strains in the production of lactate, pyruvate, glycerol, formate, acetate, ethanol and succinate in the two replicated assays. Only acetate seemed to be slightly lower in the heat-evolved clones. This suggests that the evolved clones have comparable metabolic activities as the unevolved strains.

The fatty acid composition of bacteria is tightly liked to membrane fluidity and has been shown to affect survival during freeze drying (Louesdon et al. 2015). Overall, the evolved cells have a very similar composition of fatty acids as the unevolved NCFM controls.

To identify mutations that could be responsible for the observed improvements in storage stability, we sequenced every clone that was tested in the accelerated assays using whole genome sequencing and aligned the reads to the published reference sequence of *L. acidophilus* NCFM using breseq (Deatherage and Barrick 2014). The two heat-evolved clones, NCFM Heat 1.1 and NCFM Heat 6.3 shared seven mutations, while two mutations were unique to NCFM Heat 6.3 (Table 16 and 17, Example 31). Among the three KCl-evolved clones, we identify 18 different mutations (seven in NCFM KCl 1.6, 13 in NCFM KCl 2.4 and ten in NCFM KCl 3.3), some of which were shared in different strains (Table B). Similarly, we identified 16 unique mutations in the NaCl-evolved clones, (six in NCFM NaCl 1.2, ten in NCFM NaCl 3.2 and five in NCFM NaCl 6.4), again some of the mutations were shared between different strains (Table C).

TABLE B

Mutations in KCL evolved strains - NCFM

| KCl 1.6 | KCl 2.4 | KCl 3.3 | Position | Mutation | Annotation | Gene/Direction | Description |
|---|---|---|---|---|---|---|---|
| X | X |   | 121,570 | Δ1 bp | coding (1210/1242 nt) | LBA0127 ← | transposase |
|   | X | X | 488,659 | G→T | intergenic (+166/−33) | msmR →/→ msmE | msm operon repressor/ABC transporter sugar-binding protein |

TABLE B-continued

Mutations in KCL evolved strains - NCFM

| KCl 1.6 | KCl 2.4 | KCl 3.3 | Position | Mutation | Annotation | Gene/Direction | Description |
|---|---|---|---|---|---|---|---|
|  | X | X | 493,811 | G→A | G256R (GGA→AGA) | msmK → | ABC transporter nucleotide binding protein |
|  | X | X | 525,130 | +T | coding (121/246 nt) | LBA0535 ← | putative permease |
| X |  |  | 525,451 | Δ17 bp | coding (340-356/567 nt) | LBA0536 ← | hypothetical protein |
|  | X | X | 640,012 | C→T | Q479* (CAA→TAA) | pacL → | H+-K+-exchanging ATPase |
| X |  |  | 798,717 | (AAC)$_{3\to2}$ | coding (311-313/2784 nt) | ileS → | isoleucyl-tRNA synthetase |
| X |  |  | 949,292 | (T)$_{7\to6}$ | intergenic (-43/-77) | LBA0974 ←/→ LBA0975 | hemolysin III/putative family protein |
|  |  | X | 951,255 | C→T | A253V (GCT→GTT) | LBA0977 → | Na+-H+ antiporter |
|  | X |  | 951,690 | C→T | T398I (ACA→ATA) | LBA0977 → | Na+-H+ antiporter |
|  | X |  | 952,137 | C→A | A2E (GCA→GAA) | LBA0978 → | GTP binding protein |
|  | X | X | 1,063,374 | C→A | I38I (ATC→ATA) | LBA1083 → | putative membrane nuclease |
| X | X | X | 1,247,879 | (T)$_{6\to4}$ | intergenic (-93/+77) | LBA1268 ←/← tsf | uridine mono phosphate kinase/elongation factor Ts |
|  | X |  | 1,289,736 | G→T | R457R (CGA→AGA) | recG ← | ATP-dependent DNA helicase |
|  | X | X | 1,415,803 | G→A | A306A (GCC→GCT) | LBA1429 ← | putative transporter-membrane protein |
| X | X | X | 1,660,027 | G→C | N253K (AAC→AAG) | corA ← | CorA family cationic transporter |
|  | X | X | 1,819,467 | G→A | R172W (CGG→TGG) | LBA1798 ← | response regulator |
| X |  |  | 1,977,419 | A→G | D149G (GAT→GGT) | copA → | copper-transporting ATPase |

TABLE C

Mutations in NaCl Evolved strains - NCFM

| NaCl 1.2 | NaCl 3.2 | NaCl 6.4 | Position | Mutation | Annotation | Gene/Direction | Description |
|---|---|---|---|---|---|---|---|
| X | X | X | 121,570 | Δ1 bp | coding (1210/1242 nt) | LBA0127 ← | transposase |
|  | X |  | 370,130 | C→T | S551N (AGT→AAT) | LBA0397 ← | ABC transporter |
| X |  | X | 415,332 | C→A | noncoding (1554/1572 nt) | LBA2012 → | 16S ribosomal RNA |
|  | X |  | 525,424 | C→T | G128D (GGT→GAT) | LBA0536 ← | hypothetical protein |
| X | X |  | 525,664 | G→T | S48* (TCA→TAA) | LBA0536 ← | hypothetical protein |
|  | X |  | 849,400 | C→T | R41C (CGT→TGT) | LBA0867 → | hypothetical protein |
|  | X |  | 1,139,229 | G→A | intergenic (-112/+26) | dnaD ←/← asnC | initiation of chromosome replication protein/ asparaginyl-tRNA synthetase |

TABLE C-continued

Mutations in NaCl Evolved strains - NCFM

| NaCl 1.2 | NaCl 3.2 | NaCl 6.4 | Position | Mutation | Annotation | Gene/Direction | Description |
|---|---|---|---|---|---|---|---|
| X | X | X | 1,247,879 | (T)$_{6\to4}$ | intergenic (−93/+77) | LBA1268 ←/← tsf | uridine mono phosphate kinase/elongation factor Ts |
|  | X |  | 1,331,678 | Δ105 bp | coding (1034-1138/1578 nt) | LBA1358 ← | ABC transporter ATP binding and permease protein |
| X |  |  | 1,392,204 | A→G | intergenic (−130/+140) | oppA ←/← LBA1401 | oligopeptide ABC trasporter substrate binding protein/peroxidase (Npx) |
|  | X |  | 1,396,669 | C→T | E179K (GAA→AAA) | LBA1408 ← | hypothetical protein |
|  | X |  | 1,475,525 | G→T | S294S (TCC→TCA) | LBA1487 ← | transposase, is605-tnpb |
|  | X |  | 1,820,001 | C→A | W424L (TGG→TTG) | LBA1799 ← | histidine kinase |
|  |  | X | 1,820,203 | T→A | I357L (ATA→TTA) | LBA1799 ← | histidine kinase |
| X |  |  | 1,985,498 | C→T | A131T (GCC→ACC) | LBA1973 ← | 6-phosphogluconate dehydrogenase |

In summary, both heat-evolved clones have a A232D mutation in clpC, which encodes the ATPase subunit of the ClpC-ClpP protease. This subunit directs proteins that are phosphorylated on arginine residues to ClpP for degradation and is involved in stress responses. Proteomic analysis suggests that the mutation in the evolved strains seems to reduce the protein abundance of clpC, which could be indicative of a reduced stress response in the evolved strains. The stop codon (E14*) in gntR encoding a gntR family like transcriptional regulator evolved in both strains and lead to significant reduction of GntR. The gene gntR is part of the GntI operon. It represses the transcription of the other three genes in the operon. In the presence of gluconate, the GntR repression is reduced and the three other genes involved in gluconate uptake are expressed. In *E. coli*, the Entner-Doudoroff (ED) pathway is also upregulated (Izu et al. 1997, Tsunedomi et al. 2003). However, *L. acidophilus* NCFM seems to lack two enzymes of the ED pathway. Therefore, upregulation of the gnt operon due to a lack of repression by GntR could be important for oxidative stress reduction or the conversion of gluconate to ribose-5-phosphate. *L. acidophilus* NCFM has several genes annotated as gntR.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "μL" means microliter(s), "mL" means milliliter(s), "L" means liter(s), "nm" means nanometer(s), "mm" means millimeter(s), "cm" means centimeter(s), "μm" means micrometer(s), "mM" means millimolar, "M" means molar, "mmol" means millimole(s), "μmole" means micromole(s), "g" means gram(s), "μg" means microgram(s), "mg" means milligram(s), "g" means the gravitation constant, "rpm" means revolutions per minute, General Methods Materials and methods suitable for the maintenance and growth of bacterial cultures are also well known in the art. Techniques suitable for use in the following Examples may be found in *Manual of Methods for General Bacteriology* by Gerhardt et al. (Gerhardt et al., 1994), or in *Biotechnology: A Textbook of Industrial Microbiology by Brock* (Brock 1989). Yeast extract can be sourced from Angel (Yichang, China), Lesaffre (Marcq-en-Barceul, France), Ohly (Hamburg, Germany), DSM Food Specialities (Heerlen, Netherlands), Lallemand (Rexdale, Canada), Alltech Fermin (Nicholasville, KY), MC Food Specialties (Shinagawa-Ku, Japan), Yeastock (Tokyo, Japan), KOHJIN Life Sciences (Tokyo, Japan), Savoury Systems International (Branchburg, NJ), Sensient Technologies (Milwaukee, WI) or Kerry (Tralee, Ireland). All other reagents and materials used for the growth and maintenance of bacterial cells not specific mentioned were obtained from Aldrich Chemicals (Milwaukee, WI), BD Diagnostic Systems (Sparks, MD), Life Technologies (Rockville, MD), or Sigma Chemical Company (St. Louis, MO), unless otherwise specified.

Strains

The probiotic strain *Bifidobacterium animalis* supspecies *lactis* Bi-07 (also referred to as BBi) is a Gram-positive, rod-shaped, non-motile, anaerobic bacterium. It is available from ATCC as PTA SD5220. The strain has been sequenced and the sequence is available from NCBI under the accession number NC_017867 (Briczinski et al. 2009, Stahl and Barrangou 2012, Morovic et al. 2017). It is characterized by a 60.5% GC content.

*Lactobacillus acidophilus* NCFM is a Gram-positive, non-spore forming bacterium that was isolated in the 1970s from a human source and subsequently characterized in the food microbiology research laboratory at North Caroline State University (Sanders and Klaenhammer 2001). The strain has been shown to have beneficial effects on humans when ingested orally and has been sold commercially for more than 25 years. The strain is available from ATCC as 700396. The genome has been completely sequenced and is available from NCBI under the accession number NC_006814.3 (Altermann et al. 2005). The GC content of the genome is 39.1%.

Experimental Evolution

Strains were evolved towards improved storage stability essentially as described below. In general, replicated populations were serially transferred for about 100 generations in the selective environment before single colonies were isolated and tested for improved storage stability. Strains with improved storage stability in the spot plating assays were subsequently tested in the accelerated assay for fermentation performance, storage stability, changes in their metabolomic, fatty acid, and on occasion transcriptomic and proteomic profile. Whole genome sequencing was performed to identify mutations. For example, single populations were grown and transferred in De Man, Rogosa and Sharpe agar (MRS) broth before streaking the population on MRS agar and incubating the plates at high temperature to select for clones able to grow at high temperature. Alternatively, replicated populations could be selected under different conditions as follows:

To start replicated populations, single colonies were isolated and archived: Frozen stocks were plated onto MRS agar plates and grown under anaerobic conditions. Well isolated colonies were picked and grown in MRS broth to high density, supplemented with glycerol and frozen at −80° C. These frozen stocks of single colonies were then used to start replicated populations in MRS broth supplemented with cysteine HCl and a stressor, such as KCl, NaCl, SDS or increased temperature during incubation. All cultures were grown anaerobically either by covering the cultures with a breathable film in an anaerobic box or by covering the cultures with aluminum foil. Agar plates were incubated in anaerobic boxes with the appropriate number of anaerobic GasPak sachets for the size of the box used.

Selection experiments with replication were done as follows: Typically, six or eight replicated populations were grown in 7 mL MRS broth supplemented with cysteine (L-Cysteine HCl at a final concentration of 0.5 g/L added right before use) at a starting OD of 0.2-0.3 and grown for 24-48 hours either static or shaken at low speed (~100 rpms) before being transferred to fresh media. Unless temperature was the stressor, the cultures were grown at 37° C. in anaerobic conditions. The OD of several populations of the same selection regime was assessed and the populations were transferred at the same initial OD based on the average OD measured. The selection pressure was increased (i.e. increase concentration of stressor or increase the temperature) when the populations reached ODs after 24 hours that were similar to the ODs after 24 hours in benign conditions. If the populations could not make up the dilution rate, we decreased the stressor. A sample of the population was frozen at regular intervals by supplementing the sample with glycerol and storing the sample at −80° C. After ~100 generations, a sample of the population was supplemented with glycerol and frozen at −80° C. The number of generations per transfers was calculated as $$\text{Number of generations} = \frac{\log\left(\frac{\text{Final } OD}{\text{Initial } OD}\right)}{\log 2}$$

following Lenski et al. (Lenski et al., 1991).

Spot Plating Assay to Identify Storage-Stable Clones

To assess storage stability of the evolved clones, single colonies from the evolved populations were isolated and grown in benign, non-selective conditions, freeze dried and assessed for their viability relative to the ancestor after up to two weeks in an environmental chamber. To isolate single colonies, the colonies were either streaked or plated the evolved and ancestral populations on MRS agar plates and incubated in the anaerobic box with an anaerobic GasPak sachet. The streaked populations were incubated for 2 days before single colonies were isolated and restreaked onto fresh MRS agar plates and then incubated for another 2 days. To plate the populations on MRS agar plates, the cultures were diluted in a 10-fold dilution series and plated on MRS agar. After 2-3 days of incubations at 37° C. in the anaerobic box, single, well dispersed colonies were isolated and inoculated into fresh MRS broth in 48- or 96-well plates. The plates were sealed with adhesive aluminum foil and incubated for 24 hours at 37° C. and 100 rpm. The aluminum foil was carefully removed and the cells were resuspended by gently mixing the cultures using a multichannel pipettor or the Viaflo96 (ViaFlo 96, Integra Biosciences AG, Zizers, Switzerland). OD was measured and the cultures were diluted to OD 0.2 into 3.5 mL MRS broth in two new 48-well deep-well plate based the average OD. These plates were sealed with adhesive aluminum foil and incubated overnight at 37° C. and 100 rpm. At the same time, each clonal culture was supplemented with glycerol stocks for a final concentration of 20% glycerol and frozen at −80° C. for further analyses. This process was done for several single clones from replicated populations.

After incubation, the cells were prepared for storage by flash freezing and freeze drying as follows: The aluminum seals were removed and the cells were gently mixed into suspension in each well using the Viaflo96. OD was measured and based on average OD, the cultures were added to Cube2ubes (CUBE 2UBE® Tubes, Sigma BAF37851100) in racks (CUBE 2UBE® 96-well rack with cover, Sigma BAF378560000) in a 96-well array at a volume equivalent to 1 mL at OD 4. At least four Cube2ube per culture were prepared to be able to assess the clones' viability at different time points. The cells were chilled on ice for 30 min and subsequently centrifuged in the Multifuge X3R (ThermoFisher) at 4° C. and 3500 rpm for 10 minutes. All but 50 µL of the supernatant was removed using the ViaFlo96, 8 µL of potassium phosphate stabilizer (8 g monopotassium phosphate and 10.2 g dipotassium phosphate per 100 mL) was added to each Cube2ube, and well mixed with the cells by shaking the cultures for for 20 seconds at 2000 rpm on the Thermomixer C. After letting the cells rest at room temperature for 10 min and briefly mixing them at 2000 rpm for 15 seconds, the Cube2ubes were transferred in their box into liquid nitrogen for flash freezing, before placing them into a lyophilizer for 24-72 hours for freeze drying. The cubes were then placed into the environmental chamber and stored open (without a cover) at 30° C. and 40% humidity. The viability of the stored cells was assessed at regular intervals and compared to the viability of freeze dried but not stored cells as follows: One set of freeze dried cultures, the pre-storage set, was plated after lyophilization. All plating was done by resuspending the cells in 210 µLMRS, mixing the cells at 2000 rpm for 20 seconds, letting them sit for 30 minutes at room temperature and mixing them again at 2000 rpm for 15 seconds before diluting the cultures in a 10 fold titration series. 5 µL of certain dilutions were spotted (e.g. $10^{-6}$, $10^{-4}$, $10^{-2}$ and $10^{0}$) on MRS agar plates in OmniTrays from Fisher (OmniTray Single Well w/Lid, Sterile PS 242811). After the plated spots had dried, the plates were placed into an anaerobic box with a GasPak anaerobic sachet and incubated for 2-3 days at 37° C. After incubation, the highest dilution at which a clone was able to grow was recorded and pictures of the plates were taken. Other sets were removed, resuspended, and spotted and plated in the same way. Dilutions for plating were chosen based on the expected viability. The cultures were plated at different time intervals, typically after 0, 96, 168, 240 or 320 hours in the environmental chamber.

Clones with good survival during the spot plating assay were subsequently tested in more details in the accelerated assays and sequenced using whole genome sequencing to identify mutations that evolved over the course of the selection experiment. To maintain evolutionary independence, improved clones from different populations were picked for testing in the accelerated assay. This approach made it possible to employ a comparative approach based on parallel evolution to identify potentially beneficial mutations (Saxer et al. 2014). Storage stability in the Accelerated Assays was tested under dry conditions (50° C., no humidity), wet conditions (30° C. and 40% humidity) and in long-term storage (4 months) at 30° C. and low humidity. Any clones tested in the spot plating assay were used to make a freezer vial lot by growing the strain up and freezing it after supplementing 20% glycerol.

Bioreactor Cultivations

The fermentation system was custom-built and comprised 12 350 mL jacketed CelStir spinner flasks (Wheaton Science Products, Millville, NJ) each equipped with an autoclavable glass probe (Cole-Parmer, Vernon Hills, IL) and an IKA ColorSquid magnetic stirrer (Cole-Parmer, Vernon Hills, IL). 4 vessels each were temperature controlled by an Isotemp 4100 R20 Circulator (Thermo Fisher Scientific, Waltham, MA), respectively. Eutech Alpha pH 200 controllers (Thermo Fisher Scientific, Waltham, MA) were attached to BioChem Valve micro-pumps (Biochem Fluidics, Boonton, NJ) with a 20 µL dispense volume for pH control. PH and base additions were recorded in LabVIEW (National Instruments, Austin, TX) via LabJack T7 Pro data acquisition units (DAQ) (LabJack, Lakewood, Colorado). Fermentation settings are described in Table 1. At the end of a fermentation run, pH set point in the fermenter was changed to the neutralization pH and temperature set point to the "temperature after neutralization" value and cultures kept at this condition for 1 h.

TABLE 1

Fermentation settings in fermentation runs

| | NCFM | BBi |
|---|---|---|
| pH set point [ ] | 5.6 | 5.8 |
| temperature set point [° C.] | 38 | 38 |
| base for pH control | 50% NH4OH | 50% NH4OH |
| stirrer speed [rpm] | 200 | 200 |
| neutralization pH [ ] | 6.5 | 6.5 |
| temperature after neutralization [° C.] | 10 | 10 |

Media

Composition of the media used in shake flask experiments and in bioreactor cultivations of the strains is given in Table 2. Water was taken from the public water system (Experimental Station, Wilmington, DE). Media were adjusted before autoclaving to pH=6.8 with 50% NH4OH solution for BBi and NCFM, and with 20% NaOH solution for LPC37, respectively. The media were autoclaved in an Amsco 3043 Jacketed Steam Sterilizer/Autoclave (Steris, Mentor, OH) for 20 min at 121° C. in portions of 800 mL contained in 1 L glass bottles (Corning Pyrex 1399-1000). For BBi, cysteine-HCl was added to the medium after heat sterilization.

Seed Cultures

The seed train of NCFM® comprised three steps. A 15 mL Falcon™ tube filled with 14 mL of NCFM® medium (Table 2) was inoculated with 1 mL of frozen-stock culture. The tube was capped and incubated at 38° C. with no agitation for 8 h in an Innova 4230 incubator (New Brunswick Scientific, Enfield, CT) until reaching OD600 values of approximately 1.000. For the second stage inoculum 100 mL medium (Table 2) in a 125 mL Fisherbrand flat bottom closed cap flask (Thermo Fisher Scientific, Waltham, MA), i.e. seed flask 2, was inoculated and subsequently incubated at 38° C. with no agitation for 16 h in an Innova 4230 incubator (New Brunswick Scientific, Enfield, CT). Targeted OD after inoculation was 0.078. At the end of the incubation time of seed flask 2, pH was measured and only cultures with pH between 4.0-4.4 were used for next transfer. Inoculum volume for the third transfer was calculated for 100 mL medium (Table 2) in a 125 mL plain bottom flask (seed flask 3). Target OD600 was 1.766. If at the end of the incubation pH was found higher than 4.4 or OD lower than 3, additional time was provided for growth of the culture to reach a pH of 4.0-4.4 and an OD of 3-4 before transfer into a bioreactor. OD measurements were carried out at 600 nm (OD600) with a Helios Alpha spectrophotometer (Thermo Fisher Scientific, Waltham, MA).

The seed train of BBi comprised three steps. A 15 mL Falcon™ tube containing 14 mL of BBi medium (Table 2) was inoculated with 1 mL of frozen-stock culture. The Falcon™ tube was capped and incubated at 38° C. with no agitation for 8 h in an Innova 4230 incubator (New Brunswick Scientific, Enfield, CT). The second stage inoculated 100 mL medium (Table 2) in a 125 mL Fisherbrand flat bottom closed cap flask (Thermo Fisher Scientific, Waltham, MA) to a target OD600 of 0.078. Subsequently the flask was incubated at 38° C. with no agitation for 16 h in an Innova 4230 incubator (New Brunswick Scientific, Enfield, CT). At the end of the incubation, pH was measured and only cultures with pH between 4.0-4.4 used for transfer into seed flask 3. Target OD was 1.766 in a 125 mL plain bottom flask filled with 100 mL medium (Table 2). If at the end of the incubation pH was found higher than 4.4 or OD lower than 3, additional time was provided for growth of the culture to reach a pH of 4.0-4.4 and an OD of 3-4 before transfer into a bioreactor. OD measurements were carried out at 600 nm (OD600) with a Helios Alpha spectrophotometer (Thermo Fisher Scientific, Waltham, MA).

TABLE 2

Medium composition used for NCFM and BBi.

| component [ ] | NCFM [g] | BBi [g] |
|---|---|---|
| water (145 F. +/− 5 F.) | 918.95 | 930.00 |
| Dextrose | — | 15.00 |
| corn syrup solids | — | 18.00 |
| Sucrose | 45.95 | — |
| yeast extract | 22.98 | 22.50 |
| cysteine-HCl | — | 0.50 |
| magnesium sulfate | 6.43 | 7.00 |
| ascorbic acid | 0.92 | 1.00 |

TABLE 2-continued

Medium composition used for NCFM and BBi.

| component [ ] | NCFM [g] | BBi [g] |
|---|---|---|
| vitamin B12 | 0.09 | 0.10 |
| manganese sulfate | 0.09 | 0.10 |
| polysorbate (Tween) 80 | 4.59 | 5.00 |

Analytical Methods

OD600 was determined with a Helios alpha spectrophotometer (P/N 9423 UVA 1202E, Thermo Fisher Scientific, Waltham, MA). If the observed absorbance $A_{sample}$ exceeded a value of 0.3, cultures were diluted with 0.9% NaCl to below 0.3 applying dilution factor DF. Optical density of broth without cells $OD_{broth}$ was determined after spinning 1 mL of culture for 2 min at 16 000 rpm in an Eppendorf table top centrifuge (Eppendorf, Germany). OD600 was finally calculated according to:

$$OD_{600} = DF \times (A_{sample} - A_{NaCl}) - (OD_{broth} - A_{NaCl})$$

For determination of cell dry weight concentration, a culture volume $V_{filtered}$ of either 2 or 3 mL, depending on the cell concentration (i.e. for OD600>10 2 mL were chosen, and for OD600 below 10 3 mL) were filtered through Nylaflo filters (pore size 0.25 µm, diameter 47 mm, VWR Cat No 28140-040) placed on a fritted disc with diameter 47 mm of a Synthware Filtration Apparatus with [ST]40/35 joint connections (VWR cat #60002-266, Kemtech America, Pleasant Prairie, WI). The filter with filter cake was subsequently washed with 0.9% NaCl solution of equivalent volume as the filtered culture, moved to an aluminum pan and placed in an oven for drying at 80° C. for 24 h. Subsequently the weight of the dried filter with filter cake in the aluminum pan, $w_{dry}$, was determined and the original weight $w_0$ of filter and pan as determined prior to the experiment subtracted. Additionally, the weight was corrected for the weight difference before and after drying of reference filters only washed with 0.9% NaCl solution, $w_{rf}$. Concentration of cell dry weight cdw was determined according to:

$$cdw = \frac{w_{dry} - w_0 - w_{rf}}{V_{filtered}}$$

Usually cell dry weight concentration was the result from averaging three independent measurements.

Concentration of colony forming units, CFU, in a culture was generally determined at end of a fermentation run (EOR) and/or after a "conditioning" process termed "cold neutralization" (CN). Two mL of either EOR or CN culture were transferred in a 5 mL Eppendorf tube and sonicated with a Q125 sonicator (Qsonica, Newtown, CT) with the CL-18 probe centered in the tube and half immersed in the culture liquid and being operated for 15 seconds at 40% amplitude.

The sonicated culture samples were serially diluted with sterile 0.1% peptone water in 99 mL Flip-Top Dilution Bottles (3M, St. Paul, MN) and pour plated in triplicate with MRS agar. MRS agar was usually prepared a week to 10 days ahead of plating. Briefly, 70 g of Difco Lactobacilli MRS broth with agar (Becton, Dickinson and Company, Franklin Lakes, NJ) was added to 1 l of ultrapure water, mixed and boiled for 1 minute. 200 mL of the MRS agar solution were portioned into 250 mL bottles, sterilized in a 20-minute autoclave liquid cycle and subsequently stored in a 48 C incubator until use. At the day of the experiment, the bottles were transferred to a water bath tempered at 46° C. If the cells required cysteine (e.g. BBi or NCFM), 2 mL of 5% Cysteine-HCl solution was added to the 200 mL MRS agar solution. Cystein-HCl solution was prepared by dissolving cysteine-HCl powder in ultrapure water ad 250 mL, subsequently filter sterilizing the solution in a 250 mL Nalgene aPES filter unit with diameter 55 mm and pore size 0.2 µm (Thermo Fisher Scientific, Waltham, MA). After solidifying plates at RT in an aerobic environment for approximately 10 minutes, plates were turned over and stored in standard (up to 18 plates) or large (up to 33 plates) air-tight containers (GasPak EZ Container System, Becton, Dickinson and Company, Franklin Lakes, NJ), together with activated anaerobic pouches (GasPak EZ Container System Sachets, Becton, Dickinson and Company, Franklin Lakes, NJ) to create an anoxic atmosphere. The anaerobic containers were incubated for 44 h in an environmental chamber set to 38° C. Plates with the different dilutions were usually counted either by hand or, on some occasions, based on processing of images generated by a Flash & Grow colony counter (IUL Instruments, Barcelona, ES) with the image software Flash & Grow 1.3.

Downstream Processing in 96-Well "Small-Scale" Plate Assay 1 mL of approximately 200 mL of culture broth taken directly from bioreactor with subsequent pH-adjustment and storage for 1 h in a 10° C. water bath ("conditioning"), was transferred into tubes of a 96 plate (Nova Biostorage, Canonsburg, PA) with a Nimbus 96-head robot (Hamilton Robotics, Bonaduz, Switzerland) using 1 mL Axygen tips (Thermo Fisher Scientific, Waltham, MA). A minimum of 3, usually 8 tubes per plate and condition were filled. Number of plates was chosen in accordance with the executed stability testing program, and was usually 5 plates. The filled plates were centrifuged in Eppendorf 5810 R centrifuge equipped with a A-4-62 rotor at 10° C. and 4000 rpm for 10 minutes. Next supernatant was removed from each tube with a LiHA (8 channel) Freedom EVO robot (Tecan, Männedorf, Switzerland) using liquid sensing/conductive 1000 µL tips (Thermo Fisher Scientific, Waltham, MA). Finally, stabilizer was added using MCA 200 µL tips (Thermo Fisher Scientific, Waltham, MA). The stabilizer solutions were made within 24 h prior to the experiment. The standard amounts of supernatant removed and stabilizer added for strains BBi, BBI, LPC37 and NCFM® are given in Table 3 and Table 4, respectively.

TABLE 3

Volume of supernatant removed, type and volume of stabilizer added for strains LPC37, NCFM and BBi in 96-well "small scale" plate assay

| strain | V(removed supernatant) [µl] | stabilizer | V(stabilizer) [µl] |
|---|---|---|---|
| LPC37 | 940 | A-TKP | 30.0 |
| NCFM | 955 | TKP | 22.5 |
| BBi | 950 | SKP | 15.0 |

TABLE 4

Composition of applied stabilizers A-TKP, TKP and SKP in 96-well "small scale" plate assay

| stabilizer | water [g] | sucrose [g] | trehalose [g] | KH2PO4 [g] | K2HPO4 [g] | total [g] |
|---|---|---|---|---|---|---|
| A-TKP | 40.9 | — | 39.1 | — | 19.9 | 100.0 |
| TKP | 41.9 | — | 40.0 | 8.0 | 10.2 | 100.0 |
| SKP | 41.9 | 40.0 | — | 8.0 | 10.2 | 100.0 |

Cell pellets and stabilizer solutions were mixed with a V shape stir element (V&P Scientific, San Diego, CA) in a magnetic tumbler (V&P Scientific, San Diego, CA) at 200 rpm for approximately 2 minutes. Subsequently the tubes of the plates were transferred to 96 well aluminum microplate frames (SP Scientific, Gardiner, NY) previously stored on dry ice that were subsequently stored in −80° C. freezer. Aluminum frames with tubes were lyophilized in a VirTis Advantage freeze dryer (SP Scientific, Gardiner, NY) following program depicted in Table 5.

TABLE 5

Applied freeze-drying program in 96-well "small scale" plate assay. Abbreviations: Vac = applied vacuum; EPT = elapsed process time.

| | ramp/hold | temp [° C.] | time [h] | time [min] | vac [mT] | EPT [h] | EPT [min] |
|---|---|---|---|---|---|---|---|
| Step 1 | HOLD | −45 | 0.2 | 10.0 | 100 | 0.2 | 10.0 |
| Step 2 | RAMP | −22 | 1.0 | 60.0 | 100 | 1.2 | 70.0 |
| Step 3 | RAMP | 2 | 20.8 | 1250 | 100 | 22.0 | 1320 |
| Step 4 | RAMP | 32 | 10.0 | 600 | 100 | 32.0 | 1920 |
| Step 5 | HOLD | 32 | 20.8 | 1250 | 100 | 52.8 | 3170 |
| Step 6 | HOLD | 25 | 16.7 | 1000 | 50 | 69.5 | 4170 |

After completion of the program, tubes were transferred from the aluminum microplate frames into plastic boxes. The plate for determining cell counts without storage ("T0") was immediately transferred to a desiccator with relative humidity<1% and stored at room temperature for 1 h before further processing.

Storage Stability Testing in 96-Well "Small-Scale" Plate Assay at 30° C. and 40% Relative Humidity After completion of the freeze-drying program, tubes were transferred from the aluminum microplate frames into plastic boxes. For storage stability testing in 96-well "small scale" plate assay at 30° C. and 40% relative humidity, plastic boxes with open tubes were transferred into either a model 7000-33-1 or 6040-1 Caron environmental chamber (Caron, Marietta, OH) set to 30° C. and 40% relative humidity and stored until sampling.

Storage Stability Testing in 96-Well "Small-Scale" Plate Assay at 50° C. and Low Relative Humidity After completion of the freeze-drying program, tubes were transferred from the aluminum microplate frames into plastic boxes. For storage stability testing in 96-well "small scale" plate assay at 50° C. and low relative humidity, plastic boxes with open tubes were transferred into a desiccator with relative humidity<1% and stored at 50° C. until sampling.

Storage Stability Testing in 96-Well "Small-Scale" Plate Assay at 30° C. and Low Relative Humidity After completion of the freeze-drying program, tubes were transferred from the aluminum microplate frames into plastic boxes. For storage stability testing in 96-well "small scale" plate assay at 30° C. and low relative humidity, plastic boxes with open tubes were transferred into a desiccator with low relative humidity<1% and stored at 50° C. until sampling.

Cell Revival and Plating in 96-Well "Small-Scale" Plate Assay

One mL MRS media was added to each sample tube with a Nimbus 96-head robot (Hamilton Robotics, Bonaduz, Switzerland). Subsequently the filled tubes (still containing the stirrer bars) were agitated on a magnetic tumbler (V&P Scientific, San Diego, CA) for 25 min at 300 rpm, then for another 5 min at 600 rpm. In the meantime, a Nimbus 96-head robot (Hamilton Robotics, Bonaduz, Switzerland) was used to add 900 µL peptone water into 7×96 Corning 96-well clear V-bottom 2 mL polypropylene deep well plates #3960 (Corning Inc., Corning, NY). After mixing, the Nimbus 96-head robot was used to create serial dilutions by repeatedly transferring 100 µL sample volume into the 900 µL peptone water, followed by aspiration. For each sample, usually 3 most significant dilutions were chosen, per each dilution usually three samples with variable volume each of 50-200 uL transferred onto plates, MRS agar poured on top of it, and subsequently the solutions in the plate well mixed. MRS agar was usually prepared a week to 10 days ahead of plating. Briefly, 70 g of Difco Lactobacilli MRS broth with agar (Becton, Dickinson and Company, Franklin Lakes, NJ) was added to 1 L of ultrapure water, mixed and boiled for 1 minute. 200 mL of the MRS agar solution were portioned into 250 mL bottles, sterilized in a 20-minute autoclave liquid cycle and subsequently stored in a 48 C incubator until use. At the day of the experiment, the bottles were transferred to a water bath tempered at 46 C. If the cells required cysteine (e.g. BBi or NCFM), 2 mL of 5% Cysteine-HCl solution was added to the 200 mL MRS agar solution. Cystein-HCl solution was prepared by dissolving cysteine-HCl powder in ultrapure water ad 250 mL, subsequently filter sterilizing the solution in a 250 mL Nalgene aPES filter unit with diameter 55 mm and pore size 0.2 µm (Thermo Fisher Scientific, Waltham, MA). After hardening plates at RT in an aerobic environment for approximately 10 minutes, plates were turned over and stored in standard (up to 18 plates) or large (up to 33 plates) air-tight containers (GasPak EZ Container System, Becton, Dickinson and Company, Franklin Lakes, NJ), together with activated anaerobic pouches (GasPak EZ Container System Sachets, Becton, Dickinson and Company, Franklin Lakes, NJ) to create an anoxic atmosphere. The anaerobic containers were incubated for 44 h in an environmental chamber set to 38° C. Plates with the different dilutions were usually counted either by hand or, on some occasions, based on processing of images generated by a Flash & Grow colony counter (IUL Instruments, Barcelona, ES) with the image software Flash & Grow 1.3.

Statistical Processing of CFU Counts

As it is well established that CFU results are less accurate with high and low colony counts on a single plate $CFU_{count}$ a weighting function was introduced giving results of a sample with $CFU_{count}>300$ or $CFU_{count}<20$ lower weight, according to:

$$CFU_{count} > 300: \quad w_{count} = 1/[1+(CFU_{count}\text{-}300)/50]$$

$$300 \geq CFU_{count} \geq 25: \quad w_{count} = 1$$

-continued $$20 > CFU_{count} > 0: \quad w_{count} = CFU_{count}/20$$

$$CFU_{count} = 0: \quad w_{count} = 0.02$$

Next a single outlier detection on all n $CFU_{count}$ from a well was carried out based on the Dixon Q test for all data sets n>3. Depending on the number of suspected outliers, different ratios are used to identify potential outliers. Briefly, the n $CFU_{plate}$ values x1 to xn were ordered such that x1<x2< ... <xn−1<xn and their corresponding ratio(r)-values for the lowest and highest value were determined according to:

$$\text{lowest value: } r(l)_{10} = \frac{x_2 - x_1}{x_n - x_1}$$

$$\text{highest value: } r(h)_{10} = \frac{x_n - x_{n-1}}{x_n - x_1}$$

The determination of the ratios was modified to ensure that even for arrays that exhibit only minimal deviations in their measurements the denominator xn-x1 was always at minimum 1% of xn. If $r(l)_{10}$ or $r(h)_{10}$ exceeded a critical value $r_{10}(conf)_{crit(number)}$ the corresponding measurement was neglected in further analysis. The confidence interval was set at conf=90% and respective critical values for the total number of measurements n from the well/experiment $r(90\%)_{crit(n)}$ were taken from Verma and Quiroz-Ruiz (Verma and Quiroz-Ruiz 2006). If both of the calculated values $r(l)_{10}$ and $r(h)_{10}$ were above the critical value, only the measurements yielding the larger r-value was excluded. If 8 or more observations were available per well, in addition to the single outlier detection the lowest and the highest measurement were analyzed for both being outliers. Therefor their r-values were calculated according to:

$$\text{lowest value: } r(l)_{11} = \frac{x_2 - x_1}{x_{n-1} - x_1}$$

$$\text{highest value: } r(h)_{11} = \frac{x_n - x_{n-1}}{x_n - x_2}$$

The denominators xn−1−x1 or xn−x2 were again kept at a minimum of 1% of the second largest value xn−1. Similar to the previously described procedure, if r(l)11 or r(h)11 exceeded a critical value $r11(conf)_{crit(number)}$ (Verma and Quiroz-Ruiz 2006) with 90% confidence the corresponding measurements were left out in subsequent analyses. Overall, from the n plates counted for a well, n' values passed the outlier test.

Finally, the weighted average CFU count per well, wCFUwell, and associated weighted experimental standard deviation, wSDwell,exp, was calculated per well according to $$\overline{wCFU}_{well} = \frac{\sum_{1}^{n'} w_{count,i} \cdot CFU_{count,i}}{\sum_{1}^{n'} w_{count,i}}$$

and $$wSD_{well,exp} = \sqrt{\frac{n' \cdot \sum_{i=1}^{n} w_{count,i} \cdot (CFU_{count,i} - \overline{wCFU}_{well})^2}{(n'-1) \cdot \sum_{i=1}^{n} w_{count,i}}},$$

respectively. The standard error of the mean SEMwell was subsequently determined according to:

$$SEM_{well,exp} = \frac{wSD_{well,exp}}{\sqrt{n'}},$$

In subsequently analysis only the higher value from the pair of the experimentally determined and the theoretically minimum standard error of the mean was carried forward, according to:

$$SEM_{well} = \max(SEM_{well,exp}, SEM_{well,min})$$

Finally, the weights of the individual plate counts were aggregated into a quality score for the well with:

$$QS_{well} = \frac{\sum_{k=1}^{n'} w_{count,i}}{n'}$$

Next, results from all the m wells representing the same condition were grouped (at least 3, usually 8 wells per condition) and again subjected to the same Dixon-type outlier detection process as described previously (resulting in m' accepted values). The weighted average CFU count per condition, wCFUcond, and associated weighted experimental standard deviation, wSDcond,exp, was calculated per condition according to:

$$\overline{wCFU}_{cond} = \frac{\sum_{1}^{m'} QS_{well,i} \cdot \left(\frac{3}{rSEM_{well,i}}\right)^2 \cdot CFU_{well,i}}{\sum_{1}^{m'} QS_{well,i} \left(\frac{2}{rSEM_{well,i}}\right)^2}$$

and $$wSD_{well,cond} = \sqrt{\frac{m' \sum_{1}^{m'} QS_{well,i} \cdot \left(\frac{1}{rSEM_{well,i}}\right)^2 \cdot (CFU_{well,i} - \overline{wCFU}_{well,i})^2}{(m'-1) \cdot \sum_{1}^{m'} QS_{well,i} \left(\frac{1}{rSEM_{well,i}}\right)^2}},$$

Whereas rSEMwell,i represented the relative standard error of the mean for a well in percent. The standard error of the mean for wCFUcond was subsequently calculated according to:

$$SEM_{cond} = \frac{wSD_{well,cond}}{\sqrt{m'}}.$$

Error Propagation

When a function was a set of non-linear combination of several parameters, y=f(x1, x2, ..., xi), the function was linearized by approximating a first-order Taylor series expansion and the error interval calculated according to:

$$\Delta y = \frac{\delta y}{\delta x_1} \cdot \Delta x_1 + \frac{\Delta y}{\Delta x_2} \cdot \Delta x_2 + \ldots + \frac{\delta y}{\delta x_i} \cdot \Delta x_i$$

For example, the percent survival of cells at a given time point T, SV(T), and its standard error of the mean, SEM (SV(T)), was determined according to $$SV(T)[\%] = \frac{\overline{CFU_T}}{\overline{CFU_{T_0}}} \cdot 100\%$$

$$SEM(SV(T))[\%] = \pm \left( \frac{SEM(\overline{CFU_T})}{\overline{CFU_{T_0}}} + \frac{\overline{CFU_T}}{\overline{CFU_{T_0}}^2} \cdot SEM(\overline{CFU_{T_0}}) \right) \cdot 100\%$$

Whole Genome Sequencing

Any strain that was tested for storage stability in the accelerated assay was also analyzed at the genomic level using whole genome sequencing. DNA was extracted using the MoBio PowerSoil kit and submitted for sequencing on MiSeq. The paired-end reads were aligned to the reference sequence using the pipeline breseq (Deatherage and Barrick 2014). Both the ancestor and evolved clones were sequenced. Only mutations that occurred in the evolved clones were considered. Any mutations that were present in the ancestral strain were disregarded as sequencing errors in the reference sequence or differences between our ancestor and the reference sequence.

Example 1

Figure 1:
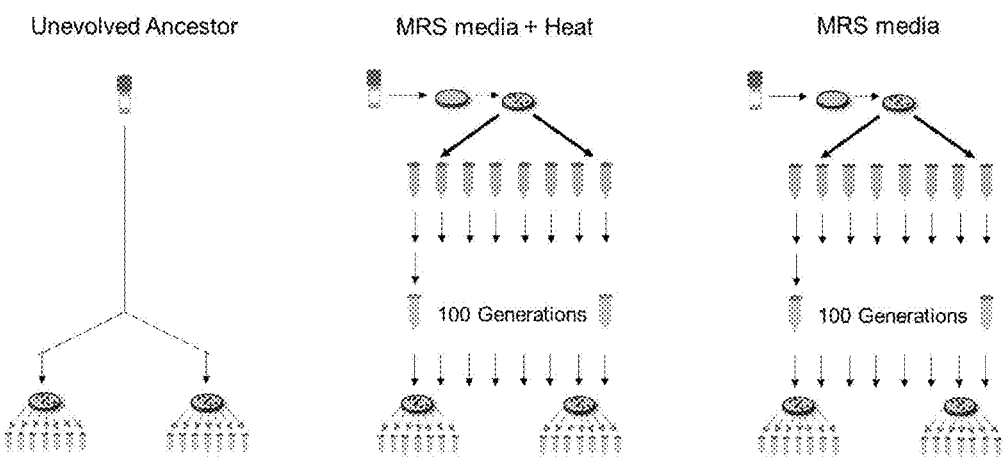
FIG. 1 is a cartoon describing the experimental outline to test whether selection for growth at increased temperature leads to improved storage stability.

Adaptation to Increased Heat Results in Increased Storage Tolerance for *Bifidobacterium animalis* Supspecies *lactis* BBi Adaptation to heat results in a higher frequency of storage stable clones than selection in the media alone. Replicated populations of *Bifidobacterium animalis* subspecies *lactis* were started with a single clone and evolved for ~100 generations by daily transfers into fresh media in different conditions. One set of populations were evolved in De Man, Rogosa and Sharpe (MRS) broth supplemented with L-Cysteine HCl (Sigma C1276, CAS 52-89-1) at a final concentration of 0.5 g/L at a constant temperature of 37° C. while a second set was evolved in the same media but at increasing temperatures. The populations were transferred by diluting them to a starting OD between 0.2 and 0.3. After ~100 generations of selection, samples of the evolved populations were frozen at −80° C. for further analyses. Two randomly selected populations from each treatment were serially diluted and plated onto MRS agar plates, and incubated at 37° C. under anaerobic conditions for two days. The ancestral strain was also grown from the freezer, diluted, plated onto MRS agar plates, and incubated along with the evolved populations. After incubation, 16 randomly selected single clones were isolated from each evolved population and two sets of 16 single clones were isolated from the ancestral populations (FIG. 1). These clones were subsequently grown in MRS media. After growth, the cells were spun down, the supernatant removed, KP stabilizer added, before the cell pellets were flash frozen and freeze fried, and subsequently exposing to 50° C. and 0% humidity for 22 days. For each clone, the number of viable cells were assayed after freeze drying and after storage at 50° C. by eluting the pellet in MRS media, plating serial dilutions onto MRS agar plates and counting the number of colony forming units per plate as described in the general methods.

Figure 2:
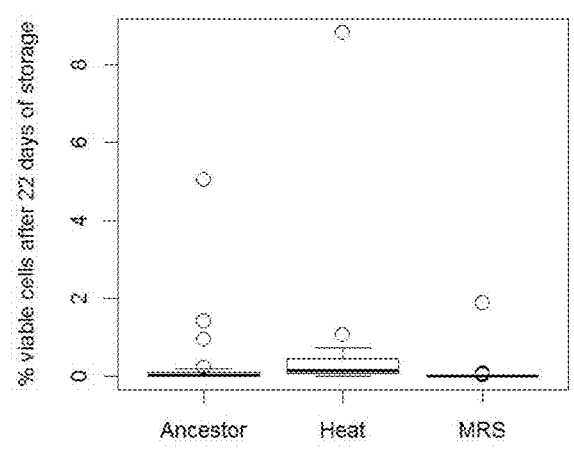
FIG. 2 is a graph showing the percent of viable cells per ancestral or evolved clone after storage at 50° C. for 22 days based on viable cells before storage.

Overall, the frequency of strains with increase survival during storage was higher in the heat evolved populations than among the ancestral clones or the MRS evolved populations (FIG. 2)

Example 2

Experimental Evolution of *Bifidobacterium animalis* Supspecies *lactis* BBi

Six replicate populations were started from a single clones of the probiotic strain *Bifidobacterium animalis* supspecies *lactis* BBi (Bi-07 DuPont—henceforth referred to as BBi) and evolved for growth at increasingly higher temperature as described in the general methods.

The populations were inoculated at an initial OD of 0.3 in 7 mL MRS broth supplemented with cysteine in 24-well blocks covered with adhesive aluminum foil and incubated at 42° C. and 100 rpm. The populations were transferred the daily with a few exceptions when the incubation lasted up to 70 hours and inoculated at the same initial OD. The number of generations per day was calculated as (Lenski et al. 1991):

$$\text{Number of generations} = \frac{\log\left(\frac{\text{Final } OD}{\text{Initial } OD}\right)}{\log 2}$$

After six transfers grown at 42° C., the incubation temperature was raised to and kept at 44° C. for the remainder of the selection experiment. At least once a week, a sample of each population was supplemented with glycerol (20% final concentration) and frozen at −80° C. After approximately 100 generations of selection, the populations were supplemented with glycerol and frozen at frozen at −80° C. for further evaluations.

All six parallel populations were evolved in the same way and the stressors were increased in all the populations at the same time. None of the populations went to extinction.

Example 3

Small-Scale Evaluation of Evolved *Bifidobacterium animalis* Supspecies *lactis* Bi-07

After the selection experiment, Applicants isolated single clones from the evolved populations and tested their storage stability in spot plating assays as described in the general methods. The spot plating assay sacrifices precision for high through-put: instead of assessing CFUs, Applicants focused on log 10 changes in viability of a freeze-dried sample relative to the ancestor after different storage intervals. Single clones were isolated by plating the evolved populations on MRS agar plates. The clones were grown to high density and flash frozen after adding KP stabilizer to the cell pellet. After freeze drying, the dry cell pellets were stored in the environmental chamber at 30° C. and 40% humidity and the cell viability was assessed after different storage times and compared to the viability of the ancestral control strains. Per population Applicants assessed up to seven single clones.

Two clones from two independent populations evolved for increased heat-tolerance showed consistently higher storage stability than the ancestor after 120 and 264 hours. These clones were named BBi Heat 4.1 and BBi Heat 6.6 and evaluated in the accelerated assay to test their fermentation performance and subsequent storage stability. At the same time, their genome was sequenced to identify mutations that arose over the course of the selection experiment.

Example 4

Performance of Strains BBi Heat 6.6

Seed cultures of BBi Wildtype C1 and BBi Heat 6.6 were generated following the three-step seed culture protocol as described in the General methods. Of the second stage seed cultures, 7 mL were inoculated into 343 mL of BBi medium (Table 2). One vessel each was inoculated with BBi Wildtype C1 and BBi Heat 6.6, respectively. BBi Wildtype C1 was harvested after 17.93 h and BBi Heat 6.6 after 17.81 h. Final cell dry weight concentrations for the BI Wildtype C1 were 3 cell g/l whereas the BBi heat 6.6 strain were at 7 g/l indicating an improvement due to evolution.

Cultures of BBi Wildtype C1 and BBi Heat 6.6 were harvested into 500 mL shake flasks, capped and stored for 1 h in a 10° C. water bath. Cell concentrations determined after storage indicated that the wildtype had a cell concentration of about $1.175 \times 10^{10}$ CFU/mL and the heat 6.6 strain had a cell concentration of about $1.35 \times 10^{10}$ CFU/mL.

Example 5

Performance of BBi Heat 6.6 Heat in Downstream Processing

Sample material generated in Example 3 was processed following the protocol described in the General Methods under "downstream processing in 96-well "small-scale" plate assay". Along the processing steps, cell numbers were determined as described in the general method section after the conditioning step as "CN", and as a second time as "T0" after their downstream processing. Survival (downstream processing) was subsequently calculated according to $$\text{survival(downstream processing)} = \frac{CFU(T0)}{CFU(CN)}$$

Analysis indicated strain BBi Heat 6.6 demonstrated about 75% survival whereas the BBi Wildtype C1 control only demonstrated about a 50% survival under the stated assay conditions.

Example 6

Storage Stability of BBi Heat 6.6 Heat

Sample material generated in EXAMPLE 5 was stored at 40% relative humidity and 30° C. following the protocol described under "Storage stability testing in 96-well "small-scale" plate assay at 30° C. and 40% relative humidity" in the General Methods. Subsequently the material was tested for its CFU content after storage at 30° C. and 40% relative humidity for either 14 d (CFU (storage, 30 C, wet, 14 d)) or 28 d (CFU (storage, 30 C, wet, 28 d)), applying the methods described for cell survival, plating and statistical processing in the general method section. Survival (storage, 30 C, wet, X) for respective storage time X was calculated according to $$\text{survival(storage, 30}C\text{, wet, }X) = \frac{CFU(\text{storage, 30}C\text{, wet, }X)}{CFU(T0)}$$

It was found that strains BBi Heat 6.6 had significant improved survival, i.e. significantly improved storage stability as compared to BBi Wildtype C1, if stored at 30° C. and 40% relative humidity for either 14 d or 28 d, where the BBi Wildtype C1 showed about 7.5% survival at both 14 and 287 days whereas the BBi Heat 6.6 strain demonstrated on the order of 24% survival at 14 days and 20% survival at 28 days.

Sample material generated in EXAMPLE 5 was stored at low relative humidity and 50° C. following the protocol described under "Storage stability testing in 96-well "small-scale" plate assay at 50° C. and low relative humidity" in the general method section. Subsequently the material was tested for its CFU content after storage at 50° C. and low relative humidity for either 7 d (CFU (storage, 50 C, dry, 7 d)) or 14 d (CFU (storage, 50 C, dry, 14 d)), applying the methods described for cell survival, plating and statistical processing in the general method section. Survival (storage, 50 C, dry, X) for respective storage time X was calculated according to $$\text{survival(storage, 50}C\text{, dry, }X) = \frac{CFU(\text{storage, 50}C\text{, dry, }X)}{CFU(T0)}$$

It was found that strains BBi Heat 6.6 had significant improved survival, i.e. significantly improved storage stability as compared to BBi Wildtype C1, if stored at 50° C. and low relative humidity for either 7 d or 14 d, where the BBi Wildtype C1 demonstrated 10% at 7 days and 5% survival at 14 days under the stated conditions whereas the BBi Heat 6.6 strain demonstrated 30% survival at 7 days and on the order of 18% survival at 14 days under the stated conditions.

Example 7

Effective Productivity of BBi Heat 6.6 Heat for Different Storage Conditions

From cultivating the strains as described in Example 4 processing the strains as described in Example 5 and analyzing the strains as described in EXAMPLE, the information was gained to derive the effective productivity of the strains according to:

$$P_{eff} = \frac{\Delta\ CFU}{\Delta\ t_{fermentation}}$$

Figure 3:
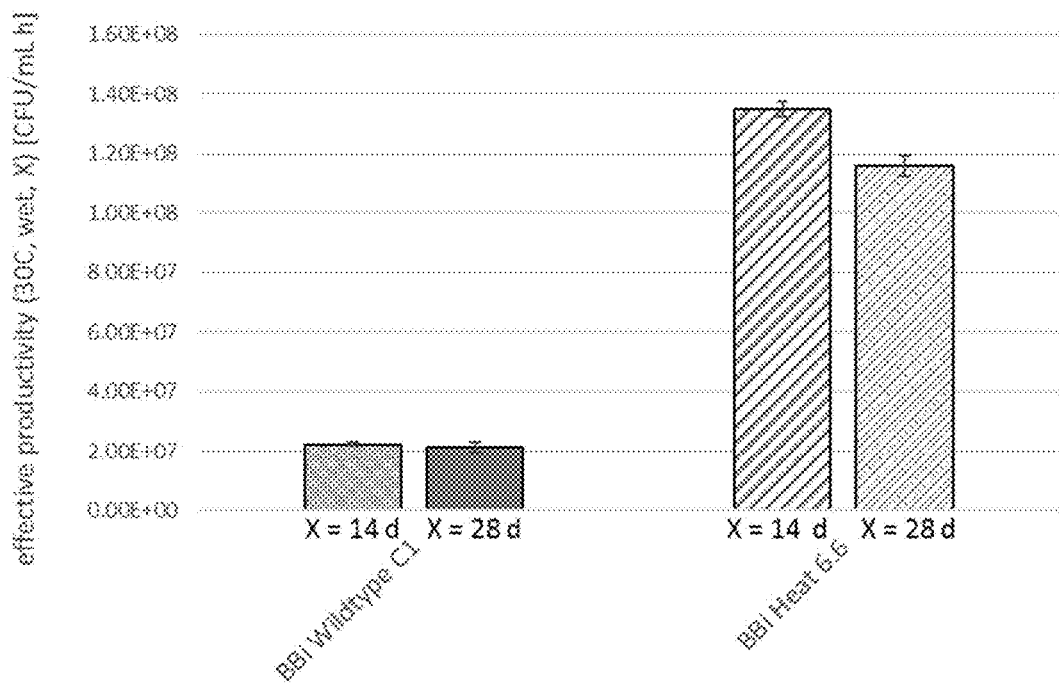
FIG. 3 is a graph showing the effective productivity of cultures BBi Wildtype C1 if subsequently stored for either X=14 d (dotted grey) or X=28 d (solid grey) as well as of BBi Heat 6.6 if subsequently stored for either X=14 d (thick diagonal stripes upward) or X=28 d (thin diagonal stripes upward) at 30 C and 40% relative humidity.

In the present example, for ΔCFU the surviving "equivalent" cell concentrations for the strains in the last stage fermentations were taken. The cells provided in the inoculum in this example were considered neglectable and consequently the "equivalent" cell concentrations for the strains were not corrected. For $\Delta t_{fermentation}$ only the fermentation time for the strains in the last stage vessel was considered. It was found that after downstream processing and storage of the cultures for either 14 d or 28 d at 30° C. and 40% relative humidity, strain BBi Heat 6.6 exhibited significantly higher effective productivity than BBi Wildtype C1 (FIG. 3)

Figure 4:
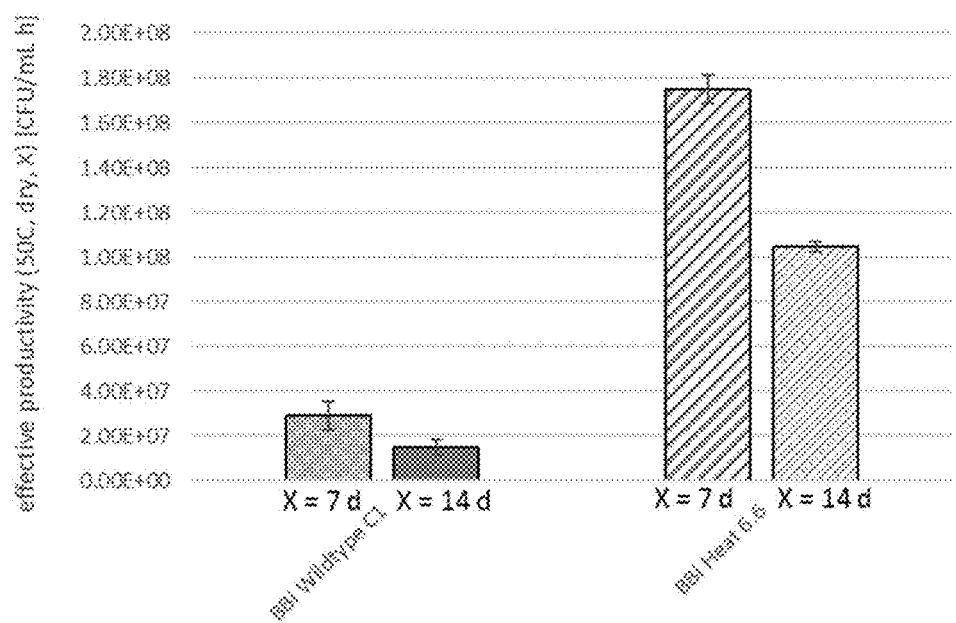
FIG. 4 is a graph showing the effective productivity of cultures BBi Wildtype C1 if subsequently stored for either X=7 d (dotted grey) or X=14 d (solid grey) as well as of BBi Heat 6.6 if subsequently stored for either X=7 d (thick diagonal stripes upward) or X=14 d (thin diagonal stripes upward) at 50 C and low relative humidity.

The effective productivity determination was carried out with the strains cultivated as described in Example 4 processed as described in Example 5 and stored for either 7 d or 14 d at 50° C. at low relative humidity as described in Example 6 It was found that strain BBi Heat 6.6 exhibited significantly higher effective productivity than BBi Wildtype C1 (FIG. 4).

Example 8

Performance of Strains BBi KCl 1.2, BBi KCl 5.5, BBi NaCl 2.7, BBi NaCl 3.3, BBi NaCl 5.1 and BBi NaCl 6.2

Figure 5:
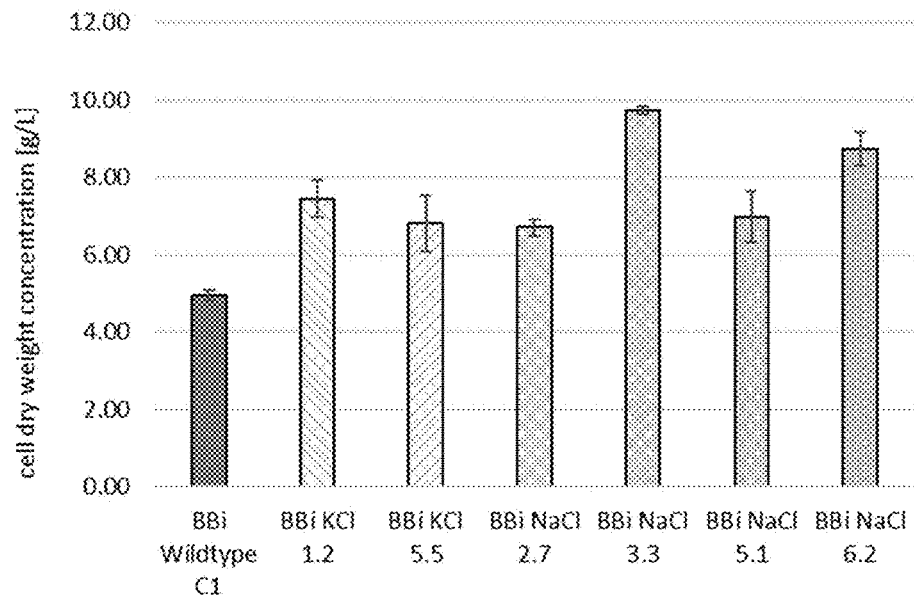
FIG. 5 is a graph showing the cell dry weight concentration measured at harvest time in cultures of BBi Wildtype C1 (solid dark grey), BBi KCl 1.2 (diagonal stripes downward), BBi KCl 5.5 (diagonal stripes upward), BBi NaCl 2.7 (50% dotted), BBi NaCl 3.3 (60% dotted), BBi NaCl 5.1 (70% dotted) and BBi NaCl 6.2 (80% dotted).

Seed cultures of BBi Wildtype C1 and BBi KCl 1.2, BBi KCl 5.5, BBi NaCl 2.7, BBi NaCl 3.3, BBi NaCl 5.1 and BBi NaCl 6.2 were generated following the three-step seed culture protocol as described in the "general method" section. Of the second stage seed cultures, 7 mL were inoculated into 343 mL of BBi medium (Table 2). One vessel each was inoculated with BBi Wildtype C1 and BBi KCl 1.2, BBi KCl 5.5, BBi NaCl 2.7, BBi NaCl 3.3, BBi NaCl 5.1 and BBi NaCl 6.2, respectively. BBi Wildtype C1 was harvested after 17.93 h, BBi KCl 1.2 after 15.65 h, BBi KCl 5.5 after 15.58 h, BBi NaCl 2.7 after 15.55 h, BBi NaCl 3.3 after 15.61 h, BBi NaCl 5.1 after 15.59 h and BBi NaCl 6.2 after 15.59 h. Final cell dry weight concentrations at harvest are shown in FIG. 5.

Cultures of BBi Wildtype C1 and BBi KCl 1.2, BBi KCl 5.5, BBi NaCl 2.7, BBi NaCl 3.3, BBi NaCl 5.1 and BBi NaCl 6.2 were harvested into 500 mL shake flasks, capped and stored for 1 h in a 10 C water bath. Cell concentrations as measured in CFU/mL correlated strongly with the cell dry wt. data as shown in FIG. 5.

Example 9

Performance of Strains BBi KCl 1.2, BBi KCl 5.5, BBi NaCl 2.7, BBi NaCl 3.3, BBi NaCl 5.1 and BBi NaCl 6.2 in Downstream Processing Sample material generated in Example 8 was processed following the protocol described in the general method section under "downstream processing in 96-well "small-scale" plate assay". Along the processing steps, cell numbers were determined as described in the general method section after the conditioning step as "CN", and as a second time as "T0" after their downstream processing. Survival (downstream processing) was subsequently calculated according to $$\text{survival(downstream processing)} = \frac{CFU(T0)}{CFU(CN)}$$

Figure 6:
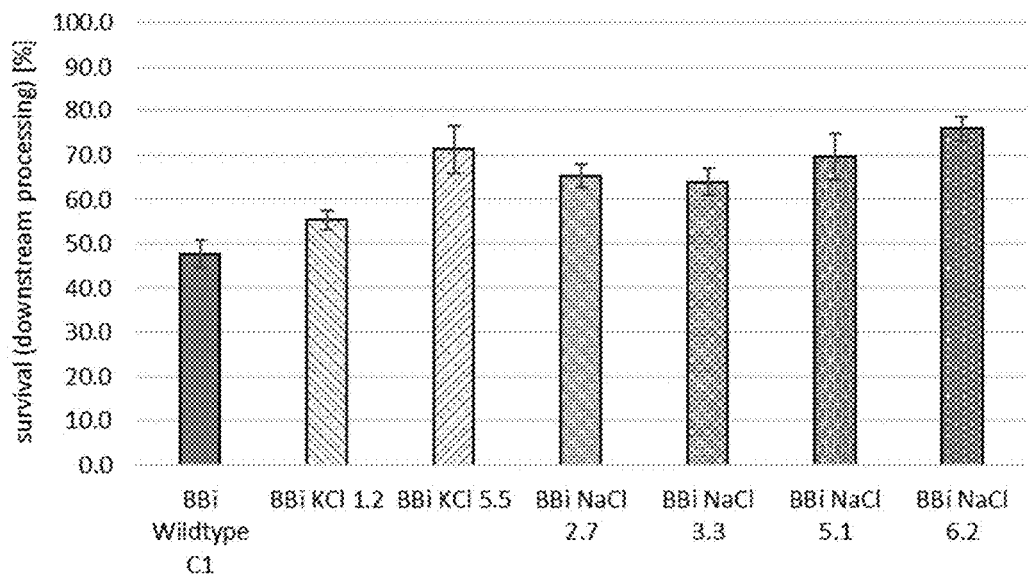
FIG. 6 is a graph showing the survival of cells after downstream processing in percent of cells from cultures BBi Wildtype C1 (solid dark grey), BBi KCl 1.2 (diagonal stripes downward), BBi KCl 5.5 (diagonal stripes upward), BBi NaCl 2.7 (50% dotted), BBi NaCl 3.3 (60% dotted), BBi NaCl 5.1 (70% dotted) and BBi NaCl 6.2 (80% dotted) as compared to fermentation cell numbers after conditioning (CN).

As shown in FIG. 6 strains BBi KCl 1.2, BBi KCl 5.5, BBi NaCl 2.7, BBi NaCl 3.3, BBi NaCl 5.1 and BBi NaCl 6.2 showed higher stability in downstream processing than BBi Wildtype C1.

Example 10

Storage Stability of Strains BBi KCl 1.2, BBi KCl 5.5, BBi NaCl 2.7, BBi NaCl 3.3, BBi NaCl 5.1 and BBi NaCl 6.2

Sample material generated in Example 9 was stored at 40% relative humidity and 30° C. following the protocol described under "Storage stability testing in 96-well "small-scale" plate assay at 30° C. and 40% relative humidity" in the general method section. Subsequently the material was tested for its CFU content after storage at 30° C. and 40% relative humidity for either 14 d (CFU (storage, 30 C, wet, 14 d)) or 28 d (CFU (storage, 30 C, wet, 28 d)), applying the methods described for cell survival, plating and statistical processing in the general method section. Survival (storage, 30 C, wet, X) for respective storage time X was calculated according to $$\text{survival(storage, 30}C\text{, wet, } X) = \frac{CFU(\text{storage, 30}C\text{, wet, } X)}{CFU(T0)}$$

It was found that strains BBi KCl 1.2, BBi KCl 5.5, BBi NaCl 2.7 and BBi NaCl 6.2 had significant improved survival, i.e. significantly improved storage stability as compared to BBi Wildtype C1, if stored at 30° C. and 40% relative humidity for either 14 d or 28 d. Strains BBi NaCl 3.3 and BBi NaCl 5.1 showed improved survival after 14 d, but not 28 d storage (FIG. 7.)

Sample material generated in example 9 was stored at low relative humidity and 50° C. following the protocol described under "Storage stability testing in 96-well "small-scale" plate assay at 50° C. and low relative humidity" in the general method section. Subsequently the material was tested for its CFU content after storage at 50° C. and low relative humidity for either 7 d (CFU (storage, 50 C, dry, 7 d)) or 14 d (CFU (storage, 50 C, dry, 14 d)), applying the methods described for cell survival, plating and statistical processing in the general method section. Survival (storage, 50 C, dry, X) for respective storage time X was calculated according to $$\text{survival(storage, 50}C\text{, dry, } X) = \frac{CFU(\text{storage, 50}C\text{, dry, } X)}{CFU(T0)}$$

It was found that strains BBi KCl 1.2, BBi NaCl 2.7, BBi NaCl 3.3, BBi NaCl 5.1 and BBi NaCl 6.2 had improved survival, i.e. improved storage stability as compared to BBi Wildtype C1, if stored at 50° C. and low relative humidity for either 7 d or 14 d. Strain BBi KCl 5.5 showed improved storage stability after 7 d, but not anymore after 14 d of storage (data not shown).

Example 11

Effective Productivity of BBi KCl 1.2, BBi KCl 5.5, BBi NaCl 2.7, BBi NaCl 3.3, BBi NaCl 5.1 and BBi NaCl 6.2 for Different Storage Conditions From cultivating the strains as described in Example 8 processing the strains as described in Example 9 and analyzing the strains as described in Example 10 the information was gained to derive the effective productivity of the strains according to:

$$P_{eff} = \frac{\Delta\ CFU}{\Delta\ t_{fermentation}}$$

In the present example, for $\Delta CFU$ the surviving "equivalent" cell concentrations for the strains in the last stage fermentations were taken. The cells provided in the inoculum in this example were considered neglectable and consequently the "equivalent" cell concentrations for the strains were not corrected. For $\Delta t_{fermentation}$ only the fermentation time for the strains in the last stage vessel was considered. It was found that after downstream processing and storage of the cultures for either 14 d or 28 d at 30° C. and 40% relative humidity, strains BBi KCl 1.2, BBi KCl 5.5, BBi NaCl 2.7, BBi NaCl 3.3, BBi NaCl 5.1 and BBi NaCl 6.2 exhibited higher effective productivity than BBi Wildtype C1 (FIG. 8).

The effective productivity determination was carried out with the strains cultivated as described in Example 8 processed as described in Example 9 and stored for either 7 d or 14 d at 50° C. at low relative humidity as described in Example 10 It was found that strains BBi KCl 1.2, BBi KCl 5.5, BBi NaCl 2.7, BBi NaCl 3.3, BBi NaCl 5.1 and BBi NaCl 6.2 exhibited higher effective productivity than BBi Wildtype C1, (data not shown).

Example 12

Performance of Strains BBi Heat 4.1 and BBi Heat 6.6 Heat

Seed cultures of BBi Wildtype C1, BBi Heat 4.1 and BBi Heat 6.6 were generated following the three-step seed culture protocol as described in the "general method" section. Of the second stage seed cultures, 7 mL were inoculated into 343 mL of BBi medium (Table 2). One vessel each was inoculated with BBi Wildtype C1, BBi Heat 4.1 and BBi Heat 6.6, respectively. The cumulative addition of base (Table 1) was recorded. Time courses of the cumulative base addition in the three fermentation runs are shown in FIG. 9.

BBi Wildtype C1 was harvested after 18.25 h, BBi Heat 4.1 after 18.95 h and BBi Heat 6.6 after 19.10 h. Final cell dry weight concentrations at harvest demonstrated a reduction in concentration for both heat evolved strains where cell concentrations were on the order of 4.8 g/l and 5 g/l for strains BBi Heat 4.1 and BBi Heat 6.6 respectively while the concentrations for BBi Wildtype C1 were on the order of 5.7 g/l. Alterations in harvest time may explain this negative result.

Cultures of BBi Wildtype C1, BBi Heat 4.1 and BBi Heat 6.6 were harvested into 500 mL shake flasks, capped and stored for 1 h in a 10 C water bath. Cell concentrations determined after storage demonstrated a similar decrease for heat evolved strains where concentrations were on the order of $8 \times 10^{10}$ and $1 \times 10^{10}$ CFU/mL for BBi Heat 4.1 and BBi Heat 6.6 respectively whereas the BBi Wildtype C1 demonstrated on the order of $1.55 \times 10^{10}$ CFU/ml.

Example 13

Performance of BBi Heat 4.1 and BBi Heat 6.6 Heat in Downstream Processing

Sample material generated in Example 12 was processed following the protocol described in the general method section under "downstream processing in 96-well "small-scale" plate assay". Along the processing steps, cell numbers were determined as described in the general method section after the conditioning step as "CN", and as a second time as "T0" after their downstream processing. Survival (downstream processing) was subsequently calculated according to $$\text{survival(downstream processing)} = \frac{CFU(T0)}{CFU(CN)}$$

As strains BBi Heat 4.1 and BBi Heat 6.6 showed higher stability in downstream processing than BBi Wildtype C1, where BBi Heat 4.1 and BBi Heat 6.6 showed on the order of 82% and 75% survival respectively, whereas BBi Wildtype C1 demonstrated on the order of 68% survival.

Example 14

Storage Stability of BBi Heat 4.1 and BBi Heat 6.6 Heat

Sample material generated in Example 13 was stored at 40% relative humidity and 30° C. following the protocol described under "Storage stability testing in 96-well "small-scale" plate assay at 30° C. and 40% relative humidity" in the general method section. Subsequently the material was tested for its CFU content after storage at 30° C. and 40% relative humidity ("wet") for 14 d (CFU (30 C, wet, 14 d)), applying the methods described for cell survival, plating and statistical processing in the general method section. Survival (storage, 30 C, wet, 14 d) was calculated according to $$\text{survival(downstream processing)} = \frac{CFU(30C, \text{wet}, 14d)}{CFU(T0)}$$

It was found that the strains BBi Heat 4.1 and BBi Heat 6.6 had significant improved survival, i.e. significantly improved storage stability, as compared to BBi Wildtype C1, if stored at 30° C. and 40% relative humidity for 14 d, where BBi Heat 4.1 and BBi Heat 6.6 had on the order of 32% and 47% survival respectively whereas the BBi Wildtype C1 demonstrated only about 10% survival.

Sample material generated in Example 13 was stored at low relative humidity and 30° C. following the protocol described under "Storage stability testing in 96-well "small-scale" plate assay at 30° C. and low relative humidity" in the general method section. Subsequently the material was tested for its CFU content after storage at 30° C. and low relative humidity for 137 d (CFU (30 C, dry, 137 d)), applying the methods described for cell survival, plating and statistical processing in the general method section. Survival (storage, 30 C, dry, 137 d) was calculated according to $$\text{survival(downstream processing)} = \frac{CFU(30C, \text{dry}, 137d)}{CFU(T0)}$$

It was found that the strains BBi Heat 4.1 and BBi Heat 6.6 had significant improved survival, i.e. significantly improved storage stability, as compared to BBi Wildtype C1, if stored at 30° C. and low relative humidity for 137 d, where the data correlated well with the data for the 30 C, wet, 14 d assay described above.

Sample material generated in example 13 was stored at low relative humidity and 50° C. following the protocol described under "Storage stability testing in 96-well "small-scale" plate assay at 50° C. and low relative humidity" in the general method section. Subsequently the material was tested for its CFU content after storage at 50° C. and low relative humidity for 14 d (CFU (50 C, dry, 14 d)), applying the methods described for cell survival, plating and statistical processing in the general method section. Survival (storage, 50 C, dry, 14 d) was calculated according to $$\text{survival(downstream processing)} = \frac{CFU(50C, \text{dry}, 14d)}{CFU(T0)}$$

It was found that strains BBi Heat 4.1 had significant improved survival, i.e. significantly improved storage stability, as compared to BBi Wildtype C1, if stored at 50° C. and low relative humidity for 14 d, however the BBi Heat 6.6 strain did not demonstrate an improvement opposite the BBi Wildtype C1, showing on the order of a 50% reduction in survival.

Example 15

Effective Productivity of BBi Heat 4.1 and BBi Heat 6.6 Heat for Different Storage Conditions From cultivating the strains as described in Example 12 processing the strains as described in Example 13, and analyzing the strains as described in Example 14 the information was gained to derive the effective productivity of the strains according to:

$$P_{\it eff} = \frac{\Delta\, CFU}{\Delta\, t_{fermentation}}$$

In the present example, for ΔCFU the surviving "equivalent" cell concentrations for the strains in the last stage fermentations were taken. The cells provided in the inoculum in this example were considered neglectable and consequently the "equivalent" cell concentrations for the strains were not corrected. For $\Delta t_{fermentation}$ only the fermentation time for the strains in the last stage vessel was considered. It was found that after downstream processing and storage of the cultures for 14 d at 30° C. and 40% relative humidity, strains BBi Heat 4.1 and BBi Heat 6.6 exhibited significantly higher effective productivity than BBi Wildtype C1 (FIG. 10).

The effective productivity determination was carried out with the strains cultivated as described in Example 12, processed as described in Example 13 and stored at 137 d at 30° C. and low relative humidity as described in Example 14. It was found that strains BBi Heat 4.1 and BBi Heat 6.6 exhibited significantly higher effective productivity than BBi Wildtype C1.

The effective productivity determination was carried out with the strains cultivated as described in EXAMPLE, processed as described in Example 13 and stored at 14 d at 50° C. and low relative humidity as described in Example 14. It was found that strains BBi Heat 4.1 exhibited significantly higher effective productivity than BBi Wildtype C1 (FIG. 11)

Example 16

Performance of Strains BBi KCl 1.2, BBi NaCl 2.7, BBi NaCl 3.3, BBi NaCl 5.1 and BBi NaCl 6.2

Seed cultures of BBi Wildtype C1, BBi KCl 1.2, BBi NaCl 2.7, BBi NaCl 3.3, BBi NaCl 5.1 and BBi NaCl 6.2 were generated following the three-step seed culture protocol as described in the "general method" section. Of the second stage seed cultures, 7 mL were inoculated into 343 mL of BBi medium (Table 2). One vessel each was inoculated with BBi Wildtype C1, BBi KCl 1.2, BBi NaCl 2.7, BBi NaCl 3.3, BBi NaCl 5.1 and BBi NaCl 6.2, respectively. The cumulative addition of base (Table 1) was recorded. Time courses of the cumulative base addition in the three fermentation runs are shown in FIG. 12.

BBi Wildtype C1 was harvested after 18.25 h, BBi KCl 1.2 after 15.45 h, BBi NaCl 2.7 after 15.45 h, BBi NaCl 3.3 after 18.25 h, BBi NaCl 5.1 after 15.35 h and BBi NaCl 6.2 after 15.35 h, respectively. Final cell dry weight concentrations at harvest are shown in FIG. 13.

Cultures of BBi Wildtype C1, BBi KCl 1.2, BBi NaCl 2.7, BBi NaCl 3.3, BBi NaCl 5.1 and BBi NaCl 6.2 were harvested into 500 mL shake flasks, capped and stored for 1 h in a 10 C water bath. Cell concentrations determined after storage are shown in FIG. 14.

Example 17

Performance of BBi KCl 1.2, BBi NaCl 2.7, BBi NaCl 3.3, BBi NaCl 5.1 and BBi NaCl 6.2 in Downstream Processing Sample material generated in Example 16 was processed following the protocol described in the general method section under "downstream processing in 96-well "small-scale" plate assay". Along the processing steps, cell numbers were determined as described in the general method section after the conditioning step as "CN", and as a second time as "T0" after their downstream processing. Survival (downstream processing) was subsequently calculated according to $$\text{survival(downstream processing)} = \frac{CFU(T0)}{CFU(CN)}$$

As shown in FIG. 15 strains BBi KCl 1.2, BBi NaCl 2.7, BBi NaCl 5.1 and BBi NaCl 6.2 showed higher stability in downstream processing than BBi Wildtype C1.

Example 18

Storage Stability of BBi KCl 1.2, BBi NaCl 2.7, BBi NaCl 3.3, BBi NaCl 5.1 and BBi NaCl 6.2

Sample material from Example 17 was stored at 40% relative humidity and 30° C. following the protocol described under "Storage stability testing in 96-well "small-scale" plate assay at 30° C. and 40% relative humidity" in the general method section. Subsequently the material was tested for its CFU content after storage at 30° C. and 40% relative humidity ("wet") for 14 d (CFU (30 C, wet, 14 d)), applying the methods described for cell survival, plating and statistical processing in the general method section. Survival (storage, 30 C, wet, 14 d) was calculated according to $$\text{survival(storage, } 30C, \text{wet, } 14\, d) = \frac{CFU(30C, \text{wet}, 14d)}{CFU(T0)}$$

It was found that the strains BBi Heat 4.1 and BBi Heat 6.6 had significant improved survival, i.e. significantly improved storage stability, as compared to BBi Wildtype C1, if stored at 30° C. and 40% relative humidity for 14 d (FIG. 16).

Sample material generated in Example 17 was stored at low relative humidity and 30° C. following the protocol described under "Storage stability testing in 96-well "small-scale" plate assay at 30° C. and low relative humidity" in the general method section. Subsequently the material was tested for its CFU content after storage at 30° C. and low relative humidity for 137 d (CFU (30 C, dry, 137 d)), applying the methods described for cell survival, plating and statistical processing in the general method section. Survival (storage, 30 C, dry, 137 d) was calculated according to $$\text{survival(storage, } 30C, \text{ dry, } 137d) = \frac{CFU(30C, \text{ dry, } 137d)}{CFU(T0)}$$

It was found that the strains BBi KCl 1.2, BBi NaCl 3.3, BBi NaCl 5.1 and BBi NaCl 6.2 had improved survival, i.e. improved storage stability, as compared to BBi Wildtype C1, if stored at 30° C. and low relative humidity for 137 d (FIG. 17).

Sample material generated in example 17 was stored at low relative humidity and 50° C. following the protocol described under "Storage stability testing in 96-well "small-scale" plate assay at 50° C. and low relative humidity" in the general method section. Subsequently the material was tested for its CFU content after storage at 50° C. and low relative humidity for 14 d (CFU (50 C, dry, 14 d)), applying the methods described for cell survival, plating and statistical processing in the general method section. Survival (storage, 50 C, dry, 14 d) was calculated according to $$\text{survival(storage, } 50C, \text{ dry, } 14d) = \frac{CFU(50C, \text{ dry, } 14d)}{CFU(T0)}$$

It was found that none of the strains had significant improved survival, i.e. significantly improved storage stability, as compared to BBi Wildtype C1, if stored at 50° C. and low relative humidity for 14 d (FIG. 18).

Example 19

Effective Productivity of BBi KCl 1.2, BBi NaCl 2.7, BBi NaCl 3.3, BBi NaCl 5.1 and BBi NaCl 6.2

From cultivating the strains as described in Example 16, processing the strains as described in example 17, and analyzing the strains after storage as described in example 18, the information was gained to derive the effective productivity of the strains according to:

$$P_{eff} = \frac{\Delta\ CFU}{\Delta\ t_{fermentation}}$$

In the present example, for ΔCFU the surviving "equivalent" cell concentrations for the strains in the last stage fermentations were taken. The cells provided in the inoculum in this example were considered neglectable and consequently the "equivalent" cell concentrations for the strains were not corrected. For $\Delta t_{fermentation}$ only the fermentation time for the strains in the last stage vessel was considered. It was found that after downstream processing and storage of the cultures for 14 d at 30° C. and 40% relative humidity, strains BBi NaCl 2.7, BBi NaCl 3.3 and BBi NaCl 6.2 exhibited significantly higher effective productivity than BBi Wildtype C1 (FIG. 19).

The effective productivity determination was carried out with the strains cultivated as described in Example 16, processed as described in Example 17 and stored at 137 d at 30° C. and low relative humidity as described in Example 18. It was found that strains BBi KCl 1.2, BBi NaCl 3.3, BBi NaCl 5.1 and BBi NaCl 6.2 exhibited significantly higher effective productivity than BBi Wildtype C1 (FIG. 20).

The effective productivity determination was carried out with the strains cultivated as described in example 16, processed as described in example 17, and stored at 14 d at 50° C. and low relative humidity as described in Example 18 It was found that none of the strains exhibited significantly higher effective productivity than BBi Wildtype C1 (FIG. 21).

Example 20

Genetic Changes in the Heat-Evolved and Salt Evolved BBi Clones

Applicants sequenced the two heat-evolved clones, and six salt evolved clones that were tested in the accelerated assays (BBi Heat 4.1, BBi Heat 6.6, BBi KCl 1.2, BBi, KCl 5.5, BBi NaCl 2.7, BBi NaCl 3.3, BBi NaCl 5.1 and BBi NaCl 6.2) using whole genome sequencing and aligned the reads to the reference sequence for of the ancestral BBi clone (NC_017867) using breseq (see general methods for details). To determine what mutations evolved over the course of the selection experiments, Applicants also sequenced the ancestral strain to identify discrepancies between the reference sequence and the ancestral strain. For any further analyses, only mutations that were present in the evolved clones but not in the ancestor were considered. It was assumed that mutations that occurred in the ancestral strains were most likely sequencing errors in the reference sequences or differences between our ancestral strain and the reference strains that was sequenced initially. Because the clones were isolated from different populations and as such had independent evolutionary histories, mutations that evolved in more than one strain were of particular interest, especially when genes acquired different mutations in different strains. Such parallel evolution is often indicative of beneficial or selective mutations.

The heat-evolved clones with improved storage stability, BBi Heat 4.1 and BBi Heat 6.6, acquired 12 and 13 mutations, respectively (Table 6, Table 7). Seven of these mutations occurred in both independently evolved strains. Two genes, the polyribonucleotide nucleotidyltransferase (EC 2.7.7.8) and the response regulator consisting of a CheY-like receiver domain and a winged-helix DNA-binding domain, acquired mutations at different sites within the genes and are therefore of particular interest, because it suggests that mutations could be due to convergent evolution and these genes could be targets of selection. Some of the mutations in these heat evolved strains were additionally found in salt evolved BBi strains, indicating greater significance.

TABLE 6

Mutations in the heat-evolved strains Heat 4.1

| Description | Position | Change | Annotation |
|---|---|---|---|
| Polyribonucleotide nucleotidyltransferase (EC 2.7.7.8) | 401,119 | C→T | H369Y (CAT→TAT) |
| SSU ribosomal protein S5p (S2e) | 477,512* | C→T | T139T (ACC→ACT) |
| Phosphoglycerate mutase (EC 5.4.2.1)/Oleate hydratase (EC 4.2.1.53) | 530,981* | C→A | intergenic (+352/−296) |
| Pup ligase PafA' paralog, possible component of postulated heterodimer PafA-PafA' | 753,989 | T→C | A407A (GCT→GCC) |
| Response regulators consisting of a CheY-like receiver domain and a winged-helix DNA-binding domain | 775,035 | A→G | D148G (GAT→GGT) |
| UTP--glucose-1-phosphate uridylyltransferase (EC 2.7.7.9) | 937,068 | A→G | A14A (GCT→GCC) |
| Arginine/ornithine antiporter ArcD | 1,480,689* | C→T | V228V (GTG→GTA) |
| Lipid A export ATP-binding/permease protein MsbA | 1,495,900 | A→G | S189P (TCC→CCC) |
| narrowly conserved hypothetical protein | 1,599,890 | A→G | S307P (TCC→CCC) |
| Pyridoxine biosynthesis glutamine amidotransferase, glutaminase subunit (EC 2.4.2.—) | 1,639,044* | T→C | H89H (CAT→CAC) |
| Homoserine dehydrogenase (EC 1.1.1.3)/Diaminopimelate decarboxylase (EC 4.1.1.20) | 1,663,472 | T→G | intergenic (−19/+254) |
| hypothetical protein | 1,799,246 | G→A | S75S (AGC→AGT) |

*Mutation additionally found in salt evolved strains

TABLE 7

Mutations in Heat 6.6

| Description | Position | Change | Annotation |
|---|---|---|---|
| Sucrose operon repressor ScrR, LacI family | 153,322 | C→T | M287I (ATG→ATA) |
| Transcriptional regulator, ArsR family/Uncharacterized NAD(FAD)-dependent dehydrogenase | 291,701* | (G)₁₂→₁₅ | intergenic (+864/+49) |
| Polyribonucleotide nucleotidyltransferase (EC 2.7.7.8) | 401,824 | G→A | G604S (GGC→AGC) |
| SSU ribosomal protein S5p (S2e) | 477,512* | C→T | T139T (ACC→ACT) |
| Phosphoglycerate mutase (EC 5.4.2.1)/Oleate hydratase (EC 4.2.1.53) | 530,981* | C→A | intergenic (+352/−296) |
| Substrate-specific component YkoE of thiamin-regulated ECF transporter for HydroxyMethylPyrimidine | 600,836 | G→A | G32D (GGC→GAC) |
| Pup ligase PafA' paralog, possible component of postulated heterodimer PafA-PafA' | 753,989 | T→C | A407A (GCT→GCC) |
| Response regulators consisting of a CheY-like receiver domain and a winged-helix DNA-binding domain | 775,307 | C→T | R239C (CGT→TGT) |
| UTP--glucose-1-phosphate uridylyltransferase (EC 2.7.7.9) | 937,068 | A→G | A14A (GCT→GCC) |
| Exodeoxyribonuclease III (EC 3.1.11.2) | 1,318,370 | T→C | G100G (GGA→GGG) |
| Arginine/ornithine antiporter ArcD | 1,480,689* | C→T | V228V (GTG→GTA) |
| Pyridoxine biosynthesis glutamine amidotransferase, glutaminase subunit (EC 2.4.2.—) | 1,639,044* | T→C | H89H (CAT→CAC) |
| putative phosphoglycerate mutase family protein | 1,859,179 | G→T | R113S (CGT→AGT) |

*Mutation additionally found in salt evolved strains.

Mutations in PNPase or the response regulators consisting of a CheY-like receiver domain and a winged-helix DNA-binding domain also occur in other clones of the same population, although not all the clones from one population had the same mutation. It is reasonable to conclude that mutations in these genes are of benefit for adaptation to the selective conditions.

Two KCl-evolved and four NaCl-evolved clones were sequenced as described in the General Methods. Eight mutations occurred in all the six clones. The two KCl-evolved clones shared five mutations, one in an intergenic region between two hypothetical genes, one SNP to a stop codon in a hydrolase and two non-synonymous SNPs in a hypothetical gene and a substitution in the response regulators consisting of a CheY-like receiver domain and a winged-helix DNA-binding. While both KCl-evolved strains shared the same R175L mutation in the response regulators consisting of a CheY-like receiver domain and a winged-helix DNA-binding, it was different from the two mutations in this gene observed in the heat-evolved clones.

The NaCl-evolved clones did not acquire any mutations in this gene. Among the four NaCl-evolved clones, it was observed that 16 mutations occurred in all four clones. Five of them were synonymous SNPs, and one mutations was in an intergenic region between a putative amidotransferase and a hypothetical gene. Four mutations were unique to NaCl 2.7 and NaCl 6.2. One of them was a synonymous change in large transmembrane protein possibly involved in transport, another mutation was in an intergenic region between a uridylyltransferase and a transcriptional regulator of the ArsR family. A deletion in a hypothetical gene likely caused a frameshift. A V58M mutation evolved in TrkA, a potassium uptake protein in both improved, NaCl-evolved clones independently.

Mutations found in BBi KCl 1.2, BBi KCl 5.5, BBi NaCl 2.7, BBi NaCl 3.3, BBi NaCl 5.1 and BBi NaCl 6.2 are found in Tables 8-13 respectively. Mutations common to all KCL evolved BBi strains are found in Table 14, Mutations common to all NaCl evolved strains are found in Table 15. Mutations common to all salt evolved BBi strains are found in Table 16.

TABLE 8

Mutations in BBi KCl_1.2

| Description | Position | Change | Annotation |
|---|---|---|---|
| hypothetical protein/hypothetical protein | 239,643 | A→G | intergenic (−232/+218) |
| FIG00672191: hypothetical protein | 438,495 | G→A | G473S (GGT→AGT) |
| SSU ribosomal protein S5p (S2e) | 477,512 | C→T | T139T (ACC→ACT) |
| Phosphoglucomutase (EC 5.4.2.2) | 503,076 | C→T | C325C (TGC→TGT) |
| Phosphoglycerate mutase (EC 5.4.2.1)/Oleate hydratase (EC 4.2.1.53) | 530,981 | C→A | intergenic (+352/−296) |
| FIG00671939: hypothetical protein | 583,508 | C→T | P140L (CCC→CTC) |
| Pantothenate kinase type III, CoaX-like (EC 2.7.1.33) | 660,753 | G→A | A187A (GCC→GCT) |
| Response regulators consisting of a CheY-like receiver domain and a winged-helix DNA-binding domain | 775,116 | G→T | R175L (CGT→CTT) |
| Argininosuccinate synthase (EC 6.3.4.5) | 857,663 | C→T | S370S (TCC→TCT) |
| tRNA-Asn-GTT/FIG00424337: hypothetical protein | 895,939 | G→A | intergenic (+18/−91) |
| FIG00424359: hypothetical protein | 1,033,071 | G→A | A25V (GCC→GTC) |
| Hydrolases of the alpha/beta superfamily | 1,036,193 | C→A | C239* (TGC→TGA) |
| Lipase | 1,203,768 | G→A | A159T (GCT→ACT) |
| Putative glucose uptake permease | 1,259,521 | G→A | T303I (ACA→ATA) |
| Octaprenyl diphosphate synthase (EC 2.5.1.90)/Dimethylallyltransferase (EC 2.5.1.1)/(2E,6E)-farnesyl diphosphate synthase (EC 2.5.1.10)/Geranylgeranyl pyrophosphate synthetase (EC 2.5.1.29) | 1,274,555 | T→A | L144Q (CTG→CAG) |
| Arginine/ornithine antiporter ArcD | 1,480,689 | C→T | V228V (GTG→GTA) |
| Pyridoxine biosynthesis glutamine amidotransferase, glutaminase subunit (EC 2.4.2.—) | 1,639,044 | T→C | H89H (CAT→CAC) |
| Inosine-uridine preferring nucleoside hydrolase (EC 3.2.2.1)/tRNA-Met-CAT | 1,688,482 | G→A | intergenic (−252/−18) |

TABLE 9

Mutations found in BBi NaCl_2.7

| Description | Position | Change | Annotation |
|---|---|---|---|
| Chromosomal replication initiator protein DnaA | 1,580 | G→A | D483N (GAC→AAC) |
| Aldo/keto reductase of diketogulonate reductase family(EC: 1.1.1.274) | 47,291 | C→T | R71C (CGT→TGT) |
| Nucleoside-diphosphate-sugar epimerases | 135,554 | C→T | A170T (GCC→ACC) |
| Fructose-bisphosphate aldolase class II (EC 4.1.2.13) | 142,555 | G→A | G20S (GGC→AGC) |

TABLE 9-continued

Mutations found in BBi NaCl_2.7

| Description | Position | Change | Annotation |
|---|---|---|---|
| hypothetical protein | 160,543 | G→A | R66Q (CGA→CAA) |
| large transmembrane protein possibly involved in transport | 185,139 | C→T | L136L (CTG→TTG) |
| putative ABC transporter integral membrane protein | 190,165 | T→C | T485A (ACA→GCA) |
| Ammonium transporter | 222,035 | G→A | V74V (GTG→GTA) |
| Nitrogen regulatory protein P-II/[Protein-PII] uridylyltransferase (EC 2.7.7.59) | 223,714 | Δ1 bp | intergenic (+265/−46) |
| [Protein-PII] uridylyltransferase (EC 2.7.7.59)/Transcriptional regulator, ArsR family | 225,656 | G→T | intergenic (+70/−291) |
| Putative amidotransferase similar to cobyric acid synthase/hypothetical protein | 230,092 | T→A | intergenic (+12/−96) |
| hypothetical protein | 322,863 | C→T | T2083T (ACC→ACT) |
| KH domain RNA binding protein YlqC | 327,730 | A→G | I33I (ATT→ATC) |
| Acetolactate synthase large subunit (EC 2.2.1.6) | 343,510 | G→A | T549I (ACC→ATC) |
| Regulator of polyketide synthase expression | 381,032 | T→C | F79S (TTC→TCC) |
| SSU ribosomal protein S5p (S2e) | 477,512 | C→T | T139T (ACC→ACT) |
| Seryl-tRNA synthetase (EC 6.1.1.11) | 500,089 | G→A | I175I (ATC→ATT) |
| Seryl-tRNA synthetase (EC 6.1.1.11) | 500,143 | C→T | K157K (AAG→AAA) |
| Phosphoglucomutase (EC 5.4.2.2) | 503,076 | C→T | C325C (TGC→TGT) |
| Phosphoglycerate mutase (EC 5.4.2.1)/Oleate hydratase (EC 4.2.1.53) | 530,981 | C→A | intergenic (+352/−296) |
| Lactose and galactose permease, GPH translocator family/Beta-galactosidase (EC 3.2.1.23) | 566,713 | G→A | intergenic (−62/−248) |
| ABC-type multidrug transport system, ATPase component/putative integral membrane transport protein | 587,079 | C→T | intergenic (+31/−92) |
| ABC transporter ATP-binding protein | 596,883 | T→C | H553R (CAC→CGC) |
| Pantothenate kinase type III, CoaX-like (EC 2.7.1.33) | 660,753 | G→A | A187A (GCC→GCT) |
| Putative esterase family | 701,111 | T→C | D287G (GAC→GGC) |
| Signal transduction histidine kinase | 776,580 | G→A | A414T (GCA→ACA) |
| ABC-type amino acid transport system, permease component | 792,815 | C→T | L37L (CTC→CTT) |
| DNA ligase (EC 6.5.1.2) | 823,806 | C→T | H513Y (CAT→TAT) |
| Argininosuccinate synthase (EC 6.3.4.5) | 857,663 | C→T | S370S (TCC→TCT) |
| Trk system potassium uptake protein TrkA | 867,940 | G→A | V58M (GTG→ATG) |
| Ribose-phosphate pyrophosphokinase (EC 2.7.6.1) | 877,516 | A→C | Q334P (CAG→CCG) |
| tRNA-Asn-GTT/FIG00424337: hypothetical protein | 895,939 | G→A | intergenic (+18/−91) |
| Putative glucose uptake permease | 1,259,521 | G→A | T303I (ACA→ATA) |
| hypothetical protein | 1,408,991 | G→A | V330M (GTG→ATG) |
| Histidinol-phosphate aminotransferase (EC 2.6.1.9) | 1,412,476 | C→T | G352R (GGG→AGG) |
| FIG00424197: hypothetical protein | 1,430,776 | G→A | V94V (GTG→GTA) |
| Arginine/ornithine antiporter ArcD | 1,480,689 | C→T | V228V (GTG→GTA) |
| DNA-directed RNA polymerase beta subunit (EC 2.7.7.6) | 1,575,622 | G→A | T261T (ACC→ACT) |
| hypothetical protein | 1,612,670 | G→T | P249P (CCC→CCA) |
| Pyridoxine biosynthesis glutamine amidotransferase, glutaminase subunit (EC 2.4.2.—) | 1,639,044 | T→C | H89H (CAT→CAC) |
| CpsF | 1,641,256 | C→T | P31L (CCG→CTG) |
| Arginyl-tRNA synthetase (EC 6.1.1.19) | 1,667,054 | C→T | A85T (GCC→ACC) |
| hypothetical protein | 1,759,804 | (C)₅→₄ | coding (64/144 nt) |
| hypothetical protein | 1,797,815 | G→T | I552I (ATC→ATA) |

TABLE 10

Mutations found in BBi NaCl_3.3

| Description | Position | Change | Annotation |
|---|---|---|---|
| Phosphoenolpyruvate carboxylase (EC 4.1.1.31) | 75,773 | C→A | A415S (GCC→TCC) |

TABLE 10-continued

Mutations found in BBi NaCl_3.3

| Description | Position | Change | Annotation |
|---|---|---|---|
| Fructose-bisphosphate aldolase class II (EC 4.1.2.13) | 142,555 | G→A | G20S (GGC→AGC) |
| hypothetical protein | 160,543 | G→A | R66Q (CGA→CAA) |
| putative ABC transporter integral membrane protein | 190,165 | T→C | T485A (ACA→GCA) |
| Putative amidotransferase similar to cobyric acid synthase/hypothetical protein | 230,092 | T→A | intergenic (+12/−96) |
| DNA topoisomerase I (EC 5.99.1.2) | 261,490 | T→C | Y402H (TAC→CAC) |
| KH domain RNA binding protein YlqC | 327,730 | A→G | I33I (ATT→ATC) |
| Aspartate aminotransferase (EC 2.6.1.1) | 377,615 | C→T | A386V (GCG→GTG) |
| Regulator of polyketide synthase expression | 381,032 | T→C | F79S (TTC→TCC) |
| SSU ribosomal protein S5p (S2e) | 477,512 | C→T | T139T (ACC→ACT) |
| Phosphoglucomutase (EC 5.4.2.2) | 503,076 | C→T | C325C (TGC→TGT) |
| Phosphoglycerate mutase (EC 5.4.2.1)/Oleate hydratase (EC 4.2.1.53) | 530,981 | C→A | intergenic (+352/−296) |
| putative integral membrane transport protein | 588,716 | G→C | G516R (GGC→CGC) |
| ABC transporter ATP-binding protein | 596,883 | T→C | H553R (CAC→CGC) |
| Pantothenate kinase type III, CoaX-like (EC 2.7.1.33) | 660,753 | G→A | A187A (GCC→GCT) |
| Putative esterase family | 701,111 | T→C | D287G (GAC→GGC) |
| DNA polymerase IV (EC 2.7.7.7) | 706,887 | C→A | L165L (CTC→CTA) |
| Signal transduction histidine kinase | 776,580 | G→A | A414T (GCA→ACA) |
| FIG00672362: hypothetical protein | 778,758 | C→T | S346S (TCC→TCT) |
| ABC-type amino acid transport system, permease component | 792,815 | C→T | L37L (CTC→CTT) |
| UDP-galactose-lipid carrier transferase (EC 2.—.—.—) | 794,606 | G→A | R233H (CGT→CAT) |
| DNA ligase (EC 6.5.1.2) | 823,806 | C→T | H513Y (CAT→TAT) |
| Argininosuccinate synthase (EC 6.3.4.5) | 857,663 | C→T | S370S (TCC→TCT) |
| Ribose-phosphate pyrophosphokinase (EC 2.7.6.1) | 876,529 | T→A | L5H (CTC→CAC) |
| tRNA-Asn-GTT/FIG00424337: hypothetical protein | 895,939 | G→A | intergenic (+18/−91) |
| Glutamate synthase [NADPH] large chain (EC 1.4.1.13) | 1,024,702 | G→A | H1229Y (CAC→TAC) |
| CarD-like transcriptional regulator | 1,136,466 | C→T | V68V (GTG→GTA) |
| Putative glucose uptake permease | 1,259,521 | G→A | T303I (ACA→ATA) |
| UDP-N-acetylmuramoylalanyl-D-glutamate--2,6-diaminopimelate ligase (EC 6.3.2.13) | 1,387,346 | C→A | A206S (GCC→TCC) |
| hypothetical protein | 1,408,213 | Δ1 bp | coding (210/1404 nt) |
| Histidinol-phosphate aminotransferase (EC 2.6.1.9) | 1,412,476 | C→T | G352R (GGG→AGG) |
| Arginine/ornithine antiporter ArcD | 1,480,689 | C→T | V228V (GTG→GTA) |
| Exodeoxyribonuclease VII large subunit (EC 3.1.11.6) | 1,525,663 | C→T | A31V (GCG→GTG) |
| DNA-directed RNA polymerase beta subunit (EC 2.7.7.6) | 1,575,622 | G→A | T261T (ACC→ACT) |
| Dihydroorotate dehydrogenase (EC 1.3.3.1) | 1,587,929 | C→A | L275L (CTC→CTA) |
| narrowly conserved hypothetical protein | 1,594,660 | G→A | P76L (CCG→CTG) |
| hypothetical protein | 1,612,670 | G→T | P249P (CCC→CCA) |
| Pyridoxine biosynthesis glutamine amidotransferase, glutaminase subunit (EC 2.4.2.—) | 1,639,044 | T→C | H89H (CAT→CAC) |
| Arginyl-tRNA synthetase (EC 6.1.1.19) | 1,667,054 | C→T | A85T (GCC→ACC) |
| hypothetical protein | 1,797,815 | G→T | I552I (ATC→ATA) |

TABLE 11

Mutations found in BBi NaCl_5.1

| Description | Position | Change | Annotation |
|---|---|---|---|
| membrane protein, putative | 12,475 | C→A | F295L (TTC→TTA) |
| Glycoside-Pentoside-Hexuronide (GPH): Cation symporter family protein | 58,459 | (C)$_{7\to6}$ | coding (684/1260 nt) |
| Cell division protein FtsI [Peptidoglycan synthetase] (EC 2.4.1.129) | 98,500 | C→T | A11A (GCG→GCA) |
| Serine/threonine phosphatase PPP (EC 3.1.3.16) | 100,438 | C→T | V462V (GTG→GTA) |

TABLE 11-continued

Mutations found in BBi NaCl_5.1

| Description | Position | Change | Annotation |
|---|---|---|---|
| probable LysR-type transcriptional regulator | 140,558 | C→T | N139N (AAC→AAT) |
| Fructose-bisphosphate aldolase class II (EC 4.1.2.13) | 142,555 | G→A | G20S (GGC→AGC) |
| hypothetical protein | 160,543 | G→A | R66Q (CGA→CAA) |
| putative ABC transporter integral membrane protein | 190,165 | T→C | T485A (ACA→GCA) |
| Putative amidotransferase similar to cobyric acid synthase/hypothetical protein | 230,092 | T→A | intergenic (+12/−96) |
| AAA+ superfamily protein | 272,037 | C→T | S227F (TCC→TTC) |
| KH domain RNA binding protein YlqC | 327,730 | A→G | I33I (ATT→ATC) |
| LSU ribosomal protein L19p | 360,979 | G→A | G54S (GGC→AGC) |
| Regulator of polyketide synthase expression | 381,032 | T→C | F79S (TTC→TCC) |
| SSU ribosomal protein S5p (S2e) | 477,512 | C→T | T139T (ACC→ACT) |
| Phosphoglucomutase (EC 5.4.2.2) | 503,076 | C→T | C325C (TGC→TGT) |
| Phosphoglycerate mutase (EC 5.4.2.1)/Oleate hydratase (EC 4.2.1.53) | 530,981 | C→A | intergenic (+352/−296) |
| ABC transporter ATP-binding protein | 596,883 | T→C | H553R (CAC→CGC) |
| Pantothenate kinase type III, CoaX-like (EC 2.7.1.33) | 660,753 | G→A | A187A (GCC→GCT) |
| Putative esterase family | 701,111 | T→C | D287G (GAC→GGC) |
| Translation elongation factor Tu | 731,021 | C→T | N279N (AAC→AAT) |
| Signal transduction histidine kinase | 776,580 | G→A | A414T (GCA→ACA) |
| ABC-type amino acid transport system, permease component | 792,815 | C→T | L37L (CTC→CTT) |
| DNA ligase (EC 6.5.1.2) | 823,806 | C→T | H513Y (CAT→TAT) |
| Argininosuccinate synthase (EC 6.3.4.5) | 857,663 | C→T | S370S (TCC→TCT) |
| Ribose-phosphate pyrophosphokinase (EC 2.7.6.1) | 877,503 | G→T | E330* (GAA→TAA) |
| Phosphoglycerate mutase family | 882,410 | G→A | K52K (AAG→AAA) |
| tRNA-Asn-GTT/FIG00424337: hypothetical protein | 895,939 | G→A | intergenic (+18/−91) |
| Aquaporin Z | 941,074 | G→T | E163D (GAG→GAT) |
| Putative glucose uptake permease | 1,259,521 | G→A | T303I (ACA→ATA) |
| Ribosomal subunit interface protein | 1,283,740 | G→A | H101H (CAC→CAT) |
| Histidinol-phosphate aminotransferase (EC 2.6.1.9) | 1,412,476 | C→T | G352R (GGG→AGG) |
| Arginine/ornithine antiporter ArcD | 1,480,689 | C→T | V228V (GTG→GTA) |
| CRISPR-associated RecB family exonuclease Cas4/CRISPR-associated protein Cas1/Similar to Glutamate-cysteine ligase (EC 6.3.2.2) | 1,512,712 | Δ74 bp | intergenic (−1071/+684) |
| DNA-directed RNA polymerase beta subunit (EC 2.7.7.6) | 1,575,622 | G→A | T261T (ACC→ACT) |
| hypothetical protein | 1,612,670 | G→T | P249P (CCC→CCA) |
| Pyridoxine biosynthesis glutamine amidotransferase, glutaminase subunit (EC 2.4.2.—) | 1,639,044 | T→C | H89H (CAT→CAC) |
| Arginyl-tRNA synthetase (EC 6.1.1.19) | 1,667,054 | C→T | A85T (GCC→ACC) |
| Phosphoglycerol transferase and related proteins, alkaline phosphatase superfamily | 1,776,580 | C→A | L163M (CTG→ATG) |
| hypothetical protein | 1,797,815 | G→T | I552I (ATC→ATA) |

TABLE 12

Mutations found in BBi NaCl_6.2

| Description | Position | Change | Annotation |
|---|---|---|---|
| Fructose-bisphosphate aldolase class II (EC 4.1.2.13) | 142,555 | G→A | G20S (GGC→AGC) |
| hypothetical protein | 160,543 | G→A | R66Q (CGA→CAA) |
| large transmembrane protein possibly involved in transport | 185,139 | C→T | L136L (CTG→TTG) |
| putative ABC transporter integral membrane protein | 190,165 | T→C | T485A (ACA→GCA) |
| [Protein-PII] uridylyltransferase (EC 2.7.7.59)/Transcriptional regulator, ArsR family | 225,656 | G→T | intergenic (+70/−291) |
| Putative amidotransferase similar to cobyric acid synthase/hypothetical protein | 230,092 | T→A | intergenic (+12/−96) |
| DNA topoisomerase I (EC 5.99.1.2) | 261,725 | C→A | P480Q (CCG→CAG) |

TABLE 12-continued

Mutations found in BBi NaCl_6.2

| Description | Position | Change | Annotation |
|---|---|---|---|
| DNA topoisomerase I (EC 5.99.1.2) | 262,579 | G→A | E765K (GAG→AAG) |
| Transcriptional regulator, ArsR family/Uncharacterized NAD(FAD)-dependent dehydrogenase | 291,701 | (G)₁₂→₁₄ | intergenic (+864/+49) |
| KH domain RNA binding protein YlqC | 327,730 | A→G | I33I (ATT→ATC) |
| Regulator of polyketide synthase expression | 381,032 | T→C | F79S (TTC→TCC) |
| SSU ribosomal protein S5p (S2e) | 477,512 | C→T | T139T (ACC→ACT) |
| Phosphoglycerate mutase (EC 5.4.2.1)/Oleate hydratase (EC 4.2.1.53) | 530,981 | C→A | intergenic (+352/−296) |
| ABC transporter ATP-binding protein | 596,883 | T→C | H553R (CAC→CGC) |
| Pantothenate kinase type III, CoaX-like (EC 2.7.1.33) | 660,753 | G→A | A187A (GCC→GCT) |
| Putative esterase family | 701,111 | T→C | D287G (GAC→GGC) |
| Pup ligase PafA, possible component of postulated heterodimer PafA-PafA' | 755,738 | C→T | Q17* (CAG→TAG) |
| Signal transduction histidine kinase | 776,580 | G→A | A414T (GCA→ACA) |
| ABC-type amino acid transport system, permease component | 792,815 | C→T | L37L (CTC→CTT) |
| DNA ligase (EC 6.5.1.2) | 823,806 | C→T | H513Y (CAT→TAT) |
| Argininosuccinate synthase (EC 6.3.4.5) | 857,663 | C→T | S370S (TCC→TCT) |
| Trk system potassium uptake protein TrkA | 867,940 | G→A | V58M (GTG→ATG) |
| tRNA-Asn-GTT/FIG00424337: hypothetical protein | 895,939 | G→A | intergenic (+18/−91) |
| hypothetical protein | 1,088,447 | C→A | G178W (GGG→TGG) |
| Putative glucose uptake permease | 1,259,521 | G→A | T303I (ACA→ATA) |
| Putative glucose uptake permease | 1,260,264 | C→A | G55G (GGG→GGT) |
| Histidinol-phosphate aminotransferase (EC 2.6.1.9) | 1,412,476 | C→T | G352R (GGG→AGG) |
| Arginine/ornithine antiporter ArcD | 1,480,689 | C→T | V228V (GTG→GTA) |
| DNA-directed RNA polymerase beta subunit (EC 2.7.7.6) | 1,575,622 | G→A | T261T (ACC→ACT) |
| hypothetical protein | 1,612,670 | G→T | P249P (CCC→CCA) |
| Pyridoxine biosynthesis glutamine amidotransferase, glutaminase subunit (EC 2.4.2.—) | 1,639,044 | T→C | H89H (CAT→CAC) |
| Arginyl-tRNA synthetase (EC 6.1.1.19) | 1,667,054 | C→T | A85T (GCC→ACC) |
| hypothetical protein | 1,759,804 | (C)₅→₁₄ | coding (64/144 nt) |
| hypothetical protein | 1,797,815 | G→T | I552I (ATC→ATA) |

TABLE 13

Mutations found in BBi KCL5.5

| Description | Position | Change | Annotation |
|---|---|---|---|
| hypothetical protein/hypothetical protein | 239,643 | A→G | intergenic (−232/+218) |
| ABC transporter, permease protein | 280,330 | T→C | S255P (TCC→CCC) |
| Transcriptional regulator, ArsR family/Uncharacterized NAD(FAD)-dependent dehydrogenase | 291,701 | (G)₁₂→₁₄ | intergenic (+864/+49) |
| Signal recognition particle, subunit Ffh SRP54 (TC 3.A.5.1.1) | 335,845 | C→A | H304N (CAC→AAC) |
| SSU ribosomal protein S5p (S2e) | 477,512 | C→T | T139T (ACC→ACT) |
| SSU ribosomal protein S13p (S18e) | 481,620 | T→G | Y21D (TAT→GAT) |
| Phosphoglucomutase (EC 5.4.2.2) | 503,076 | C→T | C325C (TGC→TGT) |
| Phosphoglycerate mutase (EC 5.4.2.1)/Oleate hydratase (EC 4.2.1.53) | 530,981 | C→A | intergenic (+352/−290) |
| Pantothenate kinase type III, CoaX-like (EC 2.7.1.33) | 660,753 | G→A | A187A (GCC→GCT) |
| Histone acetyltransferase HPA2 and related acetyltransferases | 688,078 | A→G | T133A (ACA→GCA) |
| Response regulators consisting of a CheY-like receiver domain and a winged-helix DNA-binding domain | 775,116 | G→T | R175L (CGT→CTT) |
| Argininosuccinate synthase (EC 6.3.4.5) | 857,663 | C→T | S370S (TCC→TCT) |
| tRNA-Asn-GTT/FIG00424337: hypothetical protein | 895,939 | G→A | intergenic (+18/−91) |
| Phosphoglycolate phosphatase (EC 3.1.3.18) | 929,879 | G→A | N52N (AAC→AAT) |
| FIG00424359: hypothetical protein | 1,033,071 | G→A | A25V (GCC→GTC) |
| Hydrolases of the alpha/beta superfamily | 1,036,193 | C→A | C239* (TGC→TGA) |

TABLE 13-continued

Mutations found in BBi KCL5.5

| Description | Position | Change | Annotation |
|---|---|---|---|
| Cysteine desulfurase (EC 2.8.1.7), SufS subfamily | 1,052,457 | C→T | E271E (GAG→GAA) |
| Putative glucose uptake permease | 1,259,521 | G→A | T303I (ACA→ATA) |
| Arginine/ornithine antiporter ArcD | 1,480,689 | C→T | V228V (GTG→GTA) |
| CRISPR-associated RecB family exonuclease Cas4/CRISPR-associated protein Cas1/Similar to Glutamate-cysteine ligase (EC 6.3.2.2) | 1,512,570 | Δ72 bp | intergenic (−929/+828) |
| Ribonucleotide reductase of class III (anaerobic), activating protein (EC 1.97.1.4)/Ribonucleotide reductase of class III (anaerobic), large subunit (EC 1.17.4.2) | 1,522,462 | T→C | intergenic (−15/+327) |
| Phosphoglucosamine mutase (EC 5.4.2.10) | 1,535,726 | C→T | S240S (TCG→TCA) |
| Pyridoxine biosynthesis glutamine amidotransferase, glutaminase subunit (EC 2.4.2.—) | 1,639,044 | T→C | H89H (CAT→CAC) |

TABLE 14

Mutations common to all NaCl Evolved BBi strains

| Description | Position | Change | Annotation |
|---|---|---|---|
| Fructose-bisphosphate aldolase class II (EC 4.1.2.13) | 142,555 | G→A | G20S (GGC→AGC) |
| hypothetical protein | 160,543 | G→A | R66Q (CGA→CAA) |
| putative ABC transporter integral membrane protein | 190,165 | T→C | T485A (ACA→GCA) |
| KH domain RNA binding protein YlqC | 327,730 | A→G | I33I (ATT→ATC) |
| Regulator of polyketide synthase expression | 381,032 | T→C | F79S (TTC→TCC) |
| ABC transporter ATP-binding protein | 596,883 | T→C | H553R (CAC→CGC) |
| Putative esterase family | 701,111 | T→C | D287G (GAC→GGC) |
| Signal transduction histidine kinase | 776,580 | G→A | A414T (GCA→ACA) |
| ABC-type amino acid transport system, permease component | 792,815 | C→T | L37L (CTC→CTT) |
| Histidinol-phosphate aminotransferase (EC 2.6.1.9) | 1,412,476 | C→T | G352R (GGG→AGG) |
| DNA-directed RNA polymerase beta subunit (EC 2.7.7.6) | 1,575,622 | G→A | T261T (ACC→ACT) |
| hypothetical protein | 1,612,670 | G→T | P249P (CCC→CCA) |
| Arginyl-tRNA synthetase (EC 6.1.1.19) | 1,667,054 | C→T | A85T (GCC→ACC) |
| hypothetical protein | 1,797,815 | G→T | I552I (ATC→ATA) |

TABLE 15

Mutations common to all KCL evolved BBi strains

| Description | Position | Change | Annotation |
|---|---|---|---|
| hypothetical protein/hypothetical protein | 239,643 | A→G | intergenic (−232/+218) |
| Response regulators consisting of a CheY-like receiver domain and a winged-helix DNA-binding domain | 775,116 | G→T | R175L (CGT→CTT) |
| FIG00424359: hypothetical protein | 1,033,071 | G→A | A25V (GCC→GTC) |
| Hydrolases of the alpha/beta superfamily | 1,036,193 | C→A | C239* (TGC→TGA) |

TABLE 16

Mutations common to all salt evolved BBi strains.

| Description | Position | Change | Annotation |
|---|---|---|---|
| SSU ribosomal protein S5p (S2e) | 477,512 | C→T | T139T (ACC→AC$\underline{\text{T}}$) |
| Phosphoglycerate mutase (EC 5.4.2.1)/Oleate hydratase (EC 4.2.1.53) | 530,981 | C→A | intergenic (+352/−296) |
| Phosphoglycerate mutase type III, CoaX-like (EC 2.7.1.33) | 660,753 | G→A | A187A (GC$\underline{\text{C}}$→GC$\underline{\text{T}}$) |
| Argininosuccinate synthase (EC 6.3.4.5) | 857,663 | C→T | S370S (TCC→TC$\underline{\text{T}}$) |
| tRNA-Asn-GTT/FIG00424337: hypothetical protein | 895,939 | G→A | intergenic (+18/−91) |
| Putative glucose uptake permease | 1,259,521 | G→A | T303I (AC$\underline{\text{A}}$→A$\underline{\text{T}}$A) |
| Arginine/ornithine antiporter ArcD | 1,480,689 | C→T | V228V (G$\underline{\text{T}}$G→G$\underline{\text{T}}$A) |
| Pyridoxine biosynthesis glutamine amidotransferase, glutaminase subunit (EC 2.4.2.—) | 1,639,044 | T→C | H89H (CA$\underline{\text{T}}$→CA$\underline{\text{C}}$) |

Example 21

Testing the Stability of Evolved Mutations in BBi Heat 4.1 and BBi Heat 6.6, During Fermentation To test whether the new mutations were stably maintained in a clonal populations during fermentation and production, Applicants sequenced end of run populations from small scale fermentations AA029 and checked for polymorphism of these new mutations in the populations. Such polymorphism would be indicative of new mutations or revertant mutations arising during the fermentation process. Because the process began with clonal populations, it was expected that all evolved mutations would occur at a frequency of 1 (100%) in a population. If a mutation was not stable, would it be expected that the frequency would be smaller than 1.

Six populations from EOR fermentations were sequenced and the populations were analyzed as polymorphic populations in breseq (Deatherage and Barrick 2014) using the polymorphism option (-p). This analysis confirmed that the mutations found in EOR sample from a fermentation run with this clone and all mutations occurred at a frequency of 100% in the population, suggesting that no reversion mutations evolved at a measurable frequency.

Example 22

Evolution and Selection of *Lactobacillus acidophilus* NCFM

The experimental evolution and identification of improved clones were done as indicated in the general methods. Briefly, eight single colonies were isolated by streaking the frozen *L. acidophilus* NCFM stock MRS agar. These colonies were grown up in MRS agar and subsequently used to start eight replicated populations that were selected in different selective environments. A sample of these cultures were supplemented with 20% glycerol and frozen at −80° C.

The eight parallel populations were started by inoculating 7 mL MRS supplemented with cysteine in 24-well plates at a starting OD of 0.2, covered with the adhesive aluminum foil and incubated at 42° C. and 100 rpm for 24 hours. The populations were transferred to fresh media on a daily basis with a few exceptions when they were transferred after up to 48 hours of incubation. At transfer, 7 mL MRS with cysteine were inoculated with the cultures at an OD of 0.2. The number of generations per transfers were calculated following (Lenski et al. 1991) as:

$$\text{Number of generations} = \frac{\log\left(\frac{\text{Final } OD}{\text{Initial } OD}\right)}{\log 2}$$

The populations were transferred daily as described above. After 6 days, the temperature was raised to 44° C. for the remained of the selection experiment. At least once a week, we supplemented a sample of each population with glycerol (20% final concentration) and froze it at −80° C. All selections were run for about 100 generations. At the end of the experiment, a sample of each population was supplemented with 20% glycerol and frozen at −80° C. for further analysis.

To assess storage stability of the heat-evolved clones, five single colonies were isolated as described in the general methods. These single clones were then grown under benign conditions at 37° C. and 100 rpm for 24 hours under anaerobic conditions. The cultures were transferred to 3.5 mL MRS supplemented with cysteine at an OD of 0.2 in two new 48 deep-well plates and incubated overnight at 37° C. and 100 rpm. At the same time, each clonal culture was supplemented with glycerol stocks for a final concentration of 20% glycerol and froze them at −80° C. After incubation, 1 mL of the cultures at OD=4 was spun down, supernatant removed, and stabilizer added before the pellets were flash frozen and freeze dried for 24 hours in the lyophilizer as described in the general methods section. After 24 hours freeze drying the pellets were stored at 30° C. and 40% humidity and the viability of the clones was assessed at regular intervals: right after lyophilization, 96, 196 and 290 hours of storage. The cultures were resuspended in MRS broth supplemented with cysteine, serially diluted 10-fold and 5 μl of the dilutions were spotted on MRS agar plates. The majority of the populations had clones with improved storage stability when compared to the ancestor. Two clones from independently evolved populations, NCFM Heat 1.1 and NCFM Heat 6.3, were chosen for further investigation.

Example 23

Performance of Strains NCFM Heat 1.1 and NCFM Heat 6.3

Seed cultures of NCFM Wildtype C1, NCFM Wildtype C2, NCFM Heat 1.1 and NCFM Heat 6.3 were generated following the three-step seed culture protocol as described in the "general method" section. Of the second stage seed cultures, 7 mL were inoculated into 343 mL of NCFM medium (Table 2). One vessel each was inoculated with NCFM Wildtype C1, NCFM Wildtype C2, NCFM Heat 1.1 and NCFM Heat 6.3, respectively. The cumulative addition of base (Table 1) was recorded. Time courses of the cumulative base addition in the four fermentation runs are shown in (FIG. 22.)

NCFM Wildtype C1 was harvested after 13.63 h, NCFM Wildtype C2 after 14.73 h, NCFM Heat 1.1 after 14.73 h and NCFM Heat 6.3 after 14.73 h. Final cell dry weight concentrations at harvest are shown in FIG. 23. Cultures of NCFM Wildtype C1, NCFM Wildtype C2, NCFM Heat 1.1 and NCFM Heat 6.3 were harvested into 500 mL shake flasks, capped and stored for 1 h in a 10 C water bath. Cell concentrations determined after storage are shown in FIG. 24

Example 24

Performance of Strains NCFM Heat 1.1 and NCFM Heat 6.3 in Downstream Processing

Sample material generated in Example 23 was processed following the protocol described in the general method section under "downstream processing in 96-well "small-scale" plate assay". Along the processing steps, cell numbers were determined as described in the general method section after the conditioning step as "CN", and as a second time as "T0" after their downstream processing. Survival (downstream processing) was subsequently calculated according to $$\text{survival(downstream processing)} = \frac{CFU(T0)}{CFU(CN)}$$

As shown in FIG. 25 both evolved strains, NCFM Heat 1.1 and NCFM Heat 6.3, showed higher stability in downstream processing than the two wildtype control cultures, NCFM Wildtype C1 and NCFM Wildtype C2.

Example 25

Storage Stability of Strains NCFM Heat 1.1 and NCFM Heat 6.3

Sample material generated in Example 24 was stored at 40% relative humidity and 30° C. following the protocol described under "Storage stability testing in 96-well "small-scale" plate assay at 30° C. and 40% relative humidity" in the general method section. Subsequently the material was tested for its CFU content after storage at 30° C. and 40% relative humidity for either X=14 d (CFU (storage, 30 C, wet, 14 d)) or X=28 d (CFU (storage, 30 C, wet, 28 d)), applying the methods described for cell survival, plating and statistical processing in the general method section. Survival (storage, 30 C, wet, X) for respective storage time X was calculated according to $$\text{survival(storage, 30}C\text{, wet, }X\text{)} = \frac{CFU(\text{storage, 30}C\text{, wet, }X)}{CFU(T0)}$$

It was found that both strains, NCFM Heat 1.1 and NCFM Heat 6.3, had significant improved survival, i.e. significantly improved storage stability as compared to the two control cultures, NCFM Wildtype C1 and NCFM Wildtype C1, if stored at 30° C. and 40% relative humidity for either 14 d or 28 d (FIG. 26).

Sample material generated in Example 24 was stored at low relative humidity and 50° C. following the protocol described under "Storage stability testing in 96-well "small-scale" plate assay at 50° C. and low relative humidity" in the general method section. Subsequently the material was tested for its CFU content after storage at 50° C. and low relative humidity for either X=7 d (CFU (storage, 50 C, dry, 7 d)) or X=14 d (CFU (storage, 50 C, dry, 14 d)), applying the methods described for cell survival, plating and statistical processing in the general method section. Survival (storage, 50 C, dry, X) for respective storage time X was calculated according to $$\text{survival(storage, 50}C\text{, dry, }X\text{)} = \frac{CFU(\text{storage, 50}C\text{, dry, }X)}{CFU(T0)}$$

It was found that strain NCFM Heat 1.1 had significant improved survival, i.e. significantly improved storage stability, if stored at 50° C. and low relative humidity for either 7 d or 14 d, as compared to both control strain, NCFM Wildtype C1 and NCFM Wildtype C2. However, strain NCFM Heat 6.3 only exhibited improved storage stability as compared to the control culture NCFM Wildtype C2, but less storage stability than the NCFM Wildtype C1 culture, if stored at 50° C. and low relative humidity for either 7 d or 14 d FIG. 27.

Example 26

Effective Productivity of NCFM Heat 1.1 Heat and NCFM Heat 6.3 for Different Storage Conditions From cultivating the strains as described in Example 23, processing the strains as described in Example 24, and analyzing the strains as described in Example 25 the information was gained to derive the effective productivity of the strains according to:

$$P_{eff} = \frac{\Delta\ CFU}{\Delta\ t_{fermentation}}$$

In the present example, for ΔCFU the surviving "equivalent" cell concentrations for the strains in the last stage fermentations were taken. The cells provided in the inoculum in this example were considered neglectable and consequently the "equivalent" cell concentrations for the strains were not corrected. For $\Delta t_{fermentation}$ only the fermentation time for the strains in the last stage vessel was considered. It was found that after downstream processing and storage of the cultures for either 14 d or 28 d at 30° C. and 40% relative humidity, both evolved strains, NCFM Heat 1.1 and NCFM Heat 6.3, exhibited significantly higher effective productivity than both control strains, NCFM Wildtype C1 and NCFM Wildtype C2 (FIG. 28).

The effective productivity determination was carried out with the strains cultivated as described in Example 23 processed as described in Example 24 and stored for either 7 d or 14 d at 50° C. at low relative humidity as described in Example 25 It was found that strain NCFM Heat 1.1 exhibited higher effective productivity than both control strains, NCFM Wildtype C1 and NCFM Wildtype C2, if stored for either 7 d or 14 d. However, NCFM Heat 6.3 exhibited only higher effective productivity than control cultures NCFM Wildtype C2, but lower than NCFM Wildtype C1, if stored for either 7 d or 14 d (FIG. 29).

Example 27

Performance of Strains NCFM Heat 1.1 and NCFM Heat 6.3

Seed cultures of NCFM Wildtype C1, NCFM Wildtype C2, NCFM Heat 1.1 and NCFM Heat 6.3 were generated following the three-step seed culture protocol as described in the "general method" section. Of the second stage seed cultures, 7 mL were inoculated into 343 mL of NCFM medium (Table 2). One vessel each was inoculated with NCFM Wildtype C1, NCFM Wildtype C2, NCFM Heat 1.1 and NCFM Heat 6.3, respectively. The cumulative addition of base (Table 1) was recorded. Time courses of the cumulative base addition in the four fermentation runs are shown in FIG. 30

NCFM Wildtype C1 was harvested after 10.98 h, NCFM Wildtype C2 after 11.60 h, NCFM Heat 1.1 after 12.20 h and NCFM Heat 6.3 after 12.80 h. Final cell dry weight concentrations at harvest are shown in FIG. 31. Cultures of NCFM Wildtype C1, NCFM Wildtype C2, NCFM Heat 1.1 and NCFM Heat 6.3 were harvested into 500 mL shake flasks, capped and stored for 1 h in a 10 C water bath. Cell concentrations determined after storage are shown in FIG. 32.

Example 28

Performance of strains NCFM Heat 1.1 and NCFM Heat 6.3 in Downstream Processing Sample material generated in Example 27 was processed following the protocol described in the general method section under "downstream processing in 96-well "small-scale" plate assay". Along the processing steps, cell numbers were determined as described in the general method section after the conditioning step as "CN", and as a second time as "T0" after their downstream processing. Survival (downstream processing) was subsequently calculated according to $$\text{survival(downstream processing)} = \frac{CFU(T0)}{CFU(CN)}$$

As shown in FIG. 33 both evolved strains, NCFM Heat 1.1 and NCFM Heat 6.3, showed higher stability in downstream processing than the two wildtype control cultures, NCFM Wildtype C1 and NCFM Wildtype C2.

Example 29

Storage Stability of Strains NCFM Heat 1.1 and NCFM Heat 6.3

Sample material generated in Example 28 was stored at 40% relative humidity and 30° C. following the protocol described under "Storage stability testing in 96-well "small-scale" plate assay at 30° C. and 40% relative humidity" in the general method section. Subsequently the material was tested for its CFU content after storage at 30° C. and 40% relative humidity for 28 d (CFU (storage, 30° C., wet, 28 d)), applying the methods described for cell survival, plating and statistical processing in the general method section. Survival (storage, 30° C., wet, 28 d) was calculated according to $$\text{survival(storage, 30}C\text{, wet, 28}d) = \frac{CFU(\text{storage, 30}C\text{, wet, 28}d)}{CFU(T0)}$$

It was found that strains NCFM Heat 6.3 had improved survival, i.e. improved storage stability as compared to the two control cultures, NCFM Wildtype C1 and NCFM Wildtype C1, if stored at 30° C. and 40% relative humidity for 28 d (FIG. 34).

Sample material generated in Example 28 was stored at low relative humidity and 30° C. following the protocol described under "Storage stability testing in 96-well "small-scale" plate assay at 30° C. and low relative humidity" in the general method section. Subsequently the material was tested for its CFU content after storage at 30° C. and low relative humidity for 4 m (CFU (storage, 30 C, dry, 4 m)), applying the methods described for cell survival, plating and statistical processing in the general method section. Survival (storage, 30 C, dry, 4 m) for respective storage time X was calculated according to $$\text{survival(storage, 30}C\text{, dry, 4}m) = \frac{CFU(\text{storage, 30}C\text{, dry, 4}m)}{CFU(T0)}$$

Results are provided in FIG. 35.

Sample material generated in Example 28 was stored at low relative humidity and 50° C. following the protocol described under "Storage stability testing in 96-well "small-scale" plate assay at 50° C. and low relative humidity" in the general method section. Subsequently the material was tested for its CFU content after storage at 50° C. and low relative humidity for 14 d (CFU (storage, 50 C, dry, 14 d)), applying the methods described for cell survival, plating and statistical processing in the general method section. Survival (storage, 50 C, dry, 14 d) was calculated according to $$\text{survival(storage, 50}C\text{, dry, 14}d) = \frac{CFU(\text{storage, 50}C\text{, dry, 14})}{CFU(T0)}$$

Results are provided in FIG. 36.

Example 30

Effective Productivity of NCFM Heat 1.1 Heat and NCFM Heat 6.3 for Different Storage Conditions From cultivating the strains as described in Example 27, processing the strains as described in Example 28, and analyzing the strains as described in Example 29 the information was gained to derive the effective productivity of the strains according to:

$$P_{eff} = \frac{\Delta\ CFU}{\Delta\ t_{fermentation}}$$

In the present example, for ΔCFU the surviving "equivalent" cell concentrations for the strains in the last stage fermentations were taken. The cells provided in the inoculum in this example were considered neglectable and consequently the "equivalent" cell concentrations for the strains were not corrected. For $\Delta t_{fermentation}$ only the fermentation time for the strains in the last stage vessel was considered. It was found that after downstream processing and storage of the cultures for either 14 d or 28 d at 30° C. and 40% relative humidity, strain NCFM Heat 6.3 exhibited higher effective productivity than both control strains, NCFM Wildtype C1 and NCFM Wildtype C2 (FIG. 37).

The effective productivity determination was carried out with the strains cultivated as described in Example 27, processed as described in Example 28 and stored for either 4 m at 30° C. at low relative humidity as described in Example 29. Results are provided in FIG. 38.

The effective productivity determination was carried out with the strains cultivated as described in Example 27, processed as described in Example 28 and stored for 14 d at 50° C. and low relative humidity as described in Example 29. Results are provided in FIG. 39.

Example 31

Genetic Differences in Heat Evolved *Lactobacillus acidophilus* NCFM

Whole genome sequencing was performed on all selected clones essentially as described in the General Methods. The genomes of the two heat-evolved clones were sequenced and analyzed using breseq (Deatherage and Barrick 2014) as described in the general methods. In addition, the unevolved ancestor was also sequenced. Only mutations that did not occur in the ancestor were considered. One of the clones, NCFM Heat 6.3 had 9 mutations (Table 17), 7 of them were shared by NCFM Heat 1.1. With the exception of one intergenic mutation, all mutations in NCFM Heat 1.1 (Table 18) were in coding sequences and likely have an effect on the function of the gene. One mutation in gntR resulted in a early stop codon, likely affecting the function of the gene. In addition, two other mutations in a cation transporter and a transposon were deletions of one nucleotide that likely resulted in a frameshift and in affected the function of the genes. The additional two mutations in NCFM Heat 6.3 were a synonymous mutation in rpsU and non-synonymous substitution in theronly-tRNA synthetase.

TABLE 17

Mutations in NCFM Heat 1.1

| Description | Position | Change | Annotation | Gene |
|---|---|---|---|---|
| 30S ribosomal protein S18 | 9,960 | C→T | R47C (CGT→TGT) | rpsR |
| cation transporter | 98,615 | (A)₈→₇ | coding (71/1107 nt) | LBA0098 |
| transposase | 121,570 | Δ1 bp | coding (1210/1242 nt) | LBA0127 |
| ATPase | 277,061 | C→A | A232D (GCT→GAT) | clpC |
| pyridoxal kinase | 985,309 | G→T | D194Y (GAT→TAT) | LBA1007 |
| transcriptional regulator | 1,166,676 | C→A | E14* (GAA→TAA) | gntR |
| uridine mono phosphate kinase/elongation factor Ts | 1,247,879 | (T)₆→₄ | intergenic (-93/+77) | LBA1268/tsf |

TABLE 18

Mutations in NCFM Heat 6.3

| Description | Position | Change | Annotation | Gene |
|---|---|---|---|---|
| 30S ribosomal protein S18 | 9,960 | C→T | R47C (CGT→TGT) | rpsR |
| cation transporter | 98,615 | (A)₈→₇ | coding (71/1107 nt) | LBA0098 |
| transposase | 121,570 | Δ1 bp | coding (1210/1242 nt) | LBA0127 |
| ATPase | 277,061 | C→A | A232D (GCT→GAT) | clpC |
| pyridoxal kinase | 985,309 | G→T | D194Y (GAT→TAT) | LBA1007 |
| transcriptional regulator | 1,166,676 | C→A | E14* (GAA→TAA) | gntR |
| 30S ribosomal protein S21 | 1,181,343 | A→C | L16L (CTT→CTG) | rpsU |
| uridine mono phosphate kinase/elongation factor Ts | 1,247,879 | (T)₆→₄ | intergenic (-93/+77) | LBA1268/tsf |
| theronyl-tRNA synthetase | 1,531,825 | C→T | D634N (GAT→AAT) | thrS |

REFERENCES

The following references, to the extent that they provide exemplary procedural or other details supplementary to those set forth herein, are specifically incorporated herein by reference.

Brenner D M, Chey W D. 2009. *Bifidobacterium infantis* 35624: a novel probiotic for the treatment of irritable bowel syndrome. Rev Gastroenterol Disord 9:7-15.

Briczinski E P, Loquasto J R, Barrangou R, Dudley E G, Roberts A M, Roberts R F. 2009. Strain-specific genotyping of *Bifidobacterium animalis* subsp. *lactis* by using single-nucleotide polymorphisms, insertions, and deletions. Appl Environ Microbiol 75:7501-7508.

Broadbent J R, Neeno-Eckwall E C, Stahl B, Tandee K, Cai H, Morovic W, Horvath P, Heidenreich J, Perna N T, Barrangou R, et al. 2012. Analysis of the *Lactobacillus casei* supragenome and its influence in species evolution and lifestyle adaptation. BMC Genomics 13:533.

Brock T D. 1989. Biotechnology: A Textbook of Industrial Microbiology. Sunderland, M A: Sinauer Associates, Inc.

Castro H P, Teixeira P M, Kirby R. 1997. Evidence of membrane damage in *Lactobacillus bulgaricus* following freeze drying. Journal of Applied Microbiology 82:87-94.

Chouraqui J P, Van Egroo L D, Fichot M C. 2004. Acidified milk formula supplemented with *Bifidobacterium lactis*: impact on infant diarrhea in residential care settings. J Pediatr Gastroenterol Nutr 38:288-292.

de Vrese M, Winkler P, Rautenberg P, Harder T, Noah C, Laue C, Ott S, Hampe J, Schreiber S, Heller K, et al. 2005. Effect of *Lactobacillus gasseri* PA 16/8, *Bifidobacterium longum* SP 07/3, *B. bifidum* MF 20/5 on common cold episodes: a double blind, randomized, controlled trial. Clin Nutr 24:481-491.

Deatherage D E, Traverse C C, Wolf L N, Barrick J E. 2014. Detecting rare structural variation in evolving microbial populations from new sequence junctions using breseq. Front Genet 5:468.

Gerhardt. P, Murray R G E, Castilow R N, Nester E W, Wood W A, Krieg N R, Phillips G B. 1994. Manual of Methods for General Bacteriology In. Washington, DC: American Society for Microbiology.

Hale W G, Margham J P. 1991. Harper Collins Dictionary of Biology: Harper Perennial, New York.

Izu H, Adachi O, Yamada M. 1997. Gene organization and transcriptional regulation of the gntRKU operon involved in gluconate uptake and catabolism of *Escherichia coli*. J Mol Biol 267:778-793.

Kim J Y, Kwon J H, Ahn S H, Lee S I, Han Y S, Choi Y O, Lee S Y, Ahn K M, Ji G E. 2010. Effect of probiotic mix (*Bifidobacterium bifidum, Bifidobacterium lactis, Lactobacillus acidophilus*) in the primary prevention of eczema: a double-blind, randomized, placebo-controlled trial. Pediatr Allergy Immunol 21:e386-393.

Kulkarni S, Haq S F, Samant S, Sukumaran S. 2017. Adaptation of *Lactobacillus acidophilus* to Thermal Stress Yields a Thermotolerant Variant Which Also Exhibits Improved Survival at pH 2. Probiotics Antimicrob Proteins.

Lenski R E, Rose M R, Simpson S C, Tadler S C. 1991. Long-Term Experimental Evolution in *Escherichia coli*. I. Adaptation and Divergence During 2,000 Generations. American Naturalist 138:1315-1341.

Li C, Li P Z, Sun J W, Huo G C, Liu L B. 2014. Proteomic analysis of the response to NaCl stress of *Lactobacillus bulgaricus*. Biotechnol Lett 36:2263-2269.

Lilly D M, Stillwell R H. 1965. Probiotics: Growth-Promoting Factors Produced by Microorganisms. Science 147: 747-748.

a) Liu K, Zeng X, Qiao L, Li X, Yang Y, Dai C, Hou A, Xu D. 2014. The sensitivity and significance analysis of parameters in the model of pH regulation on lactic acid production by *Lactobacillus bulgaricus*. BMC Bioinformatics 15 Suppl 13:S5.

b) Liu X T, Hou C L, Zhang J, Zeng X F, Qiao S Y. 2014. Fermentation conditions influence the fatty acid composition of the membranes of *Lactobacillus reuteri* 15007 and its survival following freeze-drying. Lett Appl Microbiol 59:398-403.

Louesdon S, Charlot-Rouge S, Tourdot-Marechal R, Bouix M, Beal C. 2015. Membrane fatty acid composition and fluidity are involved in the resistance to freezing of *Lactobacillus buchneri* R1102 and *Bifidobacterium longum* R0175. Microb Biotechnol 8:311-318.

Macfarlane S, Steed H, Macfarlane G T. 2009. Intestinal bacteria and inflammatory bowel disease. Crit Rev Clin Lab Sci 46:25-54.

Matto J, Malinen E, Suihko M L, Alander M, Palva A, Saarela M. 2004. Genetic heterogeneity and functional properties of intestinal bifidobacteria. J Appl Microbiol 97:459-470.

Mills S, Stanton C, Fitzgerald G F, Ross R P. 2011. Enhancing the stress responses of probiotics for a lifestyle from gut to product and back again. Microb Cell Fact 10 Suppl 1:S19.

Morovic W, Roper J M, Smith A B, Mukerji P, Stahl B, Rae J C, Ouwehand A C. 2017. Safety evaluation of HOW-ARU® Restore (*Lactobacillus acidophilus* NCFM, *Lactobacillus paracasei* Lpc-37, *Bifidobacterium animalis* subsp. *lactis* Bl-04 and *B. lactis* Bi-07) for antibiotic resistance, genomic risk factors, and acute toxicity. Food Chem Toxicol 110:316-324.

Mueller S, Saunier K, Hanisch C, Norin E, Alm L, Midtvedt T, Cresci A, Silvi S, Orpianesi C, Verdenelli M C, et al. 2006. Differences in fecal microbiota in different European study populations in relation to age, gender, and country: a cross-sectional study. Appl Environ Microbiol 72:1027-1033.

Prasad J, McJarrow P, Gopal P. 2003. Heat and Osmotic Stress Responses of Probiotic *Lactobacillus rhamnosus* HN001 (DR20) in Relation to Viability after Drying. Applied and Environmental Microbiology 69:917-925.

Sanders M E, Klaenhammer T R. 2001. Invited review: the scientific basis of *Lactobacillus acidophilus* NCFM functionality as a probiotic. J Dairy Sci 84:319-331.

Saxer G, Krepps M D, Merkley E D, Ansong C, Deatherage Kaiser B L, Valovska M T, Ristic N, Yeh P T, Prakash V P, Leiser O P, et al. 2014. Mutations in global regulators lead to metabolic selection during adaptation to complex environments. PLoS Genet 10:e1004872.

Simpson P J, Stanton C, Fitzgerald G F, Ross R P. 2005. Intrinsic tolerance of *Bifidobacterium* species to heat and oxygen and survival following spray drying and storage. J Appl Microbiol 99:493-501.

Singleton P, Sainsbury D. 2006. Dictionary of Microbiology and Molecular Biology. Chichester, New York, Weinheim, Brisbane, Singapore, Toronto: John Wiley & Sons, Ltd.

Stahl B, Barrangou R. 2012. Complete genome sequences of probiotic strains *Bifidobacterium animalis* subsp. *lactis* B420 and Bi-07. J Bacteriol 194:4131-4132.

Tsunedomi R, Izu H, Kawai T, Yamada M. 2003. Dual control by regulators, GntH and GntR, of the Gntll genes for gluconate metabolism in *Escherichia coli*. J Mol Microbiol Biotechnol 6:41-56.

Upadrasta A, Stanton C, Hill C, Fitzgerald G F, Ross P R. 2011. Improving the Stress Tolerance of Probiotic Cultures: Recent Trends and Future Directions. In: Tsakalidou E, Papadimitriou K, editors. Stress Responses of Lactic Acid Bacteria. New York: Springer. p. 395-438.

Yoo J, Tcheurekdjian H, Lynch S V, Cabana M, Boushey H A. 2007. Microbial manipulation of immune function for asthma prevention: inferences from clinical trials. Proc Am Thorac Soc 4:277-282.

SEQUENCE LISTING

The patent contains a lengthy sequence listing. A copy of the sequence listing is available in electronic form from the USPTO web site (https://seqdata.uspto.gov/docdetail?docId=US12509677B2). An electronic copy of the sequence listing will also be available from the USPTO upon request and payment of the fee set forth in 37 CFR 1.19(b)(3).

The invention claimed is:

1. A heat evolved strain of *Bifidobacterium animalis* subsp. *lactis* deposited with the DSMZ under number DSM 33461 on 4 Mar. 2020 (BBi 6.6).

* * * * *